US011926780B2

(12) United States Patent
Josseaux et al.

(10) Patent No.: US 11,926,780 B2
(45) Date of Patent: *Mar. 12, 2024

(54) SHAPED ABRASIVE PARTICLES AND METHOD OF FORMING SAME

(71) Applicant: SAINT-GOBAIN CERAMICS & PLASTICS, INC., Worcester, MA (US)

(72) Inventors: Frederic Josseaux, Marseilles (FR); David F. Louapre, Paris (FR)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,698

(22) Filed: Feb. 14, 2023

(65) Prior Publication Data
US 2023/0193100 A1    Jun. 22, 2023

Related U.S. Application Data

(63) Continuation of application No. 16/426,554, filed on May 30, 2019, now Pat. No. 11,608,459, which is a continuation of application No. 15/887,466, filed on Feb. 2, 2018, now Pat. No. 10,351,745, which is a continuation of application No. 14/757,688, filed on Dec. 23, 2015, now Pat. No. 9,914,864, which is a continuation-in-part of application No. 14/581,220, filed on Dec. 23, 2014, now Pat. No. 9,707,529.

(60) Provisional application No. 62/141,181, filed on Mar. 31, 2015.

(51) Int. Cl.
| C09K 3/14 | (2006.01) |
| B01J 2/20 | (2006.01) |
| B01J 2/26 | (2006.01) |

(52) U.S. Cl.
CPC .............. *C09K 3/1409* (2013.01); *B01J 2/20* (2013.01); *B01J 2/26* (2013.01)

(58) Field of Classification Search
CPC .............. C09K 3/1409; B01J 2/20; B01J 2/26
USPC .......................................... 51/293, 295, 309
See application file for complete search history.

(56) References Cited

U.S. PATENT DOCUMENTS

| 345,604 A | 7/1886 | Semper |
| 1,910,444 A | 5/1933 | Nicholson |
| 2,033,991 A | 3/1936 | Melton et al. |
| 2,036,903 A | 4/1936 | Webster |
| 2,049,874 A | 8/1936 | Sherk |

(Continued)

FOREIGN PATENT DOCUMENTS

| CA | 743715 A | 10/1966 |
| CA | 2423788 A1 | 7/2002 |

(Continued)

OTHER PUBLICATIONS

Torre, "Investigation of Shaped Abrasive Particles vol. 1: Review of U.S. Pat. No. 6,054,093 Apr. 25, 2000" © Apr. 2011.

(Continued)

*Primary Examiner* — James E McDonough
(74) *Attorney, Agent, or Firm* — Abel Schillinger, LLP; Adrian Lawrence

(57) ABSTRACT

An abrasive particle including a shaped abrasive particle including a body having a plurality of abrasive particles bonded to at least one surface of the body of the shaped abrasive particle.

20 Claims, 16 Drawing Sheets

(56) References Cited

U.S. PATENT DOCUMENTS

| | | |
|---|---|---|
| 2,148,400 A | 2/1939 | Crompton, Jr. |
| 2,248,064 A | 7/1941 | Carlton et al. |
| 2,248,990 A | 7/1941 | Heany |
| 2,290,877 A | 7/1942 | Heany |
| 2,318,360 A | 5/1943 | Benner et al. |
| 2,376,343 A | 5/1945 | Carlton |
| 2,563,650 A | 8/1951 | Heinemann |
| 2,880,080 A | 3/1959 | Rankin et al. |
| 3,041,156 A | 6/1962 | Rowse et al. |
| 3,067,551 A | 12/1962 | Maginnis |
| 3,079,242 A | 2/1963 | Glasgow |
| 3,079,243 A | 2/1963 | Ueltz |
| 3,123,948 A | 3/1964 | Kistler et al. |
| 3,141,271 A | 7/1964 | Fischer et al. |
| 3,276,852 A | 10/1966 | Lemelson |
| 3,377,660 A | 4/1968 | Marshall et al. |
| 3,379,543 A | 4/1968 | Norwalk |
| 3,387,957 A | 6/1968 | Howard |
| 3,454,385 A | 7/1969 | Amero |
| 3,477,180 A | 11/1969 | Robertson, Jr. et al. |
| 3,480,395 A | 11/1969 | McMullen et al. |
| 3,481,723 A | 12/1969 | Kistler et al. |
| 3,491,492 A | 1/1970 | Ueltz |
| 3,495,359 A | 2/1970 | Smith et al. |
| 3,536,005 A | 10/1970 | Derrickson |
| 3,590,799 A | 7/1971 | Guuchowicz |
| 3,608,050 A | 9/1971 | Carman et al. |
| 3,608,134 A | 9/1971 | Cook |
| 3,615,308 A | 10/1971 | Amero |
| 3,619,151 A | 11/1971 | Sheets, Jr. et al. |
| 3,637,360 A | 1/1972 | Ueltz |
| 3,670,467 A | 6/1972 | Walker |
| 3,672,934 A | 6/1972 | Larry |
| 3,808,747 A | 5/1974 | Kenagy |
| 3,819,785 A | 6/1974 | Argyle et al. |
| 3,859,407 A | 1/1975 | Blanding et al. |
| 3,874,856 A | 4/1975 | Leeds |
| 3,909,991 A | 10/1975 | Coes, Jr. |
| 3,940,276 A | 2/1976 | Wilson |
| 3,950,148 A | 4/1976 | Fukuda et al. |
| 3,960,577 A | 6/1976 | Prochazka |
| 3,977,132 A | 8/1976 | Sekigawa |
| 3,986,885 A | 10/1976 | Lankard |
| 3,991,527 A | 11/1976 | Maran |
| 4,004,934 A | 1/1977 | Prochazka |
| 4,037,367 A | 7/1977 | Kruse |
| 4,045,919 A | 9/1977 | Moritomo |
| 4,055,451 A | 10/1977 | Cockbain et al. |
| 4,073,096 A | 2/1978 | Ueltz et al. |
| 4,114,322 A | 9/1978 | Greenspan |
| 4,150,078 A | 4/1979 | Miller et al. |
| 4,194,887 A | 3/1980 | Ueltz et al. |
| 4,252,544 A | 2/1981 | Takahashi |
| 4,261,706 A | 4/1981 | Blanding et al. |
| 4,286,905 A | 9/1981 | Samanta |
| 4,304,576 A | 12/1981 | Hattori et al. |
| 4,314,827 A | 2/1982 | Leitheiser et al. |
| 4,341,663 A | 7/1982 | Derleth et al. |
| 4,393,021 A | 7/1983 | Eisenberg et al. |
| 4,452,911 A | 6/1984 | Eccles et al. |
| 4,457,767 A | 7/1984 | Poon et al. |
| 4,469,758 A | 9/1984 | Scott |
| 4,505,720 A | 3/1985 | Gabor et al. |
| 4,541,842 A | 9/1985 | Rostoker |
| 4,548,617 A | 10/1985 | Miyatani et al. |
| 4,570,048 A | 2/1986 | Poole |
| 4,618,349 A | 10/1986 | Hashimoto et al. |
| 4,623,364 A | 11/1986 | Cottringer et al. |
| 4,656,330 A | 4/1987 | Poole |
| 4,657,754 A | 4/1987 | Bauer et al. |
| 4,659,341 A | 4/1987 | Ludwig et al. |
| 4,678,560 A | 7/1987 | Stole et al. |
| 4,711,750 A | 12/1987 | Scott |
| 4,728,043 A | 3/1988 | Ersdal et al. |
| 4,744,802 A | 5/1988 | Schwabel |
| 4,770,671 A | 9/1988 | Monroe |
| 4,786,292 A | 11/1988 | Janz et al. |
| 4,797,139 A | 1/1989 | Bauer |
| 4,797,269 A | 1/1989 | Bauer et al. |
| 4,799,939 A | 1/1989 | Bloecher et al. |
| 4,829,027 A | 5/1989 | Cutler et al. |
| 4,832,706 A | 5/1989 | Yates |
| 4,848,041 A | 7/1989 | Kruschke |
| 4,858,527 A | 8/1989 | Masanao |
| 4,860,721 A | 8/1989 | Matsuda |
| 4,863,573 A | 9/1989 | Moore et al. |
| 4,876,226 A | 10/1989 | Fuentes |
| 4,881,951 A | 11/1989 | Wood et al. |
| 4,917,852 A | 4/1990 | Poole et al. |
| 4,918,116 A | 4/1990 | Gardziella et al. |
| 4,925,457 A | 5/1990 | Dekok et al. |
| 4,925,815 A | 5/1990 | Tani et al. |
| 4,930,266 A | 6/1990 | Calhoun et al. |
| 4,942,011 A | 7/1990 | Bolt et al. |
| 4,954,462 A | 9/1990 | Wood |
| 4,960,441 A | 10/1990 | Pellow et al. |
| 4,961,757 A | 10/1990 | Rhodes et al. |
| 4,963,012 A | 10/1990 | Tracy |
| 4,964,883 A | 10/1990 | Morris et al. |
| 4,970,057 A | 11/1990 | Willkens et al. |
| 4,997,461 A | 3/1991 | Markhoff-Matheny et al. |
| 5,000,760 A | 3/1991 | Ohtsubo et al. |
| 5,008,222 A | 4/1991 | Kameda |
| 5,009,675 A | 4/1991 | Kunz et al. |
| 5,009,676 A | 4/1991 | Rue et al. |
| 5,011,508 A | 4/1991 | Wald et al. |
| 5,011,510 A | 4/1991 | Hayakawa et al. |
| 5,014,468 A | 5/1991 | Ravipati et al. |
| 5,024,795 A | 6/1991 | Kennedy et al. |
| 5,032,304 A | 7/1991 | Toyota |
| 5,035,723 A | 7/1991 | Kalinowski et al. |
| 5,035,724 A | 7/1991 | Pukari et al. |
| 5,042,991 A | 8/1991 | Kunz et al. |
| 5,049,165 A | 9/1991 | Tselesin |
| 5,049,166 A | 9/1991 | Kirkendall |
| 5,049,645 A | 9/1991 | Nagaoka et al. |
| 5,053,367 A | 10/1991 | Newkirk et al. |
| 5,053,369 A | 10/1991 | Winkler et al. |
| 5,076,991 A | 12/1991 | Poole et al. |
| 5,078,753 A | 1/1992 | Broberg et al. |
| 5,081,082 A | 1/1992 | Hai-Doo et al. |
| 5,085,671 A | 2/1992 | Martin et al. |
| 5,090,968 A | 2/1992 | Pellow |
| 5,094,986 A | 3/1992 | Matsumoto et al. |
| 5,098,740 A | 3/1992 | Tewari |
| 5,103,598 A | 4/1992 | Kelly |
| 5,108,963 A | 4/1992 | Fu et al. |
| 5,114,438 A | 5/1992 | Leatherman et al. |
| 5,120,327 A | 6/1992 | Dennis |
| 5,123,935 A | 6/1992 | Kanamaru et al. |
| 5,129,919 A | 7/1992 | Kalinowski et al. |
| 5,131,926 A | 7/1992 | Rostoker et al. |
| 5,132,984 A | 7/1992 | Simpson |
| 5,139,978 A | 8/1992 | Wood |
| 5,152,917 A | 10/1992 | Pieper et al. |
| 5,160,509 A | 11/1992 | Carman et al. |
| 5,164,744 A | 11/1992 | Yoshida et al. |
| 5,173,457 A | 12/1992 | Shorthouse |
| 5,178,849 A | 1/1993 | Bauer |
| 5,180,630 A | 1/1993 | Giglia |
| 5,185,012 A | 2/1993 | Kelly |
| 5,185,299 A | 2/1993 | Wood et al. |
| 5,190,568 A | 3/1993 | Tselesin |
| 5,194,072 A | 3/1993 | Rue et al. |
| 5,201,916 A | 4/1993 | Berg et al. |
| 5,203,886 A | 4/1993 | Sheldon et al. |
| 5,213,591 A | 5/1993 | Celikkaya et al. |
| 5,215,552 A | 6/1993 | Sung |
| 5,219,462 A | 6/1993 | Bruxvoort et al. |
| 5,219,806 A | 6/1993 | Wood |
| 5,221,294 A | 6/1993 | Carman et al. |
| 5,224,970 A | 7/1993 | Harakawa et al. |
| 5,227,104 A | 7/1993 | Bauer |
| 5,244,477 A | 9/1993 | Rue et al. |

(56) References Cited

U.S. PATENT DOCUMENTS

| | | |
|---|---|---|
| 5,244,849 A | 9/1993 | Roy et al. |
| 5,273,558 A | 12/1993 | Nelson et al. |
| 5,277,702 A | 1/1994 | Thibault et al. |
| 5,282,875 A | 2/1994 | Wood |
| 5,288,297 A | 2/1994 | Ringwood |
| 5,300,130 A | 4/1994 | Rostoker |
| 5,304,331 A | 4/1994 | Leonard et al. |
| 5,312,789 A | 5/1994 | Wood |
| 5,312,791 A | 5/1994 | Coblenz et al. |
| 5,314,513 A | 5/1994 | Miller et al. |
| 5,318,604 A | 6/1994 | Gorsuch et al. |
| 5,366,523 A | 11/1994 | Rowenhorst et al. |
| 5,366,525 A | 11/1994 | Fujiyama |
| 5,372,620 A | 12/1994 | Rowse et al. |
| 5,373,786 A | 12/1994 | Umaba |
| 5,376,598 A | 12/1994 | Preedy et al. |
| 5,376,602 A | 12/1994 | Nilsen |
| 5,383,945 A | 1/1995 | Cottringer et al. |
| 5,395,407 A | 3/1995 | Cottringer et al. |
| 5,409,645 A | 4/1995 | Torre, Jr. et al. |
| 5,429,648 A | 7/1995 | Wu |
| 5,431,967 A | 7/1995 | Manthiram |
| 5,435,816 A | 7/1995 | Spurgeon et al. |
| 5,437,754 A | 8/1995 | Calhoun |
| 5,441,549 A | 8/1995 | Helmin |
| 5,443,603 A | 8/1995 | Kirkendall |
| 5,447,894 A | 9/1995 | Yasuoka et al. |
| 5,453,106 A | 9/1995 | Roberts |
| 5,454,844 A | 10/1995 | Hibbard et al. |
| 5,470,806 A | 11/1995 | Krstic et al. |
| 5,479,873 A | 1/1996 | Shintani et al. |
| 5,482,756 A | 1/1996 | Berger et al. |
| 5,486,496 A | 1/1996 | Talbert et al. |
| 5,489,318 A | 2/1996 | Erickson et al. |
| 5,496,386 A | 3/1996 | Broberg et al. |
| 5,498,268 A | 3/1996 | Gagliardi et al. |
| 5,500,273 A | 3/1996 | Holmes et al. |
| 5,514,631 A | 5/1996 | Cottringer et al. |
| 5,516,347 A | 5/1996 | Garg |
| 5,516,348 A | 5/1996 | Conwell et al. |
| 5,523,074 A | 6/1996 | Takahashi et al. |
| 5,525,100 A | 6/1996 | Kelly et al. |
| 5,527,369 A | 6/1996 | Garg |
| 5,543,368 A | 8/1996 | Talbert et al. |
| 5,549,962 A | 8/1996 | Holmes et al. |
| 5,551,963 A | 9/1996 | Larmie |
| 5,560,745 A | 10/1996 | Roberts |
| 5,567,150 A | 10/1996 | Conwell et al. |
| 5,567,214 A | 10/1996 | Ashley |
| 5,567,251 A | 10/1996 | Peker et al. |
| 5,571,297 A | 11/1996 | Swei et al. |
| 5,576,409 A | 11/1996 | Mackey |
| 5,578,095 A | 11/1996 | Bland et al. |
| 5,578,222 A | 11/1996 | Trischuk et al. |
| 5,582,625 A | 12/1996 | Wright et al. |
| 5,584,896 A | 12/1996 | Broberg et al. |
| 5,584,897 A | 12/1996 | Christianson et al. |
| 5,591,685 A | 1/1997 | Mitomo et al. |
| 5,593,468 A | 1/1997 | Khaund et al. |
| 5,599,493 A | 2/1997 | Ito et al. |
| 5,603,738 A | 2/1997 | Zeiringer et al. |
| 5,609,706 A | 3/1997 | Benedict et al. |
| 5,611,829 A | 3/1997 | Monroe et al. |
| 5,618,221 A | 4/1997 | Furukawa et al. |
| 5,628,952 A | 5/1997 | Holmes et al. |
| 5,641,469 A | 6/1997 | Garg et al. |
| RE35,570 E | 7/1997 | Rowenhorst et al. |
| 5,645,619 A | 7/1997 | Erickson et al. |
| 5,651,925 A | 7/1997 | Ashley et al. |
| 5,656,217 A | 8/1997 | Rogers et al. |
| 5,667,542 A | 9/1997 | Law et al. |
| 5,669,941 A | 9/1997 | Peterson |
| 5,669,943 A | 9/1997 | Horton et al. |
| 5,672,097 A | 9/1997 | Hoopman |
| 5,672,554 A | 9/1997 | Mohri et al. |
| 5,683,844 A | 11/1997 | Mammino |
| 5,702,811 A | 12/1997 | Ho et al. |
| 5,725,162 A | 3/1998 | Garg et al. |
| 5,736,619 A | 4/1998 | Kane et al. |
| 5,738,696 A | 4/1998 | Wu |
| 5,738,697 A | 4/1998 | Wu et al. |
| 5,751,313 A | 5/1998 | Miyashita et al. |
| 5,759,481 A | 6/1998 | Pujari et al. |
| 5,776,214 A | 7/1998 | Wood |
| 5,779,743 A | 7/1998 | Wood |
| 5,785,722 A | 7/1998 | Garg et al. |
| 5,810,587 A | 9/1998 | Bruns et al. |
| 5,820,450 A | 10/1998 | Calhoun |
| 5,830,248 A | 11/1998 | Christianson et al. |
| 5,840,089 A | 11/1998 | Chesley et al. |
| 5,849,646 A | 12/1998 | Stout et al. |
| 5,855,997 A | 1/1999 | Amateau |
| 5,863,306 A | 1/1999 | Wei et al. |
| 5,866,254 A | 2/1999 | Peker et al. |
| 5,876,793 A | 3/1999 | Sherman et al. |
| 5,885,311 A | 3/1999 | McCutcheon et al. |
| 5,893,935 A | 4/1999 | Wood |
| 5,902,647 A | 5/1999 | Venkataramani |
| 5,908,477 A | 6/1999 | Harmer et al. |
| 5,908,478 A | 6/1999 | Wood |
| 5,919,549 A | 7/1999 | Van et al. |
| 5,924,917 A | 7/1999 | Benedict et al. |
| 5,946,991 A | 9/1999 | Hoopman |
| 5,975,987 A | 11/1999 | Hoopman et al. |
| 5,980,678 A | 11/1999 | Tselesin |
| 5,984,988 A | 11/1999 | Berg et al. |
| 5,989,301 A | 11/1999 | Laconto, Sr. et al. |
| 5,997,597 A | 12/1999 | Hagan |
| 6,016,660 A | 1/2000 | Abramshe |
| 6,019,805 A | 2/2000 | Herron |
| 6,024,824 A | 2/2000 | Krech |
| 6,027,326 A | 2/2000 | Cesarano, III et al. |
| 6,039,775 A | 3/2000 | Ho et al. |
| 6,048,577 A | 4/2000 | Garg |
| 6,053,956 A | 4/2000 | Wood |
| 6,054,093 A | 4/2000 | Torre, Jr. et al. |
| 6,080,215 A | 6/2000 | Stubbs et al. |
| 6,080,216 A | 6/2000 | Erickson |
| 6,083,622 A | 7/2000 | Garg et al. |
| 6,096,107 A | 8/2000 | Caracostas et al. |
| 6,110,241 A | 8/2000 | Sung |
| 6,129,540 A | 10/2000 | Hoopman et al. |
| 6,136,288 A | 10/2000 | Bauer et al. |
| 6,146,247 A | 11/2000 | Nokubi et al. |
| 6,179,887 B1 | 1/2001 | Barber, Jr. |
| 6,206,942 B1 | 3/2001 | Wood |
| 6,228,134 B1 | 5/2001 | Erickson |
| 6,238,450 B1 | 5/2001 | Garg et al. |
| 6,258,137 B1 | 7/2001 | Garg et al. |
| 6,258,141 B1 | 7/2001 | Sung et al. |
| 6,261,682 B1 | 7/2001 | Law |
| 6,264,710 B1 | 7/2001 | Erickson |
| 6,277,160 B1 | 8/2001 | Stubbs et al. |
| 6,277,161 B1 | 8/2001 | Castro et al. |
| 6,283,997 B1 | 9/2001 | Garg et al. |
| 6,284,690 B1 | 9/2001 | Nakahata et al. |
| 6,287,353 B1 | 9/2001 | Celikkaya |
| 6,306,007 B1 | 10/2001 | Mori et al. |
| 6,312,324 B1 | 11/2001 | Mitsui et al. |
| 6,319,108 B1 | 11/2001 | Adefris et al. |
| 6,331,343 B1 | 12/2001 | Perez et al. |
| 6,371,842 B1 | 4/2002 | Romero |
| 6,391,812 B1 | 5/2002 | Araki et al. |
| 6,398,989 B1 | 6/2002 | Bergstrom |
| 6,401,795 B1 | 6/2002 | Cesarano, III et al. |
| 6,403,001 B1 | 6/2002 | Hayashi |
| 6,413,286 B1 | 7/2002 | Swei et al. |
| 6,428,392 B1 | 8/2002 | Sunahara et al. |
| 6,451,076 B1 | 9/2002 | Nevoret et al. |
| 6,475,253 B2 | 11/2002 | Culler et al. |
| 6,500,493 B2 | 12/2002 | Swei et al. |
| 6,511,938 B1 | 1/2003 | Liu |
| 6,524,681 B1 | 2/2003 | Seitz et al. |
| 6,531,423 B1 | 3/2003 | Schwetz et al. |

(56) References Cited

U.S. PATENT DOCUMENTS

| | | |
|---|---|---|
| 6,537,140 B1 | 3/2003 | Miller et al. |
| 6,579,819 B2 | 6/2003 | Hirosaki et al. |
| 6,582,623 B1 | 6/2003 | Grumbine et al. |
| 6,583,080 B1 | 6/2003 | Rosenflanz |
| 6,599,177 B2 | 7/2003 | Nevoret et al. |
| 6,613,113 B2 | 9/2003 | Minick et al. |
| 6,646,019 B2 | 11/2003 | Perez et al. |
| 6,652,361 B1 | 11/2003 | Gash et al. |
| 6,669,745 B2 | 12/2003 | Prichard et al. |
| 6,685,755 B2 | 2/2004 | Ramanath et al. |
| 6,696,258 B1 | 2/2004 | Wei |
| 6,702,650 B2 | 3/2004 | Adefris |
| 6,737,378 B2 | 5/2004 | Hirosaki et al. |
| 6,749,496 B2 | 6/2004 | Mota et al. |
| 6,750,173 B2 | 6/2004 | Rizkalla |
| 6,752,700 B2 | 6/2004 | Duescher |
| 6,755,729 B2 | 6/2004 | Ramanath et al. |
| 6,802,878 B1 | 10/2004 | Monroe |
| 6,821,196 B2 | 11/2004 | Oliver |
| 6,833,014 B2 | 12/2004 | Welygan et al. |
| 6,843,815 B1 | 1/2005 | Thurber et al. |
| 6,846,795 B2 | 1/2005 | Lant et al. |
| 6,878,456 B2 | 4/2005 | Castro et al. |
| 6,881,483 B2 | 4/2005 | McArdle et al. |
| 6,888,360 B1 | 5/2005 | Connell et al. |
| 6,913,824 B2 | 7/2005 | Culler et al. |
| 6,942,561 B2 | 9/2005 | Mota et al. |
| 6,949,128 B2 | 9/2005 | Annen |
| 6,951,504 B2 | 10/2005 | Adefris et al. |
| 6,974,930 B2 | 12/2005 | Jense |
| 7,022,179 B1 | 4/2006 | Dry |
| 7,044,989 B2 | 5/2006 | Welygan et al. |
| 7,097,679 B2 | 8/2006 | Wurzer et al. |
| 7,112,621 B2 | 9/2006 | Rohrbaugh et al. |
| 7,141,522 B2 | 11/2006 | Rosenflanz et al. |
| 7,168,267 B2 | 1/2007 | Rosenflanz et al. |
| 7,169,198 B2 | 1/2007 | Moeltgen et al. |
| 7,267,604 B2 | 9/2007 | Yoshizawa et al. |
| 7,267,700 B2 | 9/2007 | Collins et al. |
| 7,294,158 B2 | 11/2007 | Welygan et al. |
| 7,297,170 B2 | 11/2007 | Welygan et al. |
| 7,297,402 B2 | 11/2007 | Evans et al. |
| 7,364,788 B2 | 4/2008 | Kishbaugh et al. |
| 7,373,887 B2 | 5/2008 | Jackson |
| 7,384,437 B2 | 6/2008 | Welygan et al. |
| 7,404,832 B2 | 7/2008 | Ohtsubo et al. |
| 7,488,544 B2 | 2/2009 | Schofalvi et al. |
| 7,507,268 B2 | 3/2009 | Rosenflanz |
| 7,553,346 B2 | 6/2009 | Welygan et al. |
| 7,556,558 B2 | 7/2009 | Palmgren |
| 7,560,062 B2 | 7/2009 | Gould et al. |
| 7,560,139 B2 | 7/2009 | Thebault et al. |
| 7,563,293 B2 | 7/2009 | Rosenflanz |
| 7,611,795 B2 | 11/2009 | Aoyama et al. |
| 7,618,684 B2 | 11/2009 | Nesbitt |
| 7,632,434 B2 | 12/2009 | Duescher |
| 7,651,386 B2 | 1/2010 | Sung |
| 7,662,735 B2 | 2/2010 | Rosenflanz et al. |
| 7,666,344 B2 | 2/2010 | Schofalvi et al. |
| 7,666,475 B2 | 2/2010 | Morrison |
| 7,669,658 B2 | 3/2010 | Barron et al. |
| 7,670,679 B2 | 3/2010 | Krishna et al. |
| 7,695,542 B2 | 4/2010 | Drivdahl et al. |
| 7,858,189 B2 | 12/2010 | Wagener et al. |
| 7,867,302 B2 | 1/2011 | Nevoret et al. |
| 7,906,057 B2 | 3/2011 | Zhang et al. |
| 7,968,147 B2 | 6/2011 | Fang et al. |
| 7,972,430 B2 | 7/2011 | Millard et al. |
| 8,021,449 B2 | 9/2011 | Seth et al. |
| 8,034,137 B2 | 10/2011 | Erickson et al. |
| 8,049,136 B2 | 11/2011 | Mase et al. |
| 8,070,556 B2 | 12/2011 | Kumar et al. |
| 8,123,828 B2 | 2/2012 | Culler et al. |
| 8,141,484 B2 | 3/2012 | Ojima et al. |
| 8,142,531 B2 | 3/2012 | Adefris et al. |
| 8,142,532 B2 | 3/2012 | Erickson et al. |
| 8,142,891 B2 | 3/2012 | Culler et al. |
| 8,251,774 B2 | 8/2012 | Joseph et al. |
| 8,256,091 B2 | 9/2012 | Duescher |
| 8,333,360 B2 | 12/2012 | Rule et al. |
| 8,440,602 B2 | 5/2013 | Gonzales et al. |
| 8,440,603 B2 | 5/2013 | Gonzales et al. |
| 8,445,422 B2 | 5/2013 | Gonzales et al. |
| 8,470,759 B2 | 6/2013 | Gonzales et al. |
| 8,480,772 B2 | 7/2013 | Welygan et al. |
| 8,530,682 B2 | 9/2013 | Sachs |
| 8,568,497 B2 | 10/2013 | Sheridan |
| 8,628,597 B2 | 1/2014 | Palmgren et al. |
| 8,783,589 B2 | 7/2014 | Hart et al. |
| 8,852,643 B2 | 10/2014 | Gonzales et al. |
| 8,920,527 B2 | 12/2014 | Seider et al. |
| 8,921,687 B1 | 12/2014 | Welser |
| 9,017,439 B2 | 4/2015 | Yener et al. |
| 9,079,154 B2 | 7/2015 | Rosendahl |
| 9,181,477 B2 | 11/2015 | Collins et al. |
| 9,211,634 B2 | 12/2015 | Rehrig et al. |
| 9,259,726 B2 | 2/2016 | Gopal |
| 9,375,826 B2 | 6/2016 | Tian et al. |
| 9,717,674 B1 | 8/2017 | Guskey et al. |
| 9,758,724 B2 | 9/2017 | Collins et al. |
| 9,982,175 B2 | 5/2018 | Sarangi et al. |
| D849,066 S | 5/2019 | Hanschen et al. |
| D849,067 S | 5/2019 | Hanschen et al. |
| 10,351,745 B2* | 7/2019 | Josseaux .................... B01J 2/20 |
| 10,364,383 B2 | 7/2019 | Yener et al. |
| D862,538 S | 10/2019 | Hanschen et al. |
| D870,782 S | 12/2019 | Hanschen et al. |
| 10,556,323 B2 | 2/2020 | Alkhas et al. |
| 10,557,068 B2 | 2/2020 | Oldenkotte et al. |
| 10,563,105 B2 | 2/2020 | Cotter et al. |
| 10,655,038 B2 | 5/2020 | Martinez et al. |
| 10,710,211 B2 | 7/2020 | Lehuu et al. |
| 10,717,908 B2 | 7/2020 | Hejtmann et al. |
| 11,608,459 B2* | 3/2023 | Josseaux .................... B01J 2/26 |
| 2001/0027623 A1 | 10/2001 | Rosenflanz |
| 2002/0026752 A1 | 3/2002 | Culler et al. |
| 2002/0068518 A1 | 6/2002 | Cesena et al. |
| 2002/0084290 A1 | 7/2002 | Materna |
| 2002/0090891 A1 | 7/2002 | Adefris et al. |
| 2002/0151265 A1 | 10/2002 | Adefris |
| 2002/0170236 A1 | 11/2002 | Larson et al. |
| 2002/0174935 A1 | 11/2002 | Burdon et al. |
| 2002/0177391 A1 | 11/2002 | Fritz et al. |
| 2003/0008933 A1 | 1/2003 | Perez et al. |
| 2003/0022961 A1 | 1/2003 | Kusaka et al. |
| 2003/0029094 A1 | 2/2003 | Moeltgen et al. |
| 2003/0085204 A1 | 5/2003 | Lagos |
| 2003/0109371 A1 | 6/2003 | Pujari et al. |
| 2003/0110707 A1 | 6/2003 | Rosenflanz et al. |
| 2003/0126800 A1 | 7/2003 | Seth et al. |
| 2003/0228738 A1 | 12/2003 | Beaudoin |
| 2004/0003895 A1 | 1/2004 | Amano et al. |
| 2004/0148868 A1 | 8/2004 | Anderson et al. |
| 2004/0148967 A1 | 8/2004 | Celikkaya et al. |
| 2004/0202844 A1 | 10/2004 | Wong |
| 2004/0224125 A1 | 11/2004 | Yamada et al. |
| 2004/0235406 A1 | 11/2004 | Duescher |
| 2004/0244675 A1 | 12/2004 | Kishimoto et al. |
| 2005/0020190 A1 | 1/2005 | Schutz et al. |
| 2005/0060941 A1 | 3/2005 | Provow et al. |
| 2005/0060947 A1 | 3/2005 | McArdle et al. |
| 2005/0064805 A1 | 3/2005 | Culler et al. |
| 2005/0081455 A1 | 4/2005 | Welygan et al. |
| 2005/0118939 A1 | 6/2005 | Duescher |
| 2005/0132655 A1 | 6/2005 | Anderson et al. |
| 2005/0218565 A1 | 10/2005 | DiChiara, Jr. |
| 2005/0223649 A1 | 10/2005 | O'Gary et al. |
| 2005/0232853 A1 | 10/2005 | Evans et al. |
| 2005/0245179 A1 | 11/2005 | Luedeke |
| 2005/0255801 A1 | 11/2005 | Pollasky |
| 2005/0266221 A1 | 12/2005 | Karam et al. |
| 2005/0271795 A1 | 12/2005 | Moini et al. |
| 2005/0284029 A1 | 12/2005 | Bourlier et al. |
| 2006/0049540 A1 | 3/2006 | Hui et al. |

(56) References Cited

U.S. PATENT DOCUMENTS

| | | |
|---|---|---|
| 2006/0126265 A1 | 6/2006 | Crespi et al. |
| 2006/0135050 A1 | 6/2006 | Petersen et al. |
| 2006/0177488 A1 | 8/2006 | Caruso et al. |
| 2006/0185256 A1 | 8/2006 | Nevoret et al. |
| 2007/0011951 A1 | 1/2007 | Gaeta et al. |
| 2007/0020457 A1 | 1/2007 | Adefris |
| 2007/0051355 A1 | 3/2007 | Sung |
| 2007/0072527 A1 | 3/2007 | Palmgren |
| 2007/0074456 A1 | 4/2007 | Orlhac et al. |
| 2007/0087928 A1 | 4/2007 | Rosenflanz et al. |
| 2007/0234646 A1 | 10/2007 | Can et al. |
| 2008/0017053 A1 | 1/2008 | Araumi et al. |
| 2008/0072500 A1 | 3/2008 | Klett et al. |
| 2008/0098659 A1 | 5/2008 | Sung |
| 2008/0121124 A1 | 5/2008 | Sato |
| 2008/0172951 A1 | 7/2008 | Starling |
| 2008/0176075 A1 | 7/2008 | Bauer et al. |
| 2008/0179783 A1 | 7/2008 | Liu et al. |
| 2008/0230951 A1 | 9/2008 | Dannoux et al. |
| 2008/0233845 A1 | 9/2008 | Annen et al. |
| 2008/0262577 A1 | 10/2008 | Altshuler et al. |
| 2008/0271384 A1 | 11/2008 | Puthanangady et al. |
| 2008/0286590 A1 | 11/2008 | Besida et al. |
| 2008/0299875 A1 | 12/2008 | Duescher |
| 2009/0016916 A1 | 1/2009 | Rosenzweig et al. |
| 2009/0017276 A1 | 1/2009 | Hoglund et al. |
| 2009/0017736 A1 | 1/2009 | Block et al. |
| 2009/0098365 A1 | 4/2009 | Moeltgen |
| 2009/0165394 A1 | 7/2009 | Culler et al. |
| 2009/0165661 A1 | 7/2009 | Koenig et al. |
| 2009/0169816 A1 | 7/2009 | Erickson et al. |
| 2009/0208734 A1 | 8/2009 | Macfie et al. |
| 2009/0246464 A1 | 10/2009 | Watanabe et al. |
| 2010/0000159 A1 | 1/2010 | Walia et al. |
| 2010/0003900 A1 | 1/2010 | Sakaguchi et al. |
| 2010/0003904 A1 | 1/2010 | Duescher |
| 2010/0040767 A1 | 2/2010 | Uibel et al. |
| 2010/0056816 A1 | 3/2010 | Wallin et al. |
| 2010/0064594 A1 | 3/2010 | Pakalapati et al. |
| 2010/0068974 A1 | 3/2010 | Dumm |
| 2010/0146867 A1 | 6/2010 | Boden et al. |
| 2010/0151195 A1 | 6/2010 | Culler et al. |
| 2010/0151196 A1 | 6/2010 | Adefris et al. |
| 2010/0151201 A1 | 6/2010 | Erickson et al. |
| 2010/0190424 A1 | 7/2010 | Francois et al. |
| 2010/0201018 A1 | 8/2010 | Yoshioka et al. |
| 2010/0251625 A1 | 10/2010 | Gaeta |
| 2010/0292428 A1 | 11/2010 | Meador et al. |
| 2010/0307067 A1 | 12/2010 | Sigalas et al. |
| 2010/0317262 A1* | 12/2010 | Boutaghou ........ B24D 18/0009 51/297 |
| 2010/0319269 A1 | 12/2010 | Erickson |
| 2010/0330886 A1 | 12/2010 | Wu et al. |
| 2011/0008604 A1 | 1/2011 | Boylan |
| 2011/0023376 A1 | 2/2011 | Linnenbrink |
| 2011/0081848 A1 | 4/2011 | Chen |
| 2011/0092137 A1 | 4/2011 | Ohishi et al. |
| 2011/0111563 A1 | 5/2011 | Yanagi et al. |
| 2011/0124483 A1 | 5/2011 | Shah et al. |
| 2011/0136659 A1 | 6/2011 | Allen et al. |
| 2011/0146509 A1 | 6/2011 | Welygan et al. |
| 2011/0152548 A1 | 6/2011 | Sachs |
| 2011/0160104 A1 | 6/2011 | Wu et al. |
| 2011/0244769 A1 | 10/2011 | David et al. |
| 2011/0289854 A1 | 12/2011 | Moren et al. |
| 2011/0314746 A1 | 12/2011 | Erickson et al. |
| 2012/0000135 A1 | 1/2012 | Eilers et al. |
| 2012/0034847 A1 | 2/2012 | Besse et al. |
| 2012/0055098 A1 | 3/2012 | Ramanath et al. |
| 2012/0100366 A1 | 4/2012 | Dumm et al. |
| 2012/0137597 A1 | 6/2012 | Adefris et al. |
| 2012/0144754 A1 | 6/2012 | Culler et al. |
| 2012/0144755 A1 | 6/2012 | Erickson et al. |
| 2012/0153547 A1 | 6/2012 | Bauer et al. |
| 2012/0167481 A1 | 7/2012 | Yener et al. |
| 2012/0168979 A1 | 7/2012 | Bauer et al. |
| 2012/0227333 A1 | 9/2012 | Adefris et al. |
| 2012/0231711 A1 | 9/2012 | Keipert et al. |
| 2012/0308837 A1 | 12/2012 | Schlechtriemen et al. |
| 2012/0321567 A1 | 12/2012 | Gonzales et al. |
| 2013/0000212 A1 | 1/2013 | Wang et al. |
| 2013/0000216 A1 | 1/2013 | Wang et al. |
| 2013/0009484 A1 | 1/2013 | Yu |
| 2013/0036402 A1 | 2/2013 | Mutisya et al. |
| 2013/0045251 A1 | 2/2013 | Cen et al. |
| 2013/0067669 A1 | 3/2013 | Gonzales et al. |
| 2013/0072417 A1 | 3/2013 | Perez-Prat et al. |
| 2013/0074418 A1 | 3/2013 | Panzarella et al. |
| 2013/0125477 A1 | 5/2013 | Adefris |
| 2013/0180180 A1 | 7/2013 | Yener et al. |
| 2013/0186005 A1 | 7/2013 | Kavanaugh |
| 2013/0186006 A1 | 7/2013 | Kavanaugh et al. |
| 2013/0199105 A1 | 8/2013 | Braun et al. |
| 2013/0203328 A1 | 8/2013 | Givot et al. |
| 2013/0212952 A1 | 8/2013 | Welygan et al. |
| 2013/0236725 A1 | 9/2013 | Yener et al. |
| 2013/0255162 A1 | 10/2013 | Welygan et al. |
| 2013/0260656 A1 | 10/2013 | Seth et al. |
| 2013/0267150 A1 | 10/2013 | Seider et al. |
| 2013/0283705 A1 | 10/2013 | Fischer et al. |
| 2013/0296587 A1 | 11/2013 | Rosendahl |
| 2013/0305614 A1 | 11/2013 | Gaeta et al. |
| 2013/0337262 A1 | 12/2013 | Bauer et al. |
| 2013/0337725 A1 | 12/2013 | Monroe |
| 2013/0344786 A1 | 12/2013 | Keipert |
| 2014/0000176 A1 | 1/2014 | Moren et al. |
| 2014/0007518 A1 | 1/2014 | Yener et al. |
| 2014/0080393 A1 | 3/2014 | Ludwig |
| 2014/0106126 A1 | 4/2014 | Gaeta et al. |
| 2014/0107356 A1 | 4/2014 | Gopal |
| 2014/0182216 A1 | 7/2014 | Panzarella et al. |
| 2014/0182217 A1 | 7/2014 | Yener et al. |
| 2014/0186585 A1 | 7/2014 | Field, III et al. |
| 2014/0250797 A1 | 9/2014 | Yener et al. |
| 2014/0256238 A1 | 9/2014 | Van et al. |
| 2014/0287658 A1 | 9/2014 | Flaschberger et al. |
| 2014/0290147 A1 | 10/2014 | Seth et al. |
| 2014/0345205 A1 | 11/2014 | Kavanaugh et al. |
| 2014/0352721 A1 | 12/2014 | Gonzales et al. |
| 2014/0352722 A1 | 12/2014 | Gonzales et al. |
| 2014/0357544 A1 | 12/2014 | Gonzales et al. |
| 2014/0378036 A1 | 12/2014 | Cichowlas et al. |
| 2015/0000209 A1 | 1/2015 | Louapre et al. |
| 2015/0000210 A1 | 1/2015 | Breder et al. |
| 2015/0007399 A1 | 1/2015 | Gonzales et al. |
| 2015/0007400 A1 | 1/2015 | Gonzales et al. |
| 2015/0089881 A1 | 4/2015 | Stevenson et al. |
| 2015/0126098 A1 | 5/2015 | Eilers et al. |
| 2015/0128505 A1 | 5/2015 | Wang et al. |
| 2015/0183089 A1 | 7/2015 | Iyengar et al. |
| 2015/0209932 A1 | 7/2015 | Lehuu et al. |
| 2015/0218430 A1 | 8/2015 | Yener et al. |
| 2015/0232727 A1 | 8/2015 | Erickson |
| 2015/0267099 A1 | 9/2015 | Panzarella et al. |
| 2015/0291865 A1 | 10/2015 | Breder et al. |
| 2015/0291866 A1 | 10/2015 | Arcona et al. |
| 2015/0291867 A1 | 10/2015 | Breder et al. |
| 2015/0343603 A1 | 12/2015 | Breder et al. |
| 2016/0090516 A1 | 3/2016 | Yener et al. |
| 2016/0107290 A1 | 4/2016 | Bajaj et al. |
| 2016/0177152 A1 | 6/2016 | Braun |
| 2016/0177153 A1 | 6/2016 | Josseaux |
| 2016/0177154 A1 | 6/2016 | Josseaux et al. |
| 2016/0186028 A1 | 6/2016 | Louapare et al. |
| 2016/0214903 A1 | 7/2016 | Humpal et al. |
| 2016/0298013 A1 | 10/2016 | Bock et al. |
| 2016/0303704 A1 | 10/2016 | Chou et al. |
| 2016/0303705 A1 | 10/2016 | Chou et al. |
| 2016/0304760 A1 | 10/2016 | Bock et al. |
| 2016/0311081 A1 | 10/2016 | Culler et al. |
| 2016/0311084 A1 | 10/2016 | Culler et al. |
| 2016/0326416 A1 | 11/2016 | Bauer et al. |
| 2016/0340564 A1 | 11/2016 | Louapre et al. |
| 2016/0354898 A1 | 12/2016 | Nienaber et al. |

(56) References Cited

U.S. PATENT DOCUMENTS

| | | |
|---|---|---|
| 2016/0362589 A1 | 12/2016 | Bauer et al. |
| 2017/0066099 A1 | 3/2017 | Nakamura |
| 2017/0114260 A1 | 4/2017 | Bock et al. |
| 2017/0129075 A1 | 5/2017 | Thurber et al. |
| 2017/0225299 A1 | 8/2017 | Keipert et al. |
| 2017/0335156 A1 | 11/2017 | Bauer et al. |
| 2017/0349797 A1 | 12/2017 | Yener et al. |
| 2018/0086957 A1 | 3/2018 | Sahlin et al. |
| 2018/0161960 A1 | 6/2018 | Wilson et al. |
| 2018/0169837 A1 | 6/2018 | Liu |
| 2018/0215975 A1 | 8/2018 | Marazano et al. |
| 2018/0215976 A1 | 8/2018 | Cotter et al. |
| 2018/0318983 A1 | 11/2018 | Wilson et al. |
| 2019/0022826 A1 | 1/2019 | Franke et al. |
| 2019/0030684 A1 | 1/2019 | Van et al. |
| 2019/0091835 A1 | 3/2019 | Culler et al. |
| 2019/0126436 A1 | 5/2019 | Westberg et al. |
| 2019/0217442 A1 | 7/2019 | Gaeta et al. |
| 2019/0249052 A1 | 8/2019 | Eckel et al. |
| 2019/0270182 A1 | 9/2019 | Eckel et al. |
| 2019/0309201 A1 | 10/2019 | Dumont et al. |
| 2019/0322915 A1 | 10/2019 | Jiwpanich et al. |
| 2019/0330505 A1 | 10/2019 | Bujnowski et al. |
| 2019/0337124 A1 | 11/2019 | Liu et al. |
| 2019/0338172 A1 | 11/2019 | Erickson et al. |
| 2019/0338173 A1 | 11/2019 | Yener et al. |
| 2019/0351531 A1 | 11/2019 | Nelson et al. |
| 2019/0366511 A1 | 12/2019 | Huber |
| 2019/0382637 A1 | 12/2019 | Braun et al. |
| 2020/0139512 A1 | 5/2020 | Culler et al. |
| 2020/0148927 A1 | 5/2020 | Arcona et al. |
| 2020/0156215 A1 | 5/2020 | Jusuf et al. |
| 2020/0157396 A1 | 5/2020 | Cotter et al. |
| 2020/0157397 A1 | 5/2020 | Stevenson et al. |
| 2020/0199426 A1 | 6/2020 | Yener et al. |
| 2020/0262031 A1 | 8/2020 | Seth et al. |
| 2023/0061952 A1 | 3/2023 | Lentz et al. |
| 2023/0220255 A1 | 7/2023 | Yuyang et al. |
| 2023/0265326 A1 | 8/2023 | Adefris |
| 2023/0294247 A1 | 9/2023 | Liu et al. |

FOREIGN PATENT DOCUMENTS

| | | |
|---|---|---|
| CH | 685051 A5 | 3/1995 |
| CN | 1229007 A | 7/2005 |
| CN | 1774488 A | 5/2006 |
| CN | 101389466 A | 3/2009 |
| CN | 101970347 A | 2/2011 |
| CN | 101980836 A | 2/2011 |
| CN | 102281992 A | 12/2011 |
| CN | 102892553 A | 1/2013 |
| CN | 103189164 A | 7/2013 |
| CN | 103842132 A | 6/2014 |
| CN | 102123837 B | 7/2014 |
| CN | 104114666 A | 10/2014 |
| CN | 104125875 A | 10/2014 |
| CN | 104994995 A | 10/2015 |
| CN | 105622071 A | 6/2016 |
| CN | 105713568 A | 6/2016 |
| DE | 3923671 C2 | 2/1998 |
| DE | 102012023688 A1 | 4/2014 |
| DE | 202014101739 U1 | 6/2014 |
| DE | 202014101741 U1 | 6/2014 |
| DE | 102013202204 A1 | 8/2014 |
| DE | 102013210158 A1 | 12/2014 |
| DE | 102013210716 A1 | 12/2014 |
| DE | 102013212598 A1 | 12/2014 |
| DE | 102013212622 A1 | 12/2014 |
| DE | 102013212634 A1 | 12/2014 |
| DE | 102013212639 A1 | 12/2014 |
| DE | 102013212644 A1 | 12/2014 |
| DE | 102013212653 A1 | 12/2014 |
| DE | 102013212654 A1 | 12/2014 |
| DE | 102013212661 A1 | 12/2014 |
| DE | 102013212666 A1 | 12/2014 |
| DE | 102013212677 A1 | 12/2014 |
| DE | 102013212680 A1 | 12/2014 |
| DE | 102013212687 A1 | 12/2014 |
| DE | 102013212690 A1 | 12/2014 |
| DE | 102013212700 A1 | 12/2014 |
| DE | 102014210836 A1 | 12/2014 |
| EP | 0046374 A2 | 2/1982 |
| EP | 0078896 A2 | 5/1983 |
| EP | 0152768 A2 | 8/1985 |
| EP | 0293163 A2 | 11/1988 |
| EP | 0480133 A2 | 4/1992 |
| EP | 0652919 A1 | 5/1995 |
| EP | 0662110 A1 | 7/1995 |
| EP | 0500369 B1 | 1/1996 |
| EP | 0609864 B1 | 11/1996 |
| EP | 0771769 | 5/1997 |
| EP | 0812456 B1 | 12/1997 |
| EP | 0651778 B1 | 5/1998 |
| EP | 0614861 B1 | 5/2001 |
| EP | 0931032 B1 | 7/2001 |
| EP | 0833803 | 8/2001 |
| EP | 1207015 A2 | 5/2002 |
| EP | 1356152 A2 | 10/2003 |
| EP | 1371451 A1 | 12/2003 |
| EP | 1383631 A1 | 1/2004 |
| EP | 1015181 B1 | 3/2004 |
| EP | 1492845 A1 | 1/2005 |
| EP | 1851007 | 11/2007 |
| EP | 1960157 A1 | 8/2008 |
| EP | 2176031 A1 | 4/2010 |
| EP | 2184134 A1 | 5/2010 |
| EP | 2242618 A2 | 10/2010 |
| EP | 2390056 A2 | 11/2011 |
| EP | 1800801 B1 | 3/2012 |
| EP | 2445982 A2 | 5/2012 |
| EP | 2507016 A2 | 10/2012 |
| EP | 2537917 A1 | 12/2012 |
| EP | 2567784 A1 | 3/2013 |
| EP | 2631286 A1 | 8/2013 |
| EP | 2692813 A1 | 2/2014 |
| EP | 2692814 A1 | 2/2014 |
| EP | 2692815 A1 | 2/2014 |
| EP | 2692816 A1 | 2/2014 |
| EP | 2692817 A1 | 2/2014 |
| EP | 2692818 A1 | 2/2014 |
| EP | 2692819 A1 | 2/2014 |
| EP | 2692820 A1 | 2/2014 |
| EP | 2692821 A1 | 2/2014 |
| EP | 2719752 A1 | 4/2014 |
| EP | 2012972 B1 | 6/2014 |
| EP | 2720676 B1 | 1/2018 |
| EP | 3319758 A1 | 5/2018 |
| EP | 3342839 A1 | 7/2018 |
| EP | 3444313 B1 | 7/2020 |
| EP | 3830211 A1 | 6/2021 |
| FR | 2354373 A1 | 1/1978 |
| GB | 986847 A | 3/1965 |
| GB | 1456765 A | 11/1976 |
| GB | 1466054 | 3/1977 |
| JP | 53064890 A | 6/1978 |
| JP | 60-006356 U | 1/1985 |
| JP | 62002946 B | 1/1987 |
| JP | 63036905 B | 7/1988 |
| JP | 03079277 A | 4/1991 |
| JP | 03-287687 | 12/1991 |
| JP | 05285833 A | 11/1993 |
| JP | 06114739 A | 4/1994 |
| JP | 07008474 B2 | 2/1995 |
| JP | 3030861 U | 8/1996 |
| JP | 10113875 A | 5/1998 |
| JP | 2779252 B2 | 7/1998 |
| JP | 10330734 A | 12/1998 |
| JP | H10315142 A | 12/1998 |
| JP | 2957492 B2 | 10/1999 |
| JP | 2000091280 A | 3/2000 |
| JP | 2000-336344 A | 12/2000 |
| JP | 2000354967 A | 12/2000 |
| JP | 3160084 B2 | 4/2001 |
| JP | 2001162541 A | 6/2001 |

(56) References Cited

FOREIGN PATENT DOCUMENTS

| | | |
|---|---|---|
| JP | 3194269 B2 | 7/2001 |
| JP | 2001180930 A | 7/2001 |
| JP | 2001207160 A | 7/2001 |
| JP | 2001516652 A | 10/2001 |
| JP | 2002-038131 A | 2/2002 |
| JP | 2002210659 A | 7/2002 |
| JP | 2003-049158 A | 2/2003 |
| JP | 2003513145 A | 4/2003 |
| JP | 2004-510873 A | 4/2004 |
| JP | 2004209624 A | 7/2004 |
| JP | 2006130586 A | 5/2006 |
| JP | 2006130636 A | 5/2006 |
| JP | 2006159402 A | 6/2006 |
| JP | 2006-192540 A | 7/2006 |
| JP | 2007-537891 A | 12/2007 |
| JP | 2008132560 A | 6/2008 |
| JP | 2008194761 A | 8/2008 |
| JP | 2008531305 A | 8/2008 |
| JP | 2012512046 A | 5/2012 |
| JP | 2012512047 A | 5/2012 |
| JP | 2012512048 A | 5/2012 |
| JP | 2012530615 A | 12/2012 |
| JP | 5238725 B2 | 7/2013 |
| JP | 5238726 B2 | 7/2013 |
| JP | 2014503367 A | 2/2014 |
| JP | 2017518889 A | 7/2017 |
| JP | 2017538588 A | 12/2017 |
| JP | 2018510073 A | 4/2018 |
| KR | 1019890014409 A | 10/1989 |
| KR | 1020020042840 A | 6/2002 |
| KR | 20140106713 A | 9/2014 |
| NL | 171464 B1 | 11/1982 |
| WO | 94/02559 A1 | 2/1994 |
| WO | 95/03370 | 2/1995 |
| WO | 95/18192 A1 | 7/1995 |
| WO | 95/20469 A1 | 8/1995 |
| WO | 96/27189 A1 | 9/1996 |
| WO | 9711484 A1 | 3/1997 |
| WO | 97/14536 A1 | 4/1997 |
| WO | 99/06500 A1 | 2/1999 |
| WO | 99/14016 A1 | 3/1999 |
| WO | 99/38817 A1 | 8/1999 |
| WO | 1999038817 A1 | 8/1999 |
| WO | 99/54424 A1 | 10/1999 |
| WO | 0064630 A1 | 11/2000 |
| WO | 0114494 A1 | 3/2001 |
| WO | 0123323 A1 | 4/2001 |
| WO | 02097150 A2 | 12/2002 |
| WO | 03087236 A1 | 10/2003 |
| WO | 2005080624 A1 | 9/2005 |
| WO | 2005112601 A2 | 12/2005 |
| WO | 2006027593 A3 | 3/2006 |
| WO | 2006062597 A1 | 6/2006 |
| WO | 2007041538 A1 | 4/2007 |
| WO | 2009085578 A2 | 7/2009 |
| WO | 2009085841 A2 | 7/2009 |
| WO | 2009098017 A1 | 8/2009 |
| WO | 2010077509 A1 | 7/2010 |
| WO | 2010085587 A1 | 7/2010 |
| WO | 2010151201 A1 | 12/2010 |
| WO | 2011005425 A2 | 1/2011 |
| WO | 2011019188 A1 | 2/2011 |
| WO | 2011068714 A2 | 6/2011 |
| WO | 2011068724 A2 | 6/2011 |
| WO | 2011087649 A2 | 7/2011 |
| WO | 2011109188 A2 | 9/2011 |
| WO | 2011133438 A1 | 10/2011 |
| WO | 2011139562 A2 | 11/2011 |
| WO | 2011142986 A1 | 11/2011 |
| WO | 2011149625 A2 | 12/2011 |
| WO | 2012018903 A2 | 2/2012 |
| WO | 2012061016 A1 | 5/2012 |
| WO | 2012061033 A2 | 5/2012 |
| WO | 2012092590 A2 | 7/2012 |
| WO | 2012092605 A3 | 7/2012 |
| WO | 2010070294 A1 | 8/2012 |
| WO | 2012112305 A2 | 8/2012 |
| WO | 2012112322 A2 | 8/2012 |
| WO | 2012092590 A3 | 10/2012 |
| WO | 2012140617 A1 | 10/2012 |
| WO | 2012141905 A2 | 10/2012 |
| WO | 2013003830 A2 | 1/2013 |
| WO | 2013003831 A2 | 1/2013 |
| WO | 2013009484 A2 | 1/2013 |
| WO | 2013036402 A1 | 3/2013 |
| WO | 2013040423 A2 | 3/2013 |
| WO | 2013045251 A1 | 4/2013 |
| WO | 2013049239 A1 | 4/2013 |
| WO | 2013070576 A2 | 5/2013 |
| WO | 2013101575 A1 | 7/2013 |
| WO | 2013102170 A1 | 7/2013 |
| WO | 2013102174 A1 | 7/2013 |
| WO | 2013102176 A1 | 7/2013 |
| WO | 2013102177 A1 | 7/2013 |
| WO | 2013106597 A1 | 7/2013 |
| WO | 2013106602 A1 | 7/2013 |
| WO | 2013149209 A1 | 10/2013 |
| WO | 2013151745 A1 | 10/2013 |
| WO | 2013177446 A1 | 11/2013 |
| WO | 2013186146 A1 | 12/2013 |
| WO | 2013188038 A1 | 12/2013 |
| WO | 2014005120 A1 | 1/2014 |
| WO | 2014020068 A1 | 2/2014 |
| WO | 2014020075 A1 | 2/2014 |
| WO | 2014022453 A1 | 2/2014 |
| WO | 2014022462 A1 | 2/2014 |
| WO | 2014022465 A1 | 2/2014 |
| WO | 2014161001 A1 | 2/2014 |
| WO | 2014057273 A1 | 4/2014 |
| WO | 2014062701 A1 | 4/2014 |
| WO | 2014070468 A1 | 5/2014 |
| WO | 2014106173 A1 | 7/2014 |
| WO | 2014106211 A1 | 7/2014 |
| WO | 2014124554 A1 | 8/2014 |
| WO | 2014137972 A1 | 9/2014 |
| WO | 2014140689 A1 | 9/2014 |
| WO | 2014165390 A1 | 10/2014 |
| WO | 2014176108 A1 | 10/2014 |
| WO | 2014206739 A1 | 12/2014 |
| WO | 2014206890 A1 | 12/2014 |
| WO | 2014206967 A1 | 12/2014 |
| WO | 2014209567 A1 | 12/2014 |
| WO | 2014210160 A1 | 12/2014 |
| WO | 2014210442 A1 | 12/2014 |
| WO | 2014210532 A1 | 12/2014 |
| WO | 2014210568 A1 | 12/2014 |
| WO | 2015050781 A1 | 4/2015 |
| WO | 2015073346 A1 | 5/2015 |
| WO | 2015048768 A9 | 6/2015 |
| WO | 2015088953 A1 | 6/2015 |
| WO | 2015089527 A1 | 6/2015 |
| WO | 2015089528 A1 | 6/2015 |
| WO | 2015089529 A1 | 6/2015 |
| WO | 2015100018 A1 | 7/2015 |
| WO | 2015100020 A1 | 7/2015 |
| WO | 2015100220 A1 | 7/2015 |
| WO | 2015102992 A1 | 7/2015 |
| WO | 2015112379 A1 | 7/2015 |
| WO | 2015130487 A1 | 9/2015 |
| WO | 2015143461 A1 | 10/2015 |
| WO | 2015158009 A1 | 10/2015 |
| WO | 2015160854 A1 | 10/2015 |
| WO | 2015160855 A1 | 10/2015 |
| WO | 2015160857 A1 | 10/2015 |
| WO | 2015164211 A1 | 10/2015 |
| WO | 2015165122 A1 | 11/2015 |
| WO | 2015167910 A1 | 11/2015 |
| WO | 2015179335 A1 | 11/2015 |
| WO | 2015180005 A1 | 12/2015 |
| WO | 2015184355 A1 | 12/2015 |
| WO | 2016028683 A1 | 2/2016 |
| WO | 2016044158 A1 | 3/2016 |
| WO | 2016064726 A1 | 4/2016 |
| WO | 2016089675 A1 | 6/2016 |

(56) References Cited

FOREIGN PATENT DOCUMENTS

| | | |
|---|---|---|
| WO | 2016105469 A1 | 6/2016 |
| WO | 2016105474 A1 | 6/2016 |
| WO | 2016160357 A1 | 10/2016 |
| WO | 2016161157 A1 | 10/2016 |
| WO | 2016161170 A1 | 10/2016 |
| WO | 2016167967 A1 | 10/2016 |
| WO | 2016187570 A1 | 11/2016 |
| WO | 2016196795 A1 | 12/2016 |
| WO | 2016201104 A1 | 12/2016 |
| WO | 2016205133 A1 | 12/2016 |
| WO | 2016205267 A1 | 12/2016 |
| WO | 2016210057 A1 | 12/2016 |
| WO | 2017007703 A1 | 1/2017 |
| WO | 2017007714 A1 | 1/2017 |
| WO | 2017062482 A1 | 4/2017 |
| WO | 2017083249 A1 | 5/2017 |
| WO | 2017083255 A1 | 5/2017 |
| WO | 2016105543 A9 | 9/2017 |
| WO | 2017151498 A1 | 9/2017 |
| WO | 2018010730 A2 | 1/2018 |
| WO | 2018026669 A1 | 2/2018 |
| WO | 2018057465 A1 | 3/2018 |
| WO | 2018057558 A1 | 3/2018 |
| WO | 2018063902 A1 | 4/2018 |
| WO | 2018063958 A1 | 4/2018 |
| WO | 2018063960 A1 | 4/2018 |
| WO | 2018063962 A1 | 4/2018 |
| WO | 2018064642 A1 | 4/2018 |
| WO | 2018080703 A1 | 5/2018 |
| WO | 2018080704 A1 | 5/2018 |
| WO | 2018080705 A1 | 5/2018 |
| WO | 2018080755 A1 | 5/2018 |
| WO | 2018080756 A1 | 5/2018 |
| WO | 2018080765 A1 | 5/2018 |
| WO | 2018080778 A1 | 5/2018 |
| WO | 2018080784 A1 | 5/2018 |
| WO | 2018081246 A1 | 5/2018 |
| WO | 2018118688 A1 | 6/2018 |
| WO | 2018118690 A1 | 6/2018 |
| WO | 2018118695 A1 | 6/2018 |
| WO | 2018118699 A1 | 6/2018 |
| WO | 2018134732 A1 | 7/2018 |
| WO | 2018136268 A1 | 7/2018 |
| WO | 2018136269 A1 | 7/2018 |
| WO | 2018136271 A1 | 7/2018 |
| WO | 2018172193 A1 | 9/2018 |
| WO | 2018207145 A1 | 11/2018 |
| WO | 2018236989 A1 | 12/2018 |
| WO | 2019001908 A1 | 1/2019 |
| WO | 2019069157 A1 | 4/2019 |
| WO | 2019102312 A1 | 5/2019 |
| WO | 2019102328 A1 | 5/2019 |
| WO | 2019102329 A1 | 5/2019 |
| WO | 2019102330 A1 | 5/2019 |
| WO | 2019102331 A1 | 5/2019 |
| WO | 2019108805 A2 | 6/2019 |
| WO | 2021161129 A1 | 8/2019 |
| WO | 2019167022 A1 | 9/2019 |
| WO | 2019197948 A1 | 10/2019 |
| WO | 2019207415 A1 | 10/2019 |
| WO | 2019207416 A1 | 10/2019 |
| WO | 2019207417 A1 | 10/2019 |
| WO | 2019207423 A1 | 10/2019 |
| WO | 2019215571 A1 | 11/2019 |
| WO | 2020025270 A1 | 2/2020 |
| WO | 2020035764 A1 | 2/2020 |
| WO | 2020075005 A1 | 4/2020 |
| WO | 2020079522 A1 | 4/2020 |
| WO | 2020084382 A1 | 4/2020 |
| WO | 2020084483 A1 | 4/2020 |
| WO | 2020089741 A1 | 5/2020 |
| WO | 2020115685 A1 | 6/2020 |
| WO | 2020128708 A1 | 6/2020 |
| WO | 2020128716 A1 | 6/2020 |
| WO | 2020128717 A1 | 6/2020 |
| WO | 2020128719 A1 | 6/2020 |
| WO | 2020128720 A2 | 6/2020 |
| WO | 2020128752 A1 | 6/2020 |
| WO | 2020128779 A2 | 6/2020 |
| WO | 2020128780 A1 | 6/2020 |
| WO | 2020128781 A1 | 6/2020 |
| WO | 2020128783 A1 | 6/2020 |
| WO | 2020128787 A1 | 6/2020 |
| WO | 2020128794 A1 | 6/2020 |
| WO | 2020128833 A1 | 6/2020 |
| WO | 2020128838 A1 | 6/2020 |
| WO | 2020128842 A1 | 6/2020 |
| WO | 2020128844 A1 | 6/2020 |
| WO | 2020128845 A1 | 6/2020 |
| WO | 2020128852 A1 | 6/2020 |
| WO | 2020128853 A1 | 6/2020 |
| WO | 2020128856 A1 | 6/2020 |
| WO | 2020212788 A1 | 10/2020 |
| WO | 2021009600 A1 | 1/2021 |
| WO | 2021014271 A1 | 1/2021 |
| WO | 2021074756 A1 | 4/2021 |
| WO | 2021074768 A1 | 4/2021 |
| WO | 2021079331 A1 | 4/2021 |
| WO | 2021081571 A1 | 5/2021 |
| WO | 2021105030 A1 | 6/2021 |
| WO | 2021116883 A1 | 6/2021 |
| WO | 2021133876 A1 | 7/2021 |
| WO | 2021133888 A1 | 7/2021 |
| WO | 2021133901 A1 | 7/2021 |
| WO | 2021137092 A1 | 7/2021 |
| WO | 2021179025 A1 | 9/2021 |
| WO | 2021186326 A1 | 9/2021 |
| WO | 2021214576 A1 | 10/2021 |
| WO | 2021214605 A1 | 10/2021 |
| WO | 2021234540 A1 | 11/2021 |

OTHER PUBLICATIONS

Austin, Benson M., "Thick-Film Screen Printing," Solid State Technology, Jun. 1969, pp. 53-58.
Avril, Nicolas Joseph "Manufacturing Glass-Fiber Reinforcement for Grinding Wheels" Massachusetts Institute of Technology, Feb. 1996, 105 pages.
Bacher, Rudolph J., "High Resolution Thick Film Printing," E.I. du Pont de Nemours & Company, Inc., Proceedings of the International Symposium on Microelectronics, 1986, pp. 576-581.
Besse, John R., "Understanding and controlling wheel truing and dressing forces when rotary plunge dressing," Cutting Tool Engineering, Jun. 2012, vol. 64, Issue 6, 4 pages.
Ciccotti, M. et al., "Complex dynamics in the peeling of an adhesive tape," International Journal of Adhesion & Adhesives 24 (2004) pp. 143-151.
Dupont, "Kevlar Aramid Pulp", Copyright 2011, DuPont, Accessed: Sep. 18, 2013, 2 pages.
Wu, J. et al., "Friction and Wear Properties of Kevlar Pulp Reinforced Epoxy Composite under Dry Sliding Condition", Tribology Letters, vol. 22, No. 3, Jun. 2006, pp. 259-263, Abstract only.
J. European Ceramic Society 31 (2011) 2073-2081, Abstract only.
Riemer, Dietrich E., "Analytical Engineering Model of the Screen Printing Process: Part II," Solid State Technology, Sep. 1988, pp. 85-90.
Miller, L.F., "Paste Transfer in the Screening Process," Solid State Technology, Jun. 1969, pp. 46-52.
Morgan, P. et al., "Ceramic Composites of Monazite and Alumina," J. Am. Ceram. Soc., 78, 1995, 1553-63.
Riemer, Dietrich E., "Analytical Engineering Model of the Screen Printing Process: Part I," Solid State Technology, Aug. 1988, pp. 107-111.
Winter Catalogue No. 5, Dressing tools, Winter diamond tools for dressing grinding wheels, Edition Year: 2010, 140 pages.
Badger, Jeffrey, "Evaluation of Triangular, Engineered-Shape Ceramic Abrasive in Cutting Discs," Supplement to the Welding Journal, Apr. 2014, vol. 93, pp. 107-s to 115-s.
3M Cubitron II Abrasive Belts Brochure, Shaping the Future, Jan. 2011, 6 pages.

(56) References Cited

OTHER PUBLICATIONS

Graf, "Cubitron II: Precision-Shaped Grain (PSG) Turns the Concept of Gear Grinding Upside Down," gearsolutions.com, May 2014, pp. 36-44.
DOW Machine Tool Accessories, Grinding & Surface Finishing, www.1mta.com, Nov. 2014, 72 pages.
VSM Actirox Fibre Discs, The Latest Generation of Abrasives for Maximum Stock Removal [PDF] VSM Abrasives Ltd., Apr. 2019 [retrieved on May 15, 2019], 8 pages. Retrieved from https://uk.vsmabrasives.com/fileadmin/user_upload/ACTIROX/VSM-ACTIROX-EN.pdf.
Kumar et al., "Composites by rapid prototyping technology", Material & Design, Feb. 2010, vol. 31, Issue 2, pp. 850-856.
Lewis et al., "Direct Ink Writing of Three-Dimensional Ceramic Structures", Journal of the American Ceramic Society, US, Nov. 30, 2006, vol. 89, Issue 12, pp. 3599-3609.
International Search Report with regard to International application No. PCT/US2017/031998, dated Aug. 21, 2017.
International Search Report with regard to International application No. PCT/US2017/031992, dated Aug. 21, 2017.
International Search Report and Written Opinion for Application No. PCT/US2016/036701, dated Sep. 1, 2016, 12 pages.
Brewer, L. et al., Journal of Materials Research, 1999, vol. 14, No. 10, pp. 3907-3912, Abstract only.
Lewis et al., "Direct Ink Writing of 3D Functional Materials", Advanced Functional Materials, 2006, 16, pp. 2193-2204.
International Search Report and Written Opinion for Application No. PCT/US2020/066817, dated Apr. 15, 2021, 11 pages.
International Search Report and Written Opinion for Application No. PCT/US2014/058378, dated Jan. 29, 2015, 18 pages.
International Search Report and Written Opinion for Application No. PCT/US2015/025825) dated Jul. 16, 2015, 13 pages.

* cited by examiner

400

500

SHAPED ABRASIVE PARTICLES AND METHOD OF FORMING SAME

CROSS-REFERENCE TO RELATED APPLICATION(S)

This application is a Continuation of U.S. patent application Ser. No. 16/426,554, entitled "SHAPED ABRASIVE PARTICLES AND METHOD OF FORMING SAME," by Frederic Josseaux and David F. Louapre, filed May 30, 2019, which is a Continuation of U.S. patent application Ser. No. 15/887,466, entitled "SHAPED ABRASIVE PARTICLES AND METHOD OF FORMING SAME," by Frederic Josseaux and David F. Louapre, filed Feb. 2, 2018, now U.S. Pat. No. 10,351,745, which is a Continuation of U.S. patent application Ser. No. 14/757,688, entitled "SHAPED ABRASIVE PARTICLES AND METHOD OF FORMING SAME," by Frederic Josseaux and David F. Louapre, filed Dec. 23, 2015, now U.S. Pat. No. 9,914,864, which is a Continuation-in-Part to U.S. patent application Ser. No. 14/581,220, entitled "COMPOSITE SHAPED ABRASIVE PARTICLES AND METHOD OF FORMING SAME," by Frederic Josseaux, filed Dec. 23, 2014, now U.S. Pat. No. 9,707,529, and claims priority to U.S. Provisional Application No. 62/141,181, entitled "SHAPED ABRASIVE PARTICLES AND METHOD OF FORMING SAME," by Frederic Josseaux and David F. Louapre, filed Mar. 31, 2015, all of which are assigned to the current assignee hereof and incorporated herein by reference in their entireties.

BACKGROUND

Field of the Disclosure

The following is directed to shaped abrasive particles, and more particularly, to composite shaped abrasive particles having certain features and methods of forming such composite shaped abrasive particles.

Description of the Related Art

Abrasive articles incorporating abrasive particles are useful for various material removal operations including grinding, finishing, polishing, and the like. Depending upon the type of abrasive material, such abrasive particles can be useful in shaping or grinding various materials in the manufacturing of goods. Certain types of abrasive particles have been formulated to date that have particular geometries, such as triangular shaped abrasive particles and abrasive articles incorporating such objects. See, for example, U.S. Pat. Nos. 5,201,916; 5,366,523; and 5,984,988.

Previously, three basic technologies that have been employed to produce abrasive particles having a specified shape, which are fusion, sintering, and chemical ceramic. In the fusion process, abrasive particles can be shaped by a chill roll, the face of which may or may not be engraved, a mold into which molten material is poured, or a heat sink material immersed in an aluminum oxide melt. See, for example, U.S. Pat. No. 3,377,660. In sintering processes, abrasive particles can be formed from refractory powders having a particle size of up to 10 micrometers in diameter. Binders can be added to the powders along with a lubricant and a suitable solvent to form a mixture that can be shaped into platelets or rods of various lengths and diameters. See, for example, U.S. Pat. No. 3,079,242. Chemical ceramic technology involves converting a colloidal dispersion or hydrosol (sometimes called a sol) to a gel or any other physical state that restrains the mobility of the components, drying, and firing to obtain a ceramic material. See, for example, U.S. Pat. Nos. 4,744,802 and 4,848,041. Other relevant disclosures on shaped abrasive particles and associated methods of forming and abrasive articles incorporating such particles are available at: http://www.abel-ip.com/publications/.

The industry continues to demand improved abrasive materials and abrasive articles.

SUMMARY

According to a first aspect, a method of forming an abrasive particle includes forming a mixture and attaching a plurality of abrasive particles to at least one surface of the mixture and forming a shaped abrasive particle having a body and the plurality of abrasive particles bonded to at least one surface of the body.

In yet another aspect, an abrasive article includes a bond material and a first collection of abrasive particles coupled to the bond material, wherein each particle in the first collection comprises a shaped abrasive particle comprising a body and a plurality of abrasive particles bonded to at least one surface of the body of the shaped abrasive particle.

In another aspect, an abrasive particle includes a shaped abrasive particle comprising a body; and a plurality of abrasive particles bonded to at least one surface of the body of the shaped abrasive particle.

BRIEF DESCRIPTION OF THE FIGURES

The present disclosure may be better understood, and its numerous features and advantages made apparent to those skilled in the art by referencing the accompanying drawings.

DETAILED DESCRIPTION

The following is directed to methods of forming shaped abrasive particles, and more particularly composite shaped abrasive particles including shaped abrasive particles and a plurality of abrasive particles overlying at least one surface of the body of the shaped abrasive particle. The abrasive particles of the embodiments herein may be used in various abrasive articles, including for example bonded abrasive articles, coated abrasive articles, and the like. Alternatively, the shaped abrasive particle fractions of the embodiments herein may be utilized in free abrasive technologies, including for example grinding and/or polishing slurries.

The abrasive particles of the embodiments herein may be obtained through various processing methods, including but not limited to, printing, molding, pressing, stamping, casting, extruding, cutting, fracturing, heating, cooling, crystallizing, rolling, embossing, depositing, etching, scoring, drying, and a combination thereof. Particular methods of forming the shaped abrasive particles can include the formation of a mixture, such as a sol-gel, that can be shaped in an opening of a production tooling (e.g., a screen or mold), and formed into a precursor shaped abrasive particle. Screen printing methods of forming shaped abrasive particles are generally described in U.S. Pat. No. 8,753,558. A suitable method of forming shaped abrasive particles according to a conventional molding process is described in U.S. Pat. No. 5,201,916.

Figure 1A:
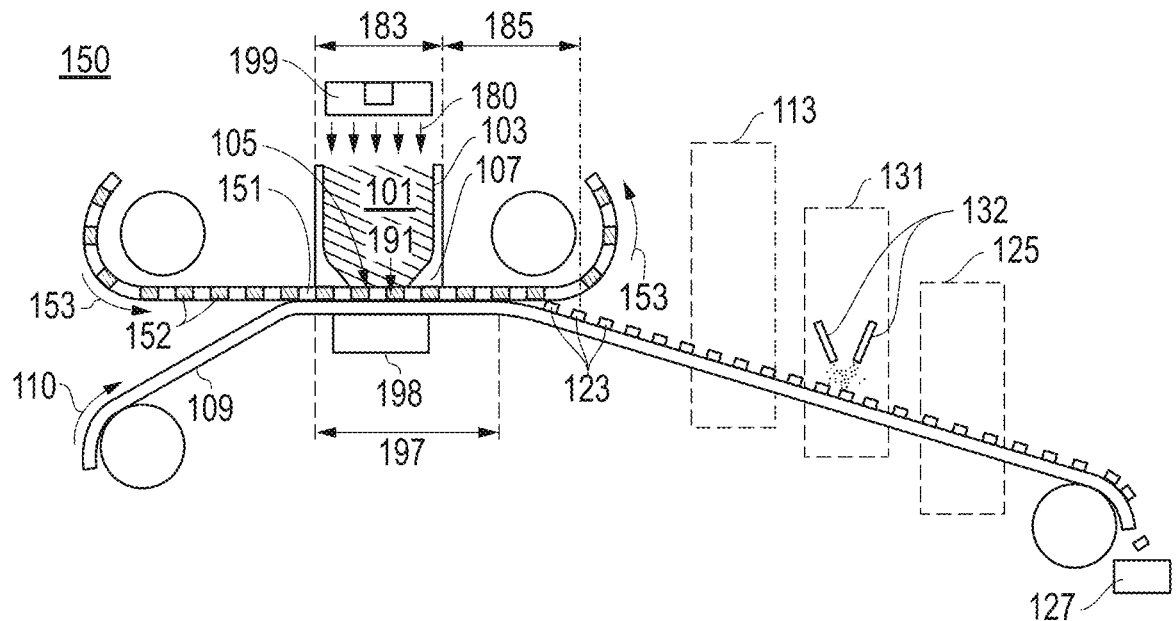
FIG. 1A includes a portion of a system for forming shaped abrasive particles in accordance with an embodiment.

According to one particular embodiment, the process of forming the shaped abrasive particles can be a screen printing process. FIG. 1A includes an illustration of a system 150 for forming composite shaped abrasive particles in accordance with one, non-limiting embodiment. The process of forming composite shaped abrasive particles can be initiated by forming a mixture 101 including a ceramic material and a liquid. In particular, the mixture 101 can be a gel formed of a ceramic powder material and a liquid, wherein the gel can be characterized as a shape-stable material having the ability to substantially hold a given shape even in the green (i.e., unfired) state. In accordance with an embodiment, the gel can be formed of the ceramic powder material as an integrated network of discrete particles.

The mixture 101 may contain a certain content of solid material, liquid material, and additives such that it has suitable rheological characteristics for use with the process detailed herein. That is, in certain instances, the mixture can have a certain viscosity, and more particularly, suitable rheological characteristics that form a shape-stable phase of material that can be formed through the process as noted herein. A dimensionally stable phase of material is a material that can be formed to have a particular shape and substantially maintain the shape for at least a portion of the processing subsequent to forming. In certain instances, the shape may be retained throughout subsequent processing, such that the shape initially provided in the forming process is present in the finally-formed object.

The mixture 101 can be formed to have a particular content of solid material, such as the ceramic powder material. For example, in one embodiment, the mixture 101 can have a solids content of at least about 25 wt %, such as at least about 35 wt %, or even at least about 38 wt % for the total weight of the mixture 101. Still, in at least one non-limiting embodiment, the solids content of the mixture 101 can be not greater than about 75 wt %, such as not greater than about 70 wt %, not greater than about 65 wt %, not greater than about 55 wt %, not greater than about 45 wt %, or not greater than about 42 wt %. It will be appreciated that the content of the solid material in the mixture 101 can be within a range between any of the minimum and maximum percentages noted above.

According to one embodiment, the ceramic powder material can include an oxide, a nitride, a carbide, a boride, an oxycarbide, an oxynitride, and a combination thereof. In particular, instances, the ceramic material can include alumina. More specifically, the ceramic material may include a boehmite material, which may be a precursor of alpha alumina. The term "boehmite" is generally used herein to denote alumina hydrates including mineral boehmite, typically being $Al_2O_3 \cdot H_2O$ and having a water content on the order of 15%, as well as pseudoboehmite, having a water content higher than 15%, such as 20-38% by weight. It is noted that boehmite (including pseudoboehmite) has a particular and identifiable crystal structure, and therefore a unique X-ray diffraction pattern. As such, boehmite is distinguished from other aluminous materials including other hydrated aluminas such as ATH (aluminum trihydroxide), a common precursor material used herein for the fabrication of boehmite particulate materials.

Furthermore, the mixture 101 can be formed to have a particular content of liquid material. Some suitable liquids may include water. In more particular instances, the mixture 101 can have a liquid content of at least about 25 wt % for the total weight of the mixture 101. In other instances, the amount of liquid within the mixture 101 can be greater, such as at least about 35 wt %, at least about 45 wt %, at least about 50 wt %, or even at least about 58 wt %. Still, in at least one non-limiting embodiment, the liquid content of the mixture can be not greater than about 75 wt %, such as not greater than about 70 wt %, not greater than about 65 wt %, not greater than about 62 wt %, or even not greater than about 60 wt %. It will be appreciated that the content of the liquid in the mixture 101 can be within a range between any of the minimum and maximum percentages noted above.

Furthermore, to facilitate processing and forming shaped abrasive particles according to embodiments herein, the mixture 101 can have a particular storage modulus. For example, the mixture 101 can have a storage modulus of at least about $1 \times 10^4$ Pa, such as at least about $4 \times 10^4$ Pa, or even at least about $5 \times 10^4$ Pa. However, in at least one non-limiting embodiment, the mixture 101 may have a storage modulus of not greater than about $1 \times 10^4$ Pa, such as not greater than about $2 \times 10^6$ Pa. It will be appreciated that the storage modulus of the mixture 101 can be within a range between any of the minimum and maximum values noted above.

The storage modulus can be measured via a parallel plate system using ARES or AR-G2 rotational rheometers, with Peltier plate temperature control systems. For testing, the mixture 101 can be extruded within a gap between two plates that are set to be approximately 8 mm apart from each other. After extruding the gel into the gap, the distance between the two plates defining the gap is reduced to 2 mm until the mixture 101 completely fills the gap between the plates. After wiping away excess mixture, the gap is decreased by 0.1 mm and the test is initiated. The test is an oscillation strain sweep test conducted with instrument settings of a strain range between 0.01% to 100%, at 6.28 rad/s (1 Hz), using 25-mm parallel plate and recording 10 points per decade. Within 1 hour after the test completes, the gap is lowered again by 0.1 mm and the test is repeated. The test can be repeated at least 6 times. The first test may differ from the second and third tests. Only the results from the second and third tests for each specimen should be reported.

Furthermore, to facilitate processing and forming shaped abrasive particles according to embodiments herein, the mixture 101 can have a particular viscosity. For example, the mixture 101 can have a viscosity of at least about $4 \times 10^3$ Pa s, at least about $5 \times 10^3$ Pa s, at least about $6 \times 10^3$ Pa s, at least about $8 \times 10^3$ Pa s, at least about $10 \times 10^3$ Pa s, at least about $20 \times 10^3$ Pa s, at least about $30 \times 10^3$ Pa s, at least about $40 \times 10^3$ Pa s, at least about $50 \times 10^3$ Pa s, at least about $60 \times 10^3$ Pa s, or at least about $65 \times 10^3$ Pa s. In one non-limiting embodiment, the mixture 101 may have a viscosity of not greater than about $100 \times 10^3$ Pa s, such as not greater than about $95 \times 10^3$ Pa s, not greater than about $90 \times 10^3$ Pa s, or even not greater than about $85 \times 10^3$ Pa s. It will be appreciated that the viscosity of the mixture 101 can be within a range between any of the minimum and maximum values noted above. The viscosity can be measured in the same manner as the storage modulus as described above.

Moreover, the mixture 101 can be formed to have a particular content of organic materials including, for example, organic additives that can be distinct from the liquid to facilitate processing and formation of shaped abrasive particles according to the embodiments herein. Some suitable organic additives can include stabilizers, binders such as fructose, sucrose, lactose, glucose, UV curable resins, and the like.

Notably, the embodiments herein may utilize a mixture 101 that can be distinct from slurries used in conventional forming operations. For example, the content of organic materials within the mixture 101 and, in particular, any of the organic additives noted above, may be a minor amount as compared to other components within the mixture 101. In at least one embodiment, the mixture 101 can be formed to have not greater than about 30 wt % organic material for the total weight of the mixture 101. In other instances, the amount of organic materials may be less, such as not greater than about 15 wt %, not greater than about 10 wt %, or even not greater than about 5 wt %. Still, in at least one non-limiting embodiment, the amount of organic materials within the mixture 101 can be at least about 0.01 wt %, such as at least about 0.5 wt % for the total weight of the mixture 101. It will be appreciated that the amount of organic materials in the mixture 101 can be within a range between any of the minimum and maximum values noted above.

Moreover, the mixture 101 can be formed to have a particular content of acid or base, distinct from the liquid content, to facilitate processing and formation of shaped abrasive particles according to the embodiments herein. Some suitable acids or bases can include nitric acid, sulfuric acid, citric acid, chloric acid, tartaric acid, phosphoric acid, ammonium nitrate, and ammonium citrate. According to one particular embodiment in which a nitric acid additive is used, the mixture 101 can have a pH of less than about 5, and more particularly, can have a pH within a range between about 2 and about 4.

The system 150 of FIG. 1A, can include a die 103. As illustrated, the mixture 101 can be provided within the interior of the die 103 and configured to be extruded through a die opening 105 positioned at one end of the die 103. As further illustrated, extruding can include applying a force 180 (such as a pressure) on the mixture 101 to facilitate extruding the mixture 101 through the die opening 105. During extrusion within an application zone 183, a production tool or production tool 151 can be in direct contact with a portion of a belt 109. The screen printing process can include extruding the mixture 101 from the die 103 through the die opening 105 in a direction 191. In particular, the screen printing process may utilize the production tool 151 such that, upon extruding the mixture 101 through the die opening 105, the mixture 101 can be forced into an opening 152 in the production tool 151.

In accordance with an embodiment, a particular pressure may be utilized during extrusion. For example, the pressure can be at least about 10 kPa, such as at least about 500 kPa. Still, in at least one non-limiting embodiment, the pressure utilized during extrusion can be not greater than about 4 MPa. It will be appreciated that the pressure used to extrude the mixture 101 can be within a range between any of the minimum and maximum values noted above. In particular instances, the consistency of the pressure delivered by a piston 199 may facilitate improved processing and formation of shaped abrasive particles. Notably, controlled delivery of consistent pressure across the mixture 101 and across the width of the die 103 can facilitate improved processing control and improved dimensional characteristics of the shaped abrasive particles.

Figure 1B:
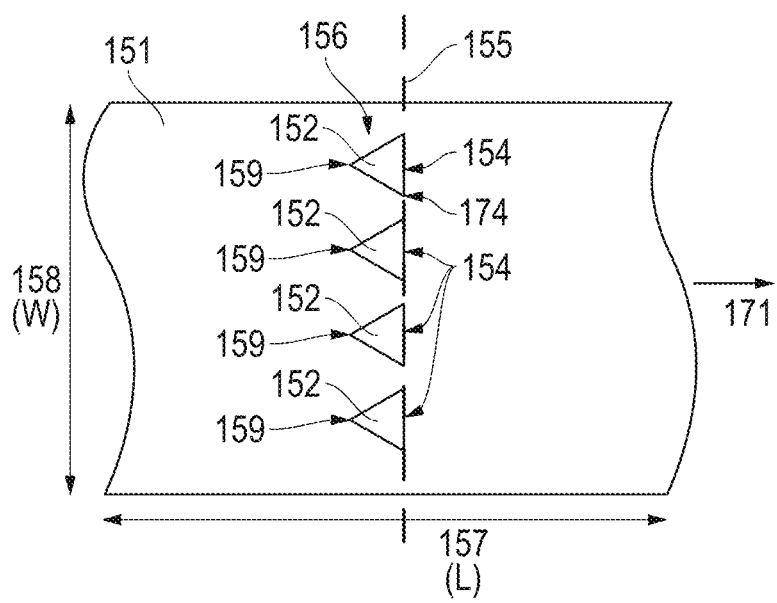
FIG. 1B includes a portion of the system of FIG. 1A according to an embodiment.

Referring briefly to FIG. 1B, a portion of the production tool (e.g., screen) 151 is illustrated. As shown, the production tool 151 can include the opening 152, and more particularly, a plurality of openings 152 extending through the volume of the production tool 151. In accordance with an embodiment, the openings 152 can have a two-dimensional shape as viewed in a plane defined by the length (l) and width (w) of the screen. The two-dimensional shape can include various shapes such as, for example, polygons, ellipsoids, numerals, Greek alphabet letters, Latin alphabet letters, Russian alphabet characters, complex shapes including a combination of polygonal shapes, and a combination thereof. In particular instances, the openings 152 may have two-dimensional polygonal shapes such as a triangle, a rectangle, a quadrilateral, a pentagon, a hexagon, a heptagon, an octagon, a nonagon, a decagon, and a combination thereof.

As further illustrated, the production tool 151 can have openings 152 that are oriented in a particular manner relative to each other. As illustrated and in accordance with one embodiment, each of the openings 152 can have substantially the same orientation relative to each other, and substantially the same orientation relative to the surface of the production tool 151. For example, each of the openings 152 can have a first edge 154 defining a first plane 155 for a first row 156 of the openings 152 extending laterally across a lateral axis 158 of the production tool 151. The first plane 155 can extend in a direction substantially orthogonal to a longitudinal axis 157 of the production tool 151. However, it will be appreciated, that in other instances, the openings 152 need not necessarily have the same orientation relative to each other.

Moreover, the first row 156 of openings 152 can be oriented relative to a direction of translation to facilitate particular processing and controlled formation of shaped abrasive particles. For example, the openings 152 can be arranged on the production tool 151 such that the first plane 155 of the first row 156 defines an angle relative to the direction of translation 171. As illustrated, the first plane 155 can define an angle that is substantially orthogonal to the direction of translation 171. Still, it will be appreciated that in one embodiment, the openings 152 can be arranged on the production tool 151 such that the first plane 155 of the first row 156 defines a different angle with respect to the direction of translation, including for example, an acute angle or an obtuse angle. Still, it will be appreciated that the openings 152 may not necessarily be arranged in rows. The openings 152 may be arranged in various particular ordered distributions with respect to each other on the production tool 151, such as in the form of a two-dimensional pattern. Alternatively, the openings may be disposed in a random manner on the production tool 151.

Referring again to FIG. 1A, after forcing the mixture 101 through the die opening 105 and a portion of the mixture 101 through the openings 152 in the production tool 151, one or more precursor shaped abrasive particles 123 may be printed on the belt 109 disposed under the production tool 151. According to a particular embodiment, the precursor shaped abrasive particles 123 can have a shape generally dictated by the shape of the openings 152 and the forming process. Notably, the mixture 101 can be forced through the production tool 151 in rapid fashion, such that the average residence time of the mixture 101 within the openings 152 can be less than about 2 minutes, less than about 1 minute, less than about 40 seconds, or even less than about 20 seconds. In particular non-limiting embodiments, the mixture 101 may be substantially unaltered during printing as it travels through the screen openings 152, thus experiencing no change in the amount of components from the original mixture, and may experience no appreciable drying in the openings 152 of the production tool 151. Still, in other instances, the mixture 101 may undergo some drying in the openings 152, which may facilitate release of the mixture 101 from the openings 152 and may further facilitate formation of certain shape features of the shaped abrasive particles.

Additionally, the system 151 can include a bottom stage 198 within the application zone 183. During the process of forming shaped abrasive particles, the belt 109 can travel over the bottom stage 198, which can offer a suitable substrate for forming the mixture 101.

During operation of the system 150, the production tool 151 can be translated in a direction 153 while the belt 109 can be translated in a direction 110 substantially similar to the direction 153, at least within the application zone 183, to facilitate a continuous printing operation. As such, the precursor shaped abrasive particles 123 may be printed onto the belt 109 and translated along the belt 109 to undergo further processing. It will be appreciated that such further processing can include processes described in the embodiments herein, including for example, shaping, application of other materials (e.g., plurality of abrasive particles), drying, sintering, and the like.

In some embodiments, the belt 109 and/or the production tool 151 can be translated while extruding the mixture 101 through the die opening 105. As illustrated in the system 100, the mixture 101 may be extruded in a direction 191. The direction of translation 110 of the belt 109 and/or the production tool 151 can be angled relative to the direction of extrusion 191 of the mixture 101. While the angle between the direction of translation 110 and the direction of extrusion 191 is illustrated as substantially orthogonal in the system 100, other angles are contemplated, including for example, an acute angle or an obtuse angle.

The belt 109 and/or the production tool 151 may be translated at a particular rate to facilitate processing. For example, the belt 109 and/or the production tool 151 may be translated at a rate of at least about 3 cm/s. In other embodiments, the rate of translation of the belt 109 and/or the production tool 151 may be greater, such as at least about 4 cm/s, at least about 6 cm/s, at least about 8 cm/s, or even at least about 10 cm/s. Still, in at least one non-limiting embodiment, the belt 109 and/or the production tool 151 may be translated in a direction 110 at a rate of not greater than about 5 m/s, not greater than about 1 m/s, or even not greater than about 0.5 m/s. It will be appreciated that the belt 109 and/or the production tool 151 may be translated at a rate within a range between any of the minimum and maximum values noted above, and moreover, may be translated at substantially the same rate relative to each other. Furthermore, for certain processes according to embodiments herein, the rate of translation of the belt 109 as compared to the rate of extrusion of the mixture 101 in the direction 191 may be controlled to facilitate proper processing.

After the mixture 101 is extruded through the die opening 105, the mixture 101 may be translated along the belt 109 under a knife edge 107 attached to a surface of the die 103. The knife edge 107 may define a region at the front of the die 103 that facilitates displacement of the mixture 101 into the openings 152 of the production tool 151.

Certain processing parameters may be controlled to facilitate formation of particular features of the precursor shaped abrasive particles 123 and the finally-formed shaped abrasive particles described herein. Some exemplary process parameters that can be controlled include a release distance 197, a viscosity of the mixture, a storage modulus of the mixture, mechanical properties of the bottom stage, geometric or dimensional characteristics of the bottom stage, thickness of the production tool, rigidity of the production tool, a solid content of the mixture, a carrier content of the mixture, a release angle, a translation speed, a temperature, a content of release agent, a pressure exerted on the mixture, a speed of the belt, a drying rate, a drying time, a drying temperature, and a combination thereof.

According to one embodiment, one particular process parameter can include controlling the release distance 197 between a filling position and a release position. In particular, the release distance 197 can be a distance measured in a direction 110 of the translation of the belt 109 between the end of the die 103 and the initial point of separation between the production tool 151 and the belt 109.

After extruding the mixture 101 into the openings 152 of the production tool 151, the belt 109 and the production tool 151 may be translated to a release zone 185 where the belt 109 and the production tool 151 can be separated to facilitate the formation of the precursor shaped abrasive particles 123. In accordance with an embodiment, the production tool 151 and the belt 109 may be separated from each other within the release zone 185 at a particular release angle.

Thereafter, the precursor shaped abrasive particles 123 may be translated through a series of optional zones wherein various treating processes may be conducted. Some suitable exemplary treating processes can include drying, heating, curing, reacting, radiating, mixing, stirring, agitating, planarizing, calcining, sintering, comminuting, sieving, doping, impregnating, humidifying, application of other abrasive particles to the body of the precursor shaped abrasive particles and a combination thereof. According to one embodiment, the precursor shaped abrasive particles 123 may be translated through an optional shaping zone 113, wherein at least one exterior surface of the particles may be shaped as described in embodiments herein. Furthermore, the precursor shaped abrasive particles 123 may be translated through an optional application zone 131, wherein a material, such as a dopant material and/or a plurality of abrasive particles can be applied to at least one exterior surface of the precursor shaped abrasive particles 123 as described in embodiments herein.

After forming precursor shaped abrasive particles 123, the particles may be translated through any post-forming zone 125. Various processes may be conducted in the post-forming zone 125, including treatment of the precursor shaped abrasive particles 123. In one embodiment, the post-forming zone 125 can include a heating process where the precursor shaped abrasive particles 123 may be dried. Drying may include removal of a particular content of material, including volatiles, such as water. In accordance with an embodiment, the drying process can be conducted at a drying temperature of not greater than about 300° C., such as not greater than about 280° C., or even not greater than about 250° C. Still, in one non-limiting embodiment, the drying process may be conducted at a drying temperature of at least about 50° C. It will be appreciated that the drying temperature may be within a range between any of the minimum and maximum temperatures noted above. Furthermore, the precursor shaped abrasive particles 123 may be translated through the post-forming zone 125 at a particular rate, such as at least about 0.2 feet/min and not greater than about 8 feet/min.

Furthermore, the drying process may be conducted for a particular duration. For example, the drying process may be not greater than about 6 hours, such as not greater than about 5 hours, not greater than about 4 hours, not greater than about 2 hours, or even not greater than about 1 hour. Still, the drying process may be at least about 1 minute, such as at least about 15 minutes or at least about 30 minutes. It will be appreciated that the drying duration may be within a range between any of the minimum and maximum temperatures noted above. For example, in at least one embodiment, the precursor shaped abrasive particles can be dried for a duration of 1 to 10 minutes, which may facilitate intentional fracturing at a predetermined stress concentration point and along a predetermined stress concentration vector.

After the precursor shaped abrasive particles 123 are translated through the post-forming zone 125, the precursor shaped abrasive particles 123 may be removed from the belt 109. The precursor shaped abrasive particles 123 may be collected in a bin 127 for further processing.

In accordance with an embodiment, the process of forming shaped abrasive particles may further comprise a sintering process. For certain processes of embodiments herein, sintering can be conducted after collecting the precursor shaped abrasive particles 123 from the belt 109. Alternatively, the sintering may be a process that is conducted while the precursor shaped abrasive particles 123 are on the belt 109. Sintering of the precursor shaped abrasive particles 123 may be utilized to densify the particles, which are generally in a green state. In a particular instance, the sintering process can facilitate the formation of a high-temperature phase of the ceramic material. For example, in one embodiment, the precursor shaped abrasive particles 123 may be sintered such that a high-temperature phase of alumina, such as alpha alumina, is formed. In one instance, a shaped abrasive particle can comprise at least about 90 wt % alpha alumina for the total weight of the particle. In other instances, the content of alpha alumina may be greater such that the shaped abrasive particle may consist essentially of alpha alumina.

In certain instances, another post forming process can include application of moisture to one or more surfaces of the gel mixture while it resides in the openings 152 or after formation of the precursor shaped abrasive particles 123 (i.e., after the mixture is removed from the openings of the production tool). Application of moisture may be referred to as humidification and may be conducted to facilitate the application of a plurality of particles to one or more surfaces of the mixture 101 and/or precursor shaped abrasive particles 123. In at least one embodiment, the application of moisture can include the deposition of moisture to one or more surface of the mixture while it resides in the openings 152 of the production tool 151 and/or to the precursor shaped abrasive particles 123. In another instance, wherein applying moisture can include wetting the at least one surface of the mixture 101 and/or precursor shaped abrasive particles 123 for a sufficient time to change a viscosity of an exterior region of the at least one surface relative to a viscosity at an interior region spaced apart from the exterior region. Moreover, it is noted that the application of moisture may facilitate gelation and sufficient bonding of the surface of the mixture 101 and/or precursor shaped abrasive particles 123 with a plurality of abrasive particles. According to one embodiment, the plurality of abrasive particles can be applied to the surface of the mixture 101 and/or precursor shaped abrasive particles 123 and the water on the surface can facilitate gelation of the material of the abrasive particles and moistened surface for improved bonding. Reference herein to the plurality of abrasive particles will include reference to various types of particles, including but not limited to, green or unsintered abrasive particles, sintered abrasive particles, and like.

The application of moisture can be selective, such that it is applied to at least one surface of the mixture 101 and/or precursor shaped abrasive particles 123, but may not necessarily be applied to another surface of the mixture 101 and/or precursor shaped abrasive particles 123. In one embodiment, the application of moisture can be completed by deposition of the moisture, including for example, by spraying moisture onto one or more surfaces of the mixture 101 and/or precursor shaped abrasive particles 123. In one embodiment, the application of moisture can include translating the mixture and/or precursor shaped abrasive particles through an environment having a particular moisture content. The humidity and temperature within the environment and the rate at which the mixture and/or precursor shaped abrasive particles 123 are translated through the environment may be controlled to create the particular moisture on at least one surface of the mixture 101 and/or precursor shaped abrasive particles 123. For example, applying moisture to the at least one surface of the mixture 101 and/or precursor shaped abrasive particles 123 can include directing a gas towards the one or more surfaces of the mixture 101 and/or precursor shaped abrasive particles 123. In more particular instances, the process of applying moisture can include directing water vapor and/or steam at the at least one surface of the mixture 101 and/or precursor shaped abrasive particles 123.

In still another embodiment, one or more devices having a particular moisture content may contact one or more surfaces of the mixture 101 and/or precursor shaped abrasive particles 123 to facilitate the application of moisture. For example, a sponge or other object having a suitable moisture content can contact one or more surfaces of the mixture 101 and/or precursor shaped abrasive particles 123.

Still, in another embodiment, another post forming process can include changing the viscosity of the mixture 101 and/or precursor shaped abrasive particles 123, to facilitate attachment of the plurality of abrasive particles to at least one surface. Changing the viscosity of the mixture can include deposition of a second material on the surface of the mixture 101 and/or precursor shaped abrasive particles 123 or using a process to alter the viscosity of the mixture 101 and/or precursor shaped abrasive particles 123 at an exterior region. For example, in certain instances, changing the viscosity can include application of a tacking material, such an organic or inorganic adhesive material. One or more of such materials may be selectively deposited on one or more surfaces of the mixture 101 and/or precursor shaped abrasive particles 123 to facilitate application of a plurality of abrasive particles to the surface.

In another embodiment, changing the viscosity can include application of one or more viscosity modifiers that may increase or decrease the viscosity of the mixture 101 and/or precursor shaped abrasive particles 123 at an exterior region compared to an interior region of the mixture 101 and/or precursor shaped abrasive particles 123 that is spaced apart from the exterior region and is not treated with the viscosity modifier. Such a change in viscosity may be suitable for attachment of the plurality of abrasive particles.

According to one embodiment, the process of forming the abrasive particles can include forming a mixture 101 and/or precursor shaped abrasive particle 123 and attaching a plurality of abrasive particles to at least one surface of the mixture 101 and/or at least one surface of the body of the precursor shaped abrasive particle 123. In certain instances, the process of attaching can happen in the application zone 131, wherein one or more application heads 132 can facilitate deposition of the plurality of abrasive particles onto the major exterior surfaces (e.g., the upper surfaces) of the precursor shaped abrasive particles 123. Various suitable processes for attaching the plurality of abrasive particles can include deposition processes such as blasting, projecting, pressing, gravity coating, molding, stamping, and a combination thereof. Still, it will be appreciated, that the application may happen while the mixture 101 resides in the production tool 151.

According to one embodiment, the process of attaching the plurality of abrasive particles can include forcibly projecting the plurality of abrasive particles toward at least one surface of the mixture 101 and/or precursor shaped abrasive particles 123. It will be appreciated that reference herein to attaching the plurality of abrasive particles to at least one surface can include attachment of the plurality of abrasive particles to a surface of the mixture 101 while the mixture is retained in the production tool 151 (e.g., mold or screen) or after the mixture 101 has been removed from the production tool 151 and the precursor shaped abrasive particles 123 have been formed. A portion or all of the mixture 101 and/or precursor shaped abrasive particles 123 can have the plurality of abrasive particles attached thereto. In at least one embodiment, forcibly projecting the plurality of abrasive particles onto the mixture 101 or precursor shaped abrasive particles 123 includes applying a controlled force to a deposition material including a carrier and the plurality of abrasive particles and embedding at least a portion of the plurality of abrasive particles into the surface of the mixture 101 or precursor shaped abrasive particles 123. For example, the deposition material can include a carrier, which may be a gas. Suitable gaseous materials may include water vapor, steam, an inert gas, air, or a combination thereof.

In at least one embodiment, the humidification of one or more surfaces of the mixture 101 and/or precursor shaped abrasive particles 123 and deposition of the abrasive particles may occur separately, and more specifically, the humidification process may happen before the deposition process. Still, in an alternative embodiment, the humidification process and deposition process may occur simultaneously as a mixture of water vapor and/or steam and the plurality of abrasive particles are directed to the at least one surface of the mixture 101 and/or precursor shaped abrasive particles 123.

The force or pressure used to project the carrier gas and plurality of abrasive particles may be adjusted to facilitate suitable attachment of the abrasive particles to the surface of the mixture 101 and/or precursor shaped abrasive particles 123. Notably, the force or pressure may be adapted based on one or more processing parameters, including but not limited to, the viscosity of the surface of the mixture 101 and/or precursor shaped abrasive particles 123, the median particle size of the plurality of abrasive particles, the content (weight or volume) of the plurality of abrasive particles being projected per unit of time, the humidity of the environment during projecting, the temperature during projecting, the translation speed of the production tool or gel, the desired level of coverage by the plurality of abrasive particles, or a combination thereof.

In at least one embodiment, the process of attaching the plurality of abrasive particles to the bodies of the precursor shaped abrasive particles can occur prior to substantial drying of the body. Notably, in certain instances, some moisture in the precursor shaped abrasive particles may facilitate suitable attachment of the plurality of abrasive particles. According to one embodiment, the process of attachment can occur such that the moisture content (i.e., weight percent of liquid) of the precursor shaped abrasive particle during attachment can be not greater than about 70% different than the moisture content of the mixture 101 when it is placed in the production tool 151. The percent difference can be calculated according to the formula $[(Mc1-Mc2)/Mc1] \times 100\%$, where Mc1 is the moisture content of the mixture 101 during placement into the production tool 151 and Mc2 is the moisture content of the precursor shaped abrasive particle during attachment. In other instances, the moisture content of the precursor shaped abrasive particle during attachment can be not greater than about 60% different, such as not greater than about 50% different, not greater than about 40% different, not greater than about 30% different, not greater than about 20% different, or even not greater than about 10% different than the moisture content of the mixture 101 when it is placed into the production tool 151. Still, in at least one non-limiting embodiment, the moisture content of the precursor shaped abrasive particle during attachment can be substantially the same or exactly the same as the moisture content of the mixture 101 when it is placed into the production tool 151.

In at least one embodiment, the process of attaching the plurality of abrasive particles to the bodies of the precursor shaped abrasive particle can include humidifying the surface of the precursor shaped abrasive particle prior to attachment of the abrasive particles. For example, the moisture content at the surface of the precursor shaped abrasive particles can be increased prior to the attachment process, such that the moisture content can be nearly the same as or higher than the moisture content of the mixture 101 when it is disposed in the production tool 151.

According to another embodiment, the process of attaching the plurality of abrasive particles to the mixture 101 and/or body of the precursor shaped abrasive particles 123 can include deposition of the mixture 101 onto a layer of abrasive particles including the plurality of shaped abrasive particles. For example, the production tool can be prepared to have a layer of abrasive particles contained on a surface, onto which the mixture 101 is deposited and formed into a precursor shaped abrasive particle, such that the mixture 101 is deposited directly onto the plurality of abrasive particles. In such instances, the process of shaping the mixture 101 into the precursor shaped abrasive particles 123 and the attachment of the plurality of abrasive particles can be completed simultaneously. For example, the upper surface of the belt 109 can be prepared to contain a layer of abrasive particles and the mixture 101 can be extruded into the openings 152 of the production tool 151 and onto the layer of abrasive particles on the upper surface of the belt 109. The production tool 151 can then be removed from the belt 109 and the precursor shaped abrasive particles 123 can have a plurality of abrasive particles attached to their bottom surface, which was in contact with the belt 109. It will be appreciated that additional processes can be used to attach the plurality of abrasive particles to other surfaces, including a deposition process that attaches a plurality of abrasive particles to the upper surface of the mixture 101 and/or precursor shaped abrasive particles 123. It is contemplated that one or more processes can be used to attach a plurality of abrasive particles to one or more surfaces of the mixture 101 and/or body of the precursor shaped abrasive particles 123, including but not limited to the bottom surface, the upper surface, and side surfaces of the body of the precursor shaped abrasive particles 123.

In yet another embodiment, the mixture 101 and/or body of the precursor shaped abrasive particles 123 can be placed into a production tool that is translated over a substrate, wherein a plurality of abrasive particles are overlying the surface of the substrate. The substrate can be stamped into the side of the production tool and the mixture 101 and/or precursor shaped abrasive particles 123, such that the plurality of abrasive particles are deposited and at least partially embedded within the mixture 101 and/or precursor shaped abrasive particles 123.

According to one embodiment, the plurality of abrasive particles can be applied or bonded to the at least one surface of the body of the mixture 101 and/or precursor shaped abrasive particles 123 as unsintered particles. That is, the plurality of abrasive particles can be a raw material, which is to undergo further processing with the mixture 101 and/or precursor shaped abrasive particle 123 to form a sintered abrasive particle on the surface of the body of the shaped abrasive particle. For example, the plurality of abrasive particles can include a raw material including at least one material of the group of an oxide, a nitride, a carbide, a boride, an oxycarbide, an oxynitride, or a combination thereof. In particular instances, the plurality of abrasive particles can include boehmite or pseudoboehmite material and as noted above. The boehmite or pseudoboehmite material may be processed in the same manner as the mixture, including the addition of seed material, pinning agents, other additives, and the like. In one particular embodiment, the plurality of abrasive particles include the same material as contained in the mixture used to form the body of the shaped abrasive particle.

In one embodiment, the process can include drying the precursor shaped abrasive particles and plurality of abrasive particles after attaching the plurality of abrasive particles to the precursor shaped abrasive particles. Moreover, it will be appreciated that in certain instances, the process can include calcining the precursor shaped abrasive particle and plurality of abrasive particles after attaching the plurality of abrasive particles to the precursor shaped abrasive particles. Moreover, the process can include sintering the precursor shaped abrasive particle and plurality of abrasive particles after attaching the plurality of abrasive particles to the precursor shaped abrasive particles to form a composite shaped abrasive particle.

Figure 2:
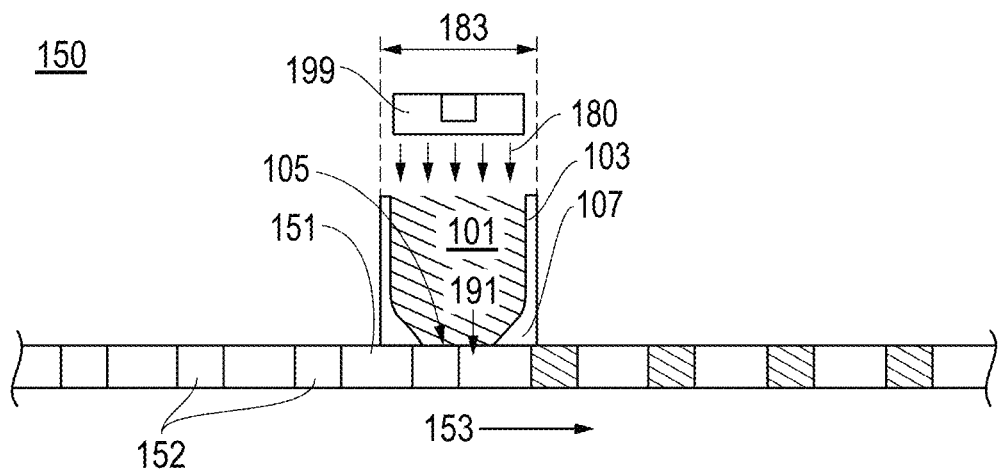
FIG. 2 includes a portion of an alternative system for forming shaped abrasive particles in accordance with an embodiment.

FIG. 2 includes an illustration of a portion of a system for use in forming shaped abrasive particles according to an embodiment. Notably, the system 150 of FIG. 2 includes some of the same components as the system 150 of FIG. 1A, but does not include a belt 109 underlying the tool 151. Notably, the tool 151 of FIG. 2 can be in the form of a screen, such as illustrated in FIG. 1A, wherein the cavities 152 extend through the entire thickness of the tool 151. Still, it will be appreciated that the tool 151 of FIG. 2 may be formed such that the cavities 152 extend for a portion of the entire thickness of the tool 151 and have a bottom surface, such that the volume of space configured to hold and shape the mixture 101 is defined by a bottom surface and side surfaces. All processes described herein in other embodiments may be utilized with the system illustrated in FIG. 2, including but not limited to drying operations that may facilitate removal of the mixture 101 from the cavities 152 to form precursor shaped abrasive particles. That is, the mixture 101 may undergo some appreciable drying while contained in the cavities 152 of the tool 151. Moreover, the process of attaching a plurality of abrasive particles to one or more surfaces of the mixture 101 while it resides in the cavities or after it has been removed from the cavities 152 (i.e., on the surfaces of the precursor shaped abrasive particles) may be utilized with the system 150 of FIG. 2.

The system of FIG. 2 may include one or more components described in U.S. Pat. No. 9,200,187. For example, the system 150 can include a backing plate underlying and abutting the tool 151 during the extrusion of the mixture into the cavities 152 of the tool 151. The backing plate may allow the cavities 152 to be filled with mixture 101. The tool 151 can be translated over the backing plate such that the tool abuts the backing plate in the deposition zone when the mixture 101 is being deposited in the cavities 152, and as the tool 151 is translated away from the deposition zone, the tool 151 is translated away from the backing plate.

The tool can be translated to an ejection zone, where at least one ejection assembly can be configured to direct an ejection material at the mixture 101 contained within the cavities 152 and eject the mixture 101 from the cavities to form precursor shaped abrasive particles. The ejection material may include an aerosol comprising a gas phase component, a liquid phase component, a solid phase component, and a combination thereof.

Figure 3:
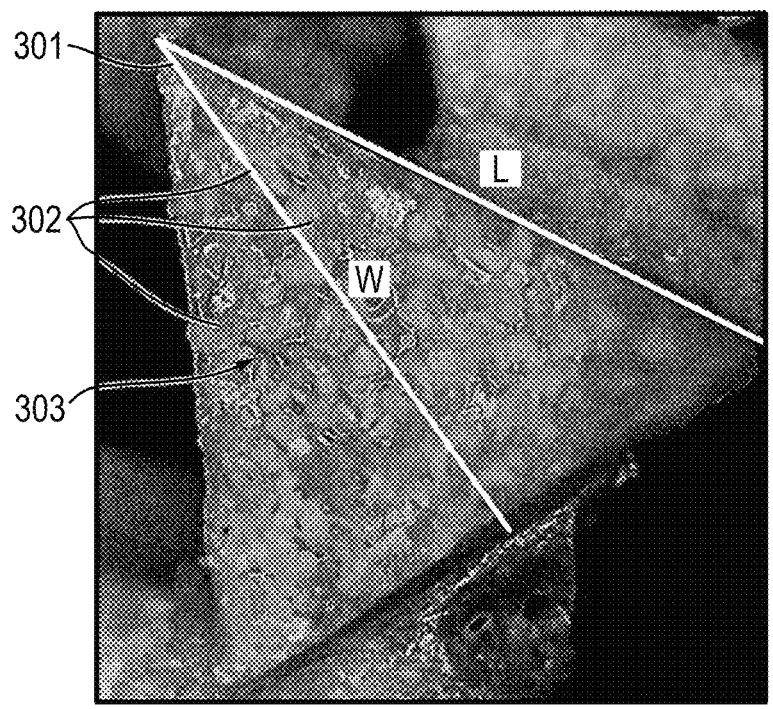
FIG. 3 includes an image of an abrasive particle according to an embodiment.

FIG. 3 includes an image of an abrasive particle according to an embodiment. The abrasive particle can be a composite shaped abrasive particle 300 including a shaped abrasive particle having a body 301 and a plurality of abrasive particles 302 attached to at least one surface 303, such as a major surface of the body 301 of the shaped abrasive particle. As shown, the shaped abrasive particle can have a triangular two-dimensional shape as viewed in a plane defined by a length (L) and a width (W) of the body 301. However, it will be appreciated that the shaped abrasive particles can have other two dimensional shapes, including but not limited to polygons, ellipsoids, numerals, Greek alphabet characters, Latin alphabet characters, Russian alphabet characters, complex shapes having a combination of polygonal shapes, and a combination thereof.

According to one embodiment, shaped abrasive particle can include a first major surface 303, a second major surface (e.g., a bottom surface) opposite the first major surface, and a side surface extending between the first and second major surfaces. The plurality of abrasive particles 302 can be bonded to any surface of the body, including for example, the first major 303 of the body 301. In other instances, the plurality of abrasive particles 302 can be bonded to at least two surfaces of the body. For example, the plurality of abrasive particles 302 can be bonded to at least two major surfaces of the body 301, such as those surfaces having the greatest surface area compared to all surfaces of the body 301, which in the particle of FIG. 3 can include the first and second major surfaces. In still other embodiments, the plurality of abrasive particles 302 can be bonded to at least two surfaces of the body 301, which can include one or more side surfaces. For example, the plurality of abrasive particles 302 can be bonded to an upper surface and a side surface of the body 301. Alternatively, the plurality of abrasive particles 302 can be bonded to a bottom surface and a side surface of the body 301. It will be appreciated that in at least one embodiment, the plurality of abrasive particles 302 can be attached to all of the surfaces of the body 301 of the shaped abrasive particle. Still, certain embodiments may utilize selective placement of the abrasive particles, such that certain surfaces (e.g., one or more major surfaces of the body 301) have a plurality of abrasive particles attached thereto, but one or more other surfaces (e.g., the side surfaces of the body 301) may be essentially free of the plurality of abrasive particles. A surface that is essentially free of abrasive particles can include a small number of abrasive particles, which may be accidentally deposited or bonded to the surface, but lacks the full coverage of abrasive particles across the entire surface. For example, a surface may include not greater than 10 abrasive particles and be considered essentially free of abrasive particles. In still another instance, a surface can have no abrasive particles bonded to the surface and be essentially free of abrasive particles. Those abrasive particles including a shaped abrasive particle and a plurality of abrasive particles attached to one or more surfaces may be referred to as composite abrasive particles.

In certain instances, controlling the percent coverage of the plurality of abrasive particles on the body of the shaped abrasive particle may facilitate improved forming, deployment, and/or performance of the abrasive particle. For certain abrasive particles of the embodiments herein, the plurality of abrasive particles 302 can cover at least about 1% of the total surface area of the body 301 of the shaped abrasive particle. In other instances, the plurality of abrasive particles 302 covering the exterior surface of the body 301 of the shaped abrasive particle can be greater, such as at least about 5%, at least 10%, at least 20%, at least 30% at least 40% at least 50%, at least 60%, at least 70%, at least 80%, at least 90% at least 95% or even at least 99% of the total surface area of the body 301 of the shaped abrasive particle. Still, in at least one embodiment, the plurality of abrasive particles 302 can cover not greater than 99%, such as not greater than 95%, not greater than 90%, not greater than 85%, not greater than 80%, not greater than 70%, not greater than 60%, not greater than 50%, not greater than 40%, not greater than 30%, not greater than 20%, or even not greater than 10% of the total surface area of the body 301 of the shaped abrasive particle. It will be appreciated that the plurality of abrasive particles 302 can cover a percentage of the total surface area of the body 301 of the shaped abrasive particle within a range including any of the minimum and maximum percentages noted above.

For certain abrasive particles of the embodiments herein, the coverage of the plurality of particles on one surface of the body of the shaped abrasive particle may be controlled to facilitate improved forming, deployment, and/or performance of the abrasive particle. For example, the plurality of abrasive particles 302 can cover at least about 1% of the total surface area of an exterior surface (e.g., first major surface, second major surface, side surface, etc.) of the body of the shaped abrasive particle. In other instances, the percent coverage of the plurality of abrasive particles on a given surface of the body of the shaped abrasive particle can be greater, such as at least about 5%, at least 10%, at least 20%, at least 30% at least 40% at least 50%, at least 60%, at least 70%, at least 80%, at least 90% or even at least 95% or even at least 99% or even 100% of the total surface area of the body 301 of the shaped abrasive particle. Still, in at least one embodiment, the plurality of abrasive particles 302 can cover not greater than 100% such as not greater than 99% or not greater than 95%, not greater than 90%, not greater than 85%, not greater than 80%, not greater than 70%, not greater than 60%, not greater than 50%, not greater than 40%, not greater than 30%, not greater than 20%, or even not greater than 10% of the total surface area of the body 301 of the shaped abrasive particle. It will be appreciated that the plurality of abrasive particles 302 can cover a percentage of the total surface area of the body 301 of the shaped abrasive particle within a range including any of the minimum and maximum percentages noted above. For example, the plurality of abrasive particles can cover at least 1% and not greater than 99% of the total surface area of the first major surface. In yet another embodiment, the plurality of abrasive particles can cover at least 30% and not greater than 99% of the total surface area of the first major surface. In still another embodiment, the plurality of abrasive particles can cover at least 40% and not greater than 99% of the total surface area of the first major surface. According to another aspect, the plurality of abrasive particles can cover at least 80% and not greater than 99% of the total surface area of the first major surface.

For certain abrasive particles of the embodiments herein, the coverage of the plurality of particles on one surface of the body of the shaped abrasive particle may be controlled to facilitate improved forming, deployment, and/or performance of the abrasive particle. For example, in one embodiment, the abrasive particle may include at least 10 particles of the plurality of abrasive particles on a major surface of the body of the shaped abrasive particle. In still other instances, the number of particles of the plurality of abrasive particles on a first major surface of the body can be greater, such as at least 12 or at least 15 or at least 18 or at least 20 or at least 22 or at least 25 or at least 27 or at least 30. Still, depending upon the forming conditions, the average number of particles on a first major surface of the body can be not greater than 500, such as not greater than 400 or not greater than 300 or not greater than 200 or not greater than 100 or not greater than 80 or not greater than 60 or not greater than 50. It will be appreciated that the average number of abrasive particles on the first major surface of the body of the shaped abrasive particle can be within a range including any of the minimum and maximum values noted above. For example, the average number of abrasive particles can be at least 10 and not greater than 500, such as at least 10 and not greater than 200 or at least 15 and not greater than 200 or at least 20 and not greater than 100. Furthermore, it will be appreciated that such average numbers may be true for any other surfaces of the body of the shaped abrasive particle.

According to one embodiment, the plurality of abrasive particles 302 can account for at least 1 wt % of a total weight of the abrasive particle 300, such as at least 2 wt %, at least 3 wt %, at least 4 wt %, at least 5 wt %, at least 6 wt %, at least 7 wt %, at least 8 wt %, at least 9 wt %, at least 10 wt %, at least about 20 wt %, at least about 30 wt %, at least about 40 wt %, or even at least about 50 wt %. Still, in a non-limiting embodiment, the plurality of abrasive particles 302 can be not greater than about 80 wt %, such as not greater than about 60 wt %, not greater than about 40 wt %, not greater than about 30 wt %, or even not greater than about 20 wt %, not greater than 10 wt %, not greater than 8 wt %, not greater than 6 wt %, not greater than 5 wt, or not greater than 4 wt % or even not greater than 3 wt % of a total weight of the abrasive particle 300. It will be appreciated that the plurality of abrasive particles 302 can account for a particular weight percent of the total weight of the abrasive particle within a range including any of the minimum and maximum percentages noted above. It will also be appreciated that such percentages can represent an average value calculated for a plurality of abrasive particles, wherein each of the abrasive particles include a shaped abrasive particle having a plurality of abrasive particles bonded to at least one surface of the body of the shaped abrasive particle. Such average values are calculated from a random and statistically relevant sample size of abrasive particles.

The weight percent of the plurality of abrasive particles can be calculated by obtaining a first sample of the particles including a minimum of 300 mg of the abrasive particles having the plurality of abrasive particles bonded to at least one surface. The mass (M1) of the particles is measured. The particles are spread on a flat surface providing suitable contrast to accurately count the number of particles (N). A camera is used to take a picture of the particles and using suitable imaging software, (e.g. ImageJ), the number of coated particles (N1) is counted. The average mass per grit (Mg1) of the grains with the plurality of abrasive particles is calculated according to the formula Mg1=M1/N1.

The same process is conducted for a sample of particles without the plurality of abrasive particles (i.e., bare abrasive particles). The average mass per grit (Mg2) is calculated for the bare sample. The average weight percentage of the plurality of abrasive particles is then calculated according to the formula 100×[(Mg2−Mg1)/Mg1].

The plurality of abrasive particles 302 may be selected from a particular type of material to facilitate suitable formation of the composite shaped abrasive particles. For example, the plurality of abrasive particles 302 can include a material from the group of oxides, carbides, nitrides, borides, oxycarbides, oxynitrides, oxyborides, natural minerals, synthetic materials, carbon-based materials, and a combination thereof. In one particular embodiment, the plurality of abrasive particles can include alumina, and more particularly can consist essentially of alpha alumina.

For at least one embodiment, the plurality of abrasive particles 302 can include a material having a particular coefficient of thermal expansion (CTE) relative to the CTE of the body 301 that can facilitate improved forming, deployment, and/or performance of the abrasive particle. For example the plurality of abrasive particles 302 can have a CTE that is not greater than about 50% different than a CTE of the body 301 of the shaped abrasive particle according to the formula [(CTE1-CTE2)/CTE1]×100%, where CTE1 represents the higher CTE value relative to CTE2. In certain instances, the plurality of abrasive particles 302 can have a CTE that is less than the CTE of the body 301. In another embodiment, the plurality of abrasive particles 302 can have a CTE that is greater than the CTE of the body 301. Still, the plurality of abrasive particles 302 can have a CTE that is not greater than about 40% different, not greater than about 30% different, not greater than about 20% different, or even not greater than about 10% different compared to the CTE of the body 301. Still, in one non-limiting embodiment, the CTE of the plurality of abrasive particles 302 may be essentially the same as the CTE of the body 301. In yet another embodiment, the CTE of the plurality of abrasive particles 302 can be at least about 0.5% different, at least about 1% different, or at least about 3% different compared to the CTE of the body 301. It will be appreciated that the plurality of abrasive particles can have a difference in CTE relative to the CTE of the body that is within a range including any of the minimum and maximum values noted above. The CTE of the body of the shaped abrasive particle and the plurality of abrasive particles may be measured in the finally-formed abrasive particle after sintering.

According to an embodiment, the plurality of abrasive particles 302 are selected from the group consisting of crushed grains, irregularly shaped grains, elongated grains, agglomerates, aggregates, fine shaped abrasive particles, flakes, and a combination thereof. In one particular instance, the plurality of abrasive particles consists essentially of crush grains, which may have a generally irregular shape. Flakes may be elongated or non-elongated grains that have a very small thickness relative to the width and length of the particle.

Shaped abrasive particles may be formed through particular processes, including molding, printing, casting, extrusion, and the like as described herein and will be described further herein. In at least one embodiment, at least a portion of the plurality of abrasive particles 302 may include shaped abrasive particles of a significantly finer size compared to the body 301 of the shaped abrasive particle 301. The shaped abrasive particles included in the plurality of abrasive particles 302 overlying the body 301 of the shaped abrasive particle can have any of the attributes of the shaped abrasive particles defined in the embodiments herein.

The body 301 of the shaped abrasive particle can have a length (L), a width (W) and a height (H), wherein L≥W≥H. The length may define the longest dimension of the body 301, and in some instances may be equal to the dimension defining the width. In one embodiment, the width can generally define the second longest dimension of the body 301, but in certain instances, the width can have the same value as the length. The height may generally define the shortest dimension of the body and may extend in a direction perpendicular to the plane defined by the length and width of the body 301. According to one particular embodiment, the width can be greater than or equal to the height.

In accordance with an embodiment, the body 301 of the shaped abrasive particle can have an average particle size, as measured by the largest dimension measurable on the body 301 (i.e., the length), of at least about 100 microns. In fact, the body 301 of the shaped abrasive particle can have an average particle size of at least about 150 microns, such as at least about 200 microns, at least about 300 microns, at least about 400 microns, at least about 500 microns, at least about 500 microns, at least about 600 microns, at least about 800 microns, or even at least about 900 microns. Still, the abrasive particle can have an average particle size that is not greater than about 5 mm, such as not greater than about 3 mm, not greater than about 2 mm, or even not greater than about 1.5 mm. It will be appreciated that the abrasive particle can have an average particle size within a range including any of the minimum and maximum values noted above.

The abrasive grains (i.e., crystallites) contained within the body of the shaped abrasive particles or the plurality of abrasive particles may have an average grain size that is generally not greater than about 100 microns. In other embodiments, the average grain size can be less, such as not greater than about 80 microns, not greater than about 50 microns, not greater than about 30 microns, not greater than about 20 microns, not greater than about 10 microns, not greater than about 1 micron, not greater than about 0.9 microns, not greater than about 0.8 microns, not greater than about 0.7 microns, or even not greater than about 0.6 microns. Still, the average grain size of the abrasive grains contained within the body of the abrasive particles can be at least about 0.01 microns, such as at least about 0.05 microns, at least about 0.06 microns, at least about 0.07 microns, at least about 0.08 microns, at least about 0.09 microns, at least about 0.1 microns, at least about 0.12 microns, at least about 0.15 microns, at least about 0.17 microns, at least about 0.2 microns, or even at least about 0.5 microns. It will be appreciated that the abrasive grains can have an average grain size within a range between any of the minimum and maximum values noted above.

The plurality of abrasive particles 302 may have a particular median particle size relative to one or more dimensions of the body 301 of the shaped abrasive particle. For example, the plurality of abrasive particles 302 can have a median particle size (D50) that can be not greater than the length (L) of the body 301 of the shaped abrasive particle. More particularly, the plurality of abrasive particles 302 can have a median particle size (D50) that is not greater than about 90% of the length (L), such as not greater than about 80% of the length, not greater than about 70% of the length, not greater than about 60% of the length, not greater than about 50% of the length, not greater than about 40% of the length, not greater than about 30% of the length, not greater than about 25% of the length, not greater than about 20% of the length, not greater than about 18% of the length, not greater than about 15% of the length, not greater than about 12% of the length, not greater than about 10% of the length, not greater than about 8% of the length, not greater than about 6% of the length, or even not greater than about 5% of the length of the body 301. Still, in another non-limiting embodiment, the plurality of abrasive particles 302 can have a median particle size (D50) that is at least about 0.1% of the length (L), such as at least about 0.5% of the length, at least about 1% of the length, or even at least about 2% of the length, at least about 3% of the length, at least about 4% of the length, at least about 5% of the length, at least about 6% of the length, at least about 7% of the length, at least about 8% of the length, at least about 9% of the length, at least about 10% of the length, at least about 12% of the length, at least about 15% of the length, at least about 18% of the length, at least about 20% of the length, at least about 25% of the length, or even at least about 30% of the length of the body 301. It will be appreciated that the plurality of abrasive particles 302 can have a median particle size (D50) that is within a range including any of the minimum and maximum percentages noted above.

According to one particular embodiment, the plurality of abrasive particles 302 can have a median particle size (D50) that is at least 0.1% and not greater than about 90% of the length (L) of the body of the shaped abrasive particle, which can be calculated by [(D50)/(L)]×100%. In another embodiment, the plurality of abrasive particles 302 can have a median particle size (D50) of at least 0.1% and not greater than about 50% of the length of the body, such as at least 0.1% and not greater than about 20% or at least 0.1% and not greater than about 10% or at least 0.1% and not greater than about 8% or at least 0.1% and not greater than about 6%, or at least 0.1% and not greater than about 5% or even at least 1% and not greater than 5% of the length of the body of the shaped abrasive particle. Moreover, it has been noted in certain instances, that the relative median particle size (D50) of the plurality of abrasive particles 302 compared to the length of the body may impact the percent coverage of the abrasive particles on the body.

In another embodiment, the plurality of abrasive particles 302 can have a median particle size (D50) that is not greater than about 90% of the width (W), such as not greater than about 80% of the width, not greater than about 70% of the width, not greater than about 60% of the width, not greater than about 50% of the width, not greater than about 40% of the width, not greater than about 30% of the width, not greater than about 25% of the width, not greater than about 20% of the width, not greater than about 18% of the width, not greater than about 15% of the width, not greater than about 12% of the width, not greater than about 10% of the width, not greater than 8% of the width, not greater than 6% of the width, or even not greater than 5% of the width of the body 301. Still, in another non-limiting embodiment, the plurality of abrasive particles 302 can have a median particle size (D50) that is at least about 0.1% of the width (W), such as at least about 0.5% of the width, at least about 1% of the width, at least about 2% of the width, at least about 3% of the width, at least about 4% of the width, at least about 5% of the width, at least about 6% of the width, at least about 7% of the width, at least about 8% of the width, at least about 9% of the width, at least about 10% of the width, at least about 12% of the width, at least about 15% of the width, at least about 18% of the width, at least about 20% of the width, at least about 25% of the width, at least about 30% of the width of the body 301. It will be appreciated that the plurality of abrasive particles 302 can have a median particle size (D50) that is within a range including any of the minimum and maximum percentages noted above.

According to one particular embodiment, the plurality of abrasive particles 302 can have a median particle size (D50) that is at least 0.1% and not greater than about 90% of the width of the body of the shaped abrasive particle, which can be calculated by [(D50)/(W)]×100. In another embodiment, the plurality of abrasive particles 302 can have a median particle size (D50) of at least 0.1% and not greater than about 50% of the width of the body, such as at least 0.1% and not greater than about 20% or at least 0.1% and not greater than about 10% or at least 0.1% and not greater than about 8% or at least 0.1% and not greater than about 6%, or at least 1% and not greater than about 6% or even at least 1% and not greater than 4% of the width of the body of the shaped abrasive particle. Moreover, it has been noted in certain instances, that the relative median particle size (D50) of the plurality of abrasive particles 302 compared to the width of the body may impact the percent coverage of the abrasive particles on the body.

In another embodiment, the plurality of abrasive particles 302 can have a median particle size (D50) that is not greater than about 90% of the height, such as not greater than about 80% of the height, not greater than about 70% of the height, not greater than about 60% of the height, not greater than about 50% of the height, not greater than about 40% of the height, not greater than about 30% of the height, not greater than about 25% of the height, not greater than about 20% of the height, not greater than about 18% of the height, not greater than about 15% of the height, not greater than about 12%, the height, not greater than about 10% of the height, not greater than about 8% of the height, not greater than about 6% of the height, not greater than about 5% of the height of the body 301. Still, in another non-limiting embodiment, the plurality of abrasive particles 302 can have a median particle size (D50) that is at least about 0.1% of the height, such as at least about 0.5% of the height, at least about 1% of the height, at least about 2% of the height, at least about 3% of the height, at least about 4% of the height, at least about 5% of the height, at least about 6% of the height, at least about 7% of the height, at least about 8% of the height, at least about 9% of the height, at least about 10% of the height, at least about 12% of the height, at least about 15% of the height, at least about 18% of the height, at least about 20% of the height, at least about 25% of the height, at least about 30% of the height of the body 301. It will be appreciated that the plurality of abrasive particles 302 can have a median particle size (D50) that is within a range including any of the minimum and maximum percentages noted above.

According to one particular embodiment, the plurality of abrasive particles 302 can have a median particle size (D50) that is at least 0.1% and not greater than about 90% of the height of the body of the shaped abrasive particle, which can be calculated by [(D50)/(H)]×100. In another embodiment, the plurality of abrasive particles 302 can have a median particle size (D50) of at least 0.1% and not greater than about 50% of the height of the body, such as at least 0.1% and not greater than about 20% or at least 1% and not greater than about 18% or at least 5% and not greater than about 18% or at least 8% and not greater than about 16% of the height of the body of the shaped abrasive particle. Moreover, it has been noted in certain instances, that the relative median particle size (D50) of the plurality of abrasive particles 302 compared to the height of the body may impact the percent coverage of the abrasive particles on the body.

In accordance with an embodiment, the plurality of abrasive particles 302 can have a median particle size (D50) of not greater than about 1 mm, such as not greater than about 800 microns, not greater than about 500 microns or not greater than 300 microns or not greater than 200 microns or not greater than 100 microns or not greater than 90 microns or not greater than 80 microns or not greater than 70 microns or not greater than 65 microns or not greater than 60 microns or not greater than 50 microns or even not greater than 40 microns. Still, in one non-limiting embodiment, the plurality of abrasive particles 302 can have a median particle size (D50) of at least about 0.1 microns, such as at least about 0.5 microns or at least 1 micron or at least 2 microns or at least 3 microns or at least 5 microns or at least 10 microns or at least 15 microns or at least 20 microns or at least 25 microns or at least 30 microns. It will be appreciated that the abrasive particle can have a median particle size within a range including any of the minimum and maximum values noted above. For example, the plurality of abrasive particles can have a median particle size (D50) of at least 0.1 microns and not greater than 500 microns or at least 0.5 microns and not greater than 100 microns or at least 1 micron and not greater than 65 microns. It has been noted in certain instances, that the median particle size (D50) of the plurality of abrasive particles 302 may impact the formation, deployment, and/or performance of the abrasive particles.

For at least one embodiment, at least a portion of the abrasive particles of the plurality of abrasive particles can be at least partially embedded in at least one surface the body 301 of the shaped abrasive particle. Moreover, in certain instances, the portion can include a majority of the abrasive particles of the plurality of abrasive particles 302 that can be at least partially embedded in at least one surface of the body 301 of the shaped abrasive particle. According to another embodiment, the portion of the plurality of abrasive particles can be a minority of the particles of the plurality of abrasive particles that are at least partially embedded within at least one surface of the body 301. It will be appreciated that embedded particles can extend into the volume of the body below an exterior surface of the body 301, as opposed to particles that are overlying the surface of the body 301, but may not be embedded and extending into the volume of the body 301 (e.g., particles that are applied as a certain type of coating). Moreover, the feature of the embedded abrasive particles is distinct from patterned surface features, such as grooves or rounded protrusions, wherein the abrasive particles are embedded into the volume of the body of the shaped abrasive particle, and the plurality of abrasive particles have sharp and irregular corners (e.g., in the context of crushed and irregular shaped abrasive particles) protruding from the surface. Without wishing to be tied to a particular theory, it is thought that the sharp and irregular surfaces of the plurality of abrasive particles, as well as the random distribution of the abrasive particles on the surface of the shaped abrasive particle may impact the self-sharpening behavior of the composite abrasive particle, and thus may improve the performance of the abrasive particle and associated abrasive article. The plurality of abrasive particles may also facilitate improved retention of the abrasive particles in certain bond matrix materials, including for example in the bonding layers of a coated abrasive or within the three-dimensional volume of a bond material within a bonded abrasive article.

Figure 10:
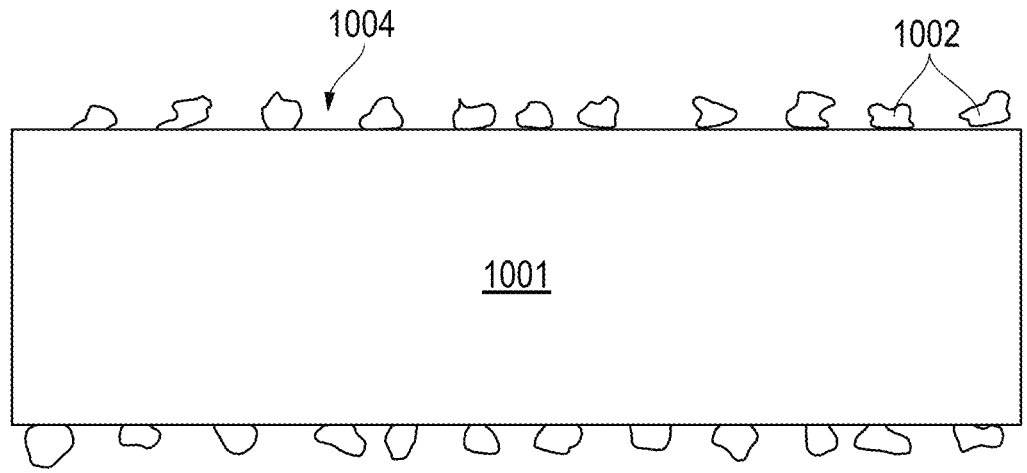
FIG. 10 includes a cross-sectional illustration of a shaped abrasive particle according to an embodiment.

According to one embodiment, at least one of the abrasive particles of the plurality of abrasive particles can be attached to a surface of the body of the shaped abrasive particle and define an acute contact angle. Notably, the provision of the plurality of abrasive particles according to the processes herein can facilitate the attachment of one or more of the abrasive particles of the plurality abrasive particles to the body in a manner that defines an acute angle. A random sample of abrasive particles can be obtained. Each abrasive particle may be sectioned or ground transverse to the longitudinal axis through the middle half of the body. To obtain a suitable view of the cross-section, such as illustrated in FIG. 10, wherein the body of the shaped abrasive particle 1001 is clearly shown and the plurality of abrasive particles 1002 attached to at least one major surface 1004 are also visible. Each of the abrasive particles can be mounted in an epoxy resin, which is cured and solidified. After mounting each of the abrasive particles in the epoxy resin, a wafer slicing saw can be used to cut out each of the abrasive particles and a portion of the epoxy surrounding each of the abrasive particles, such that discrete samples are formed and include a whole abrasive particle surrounded by a mass of epoxy. Each sample is then polished to remove a portion of the grain and expose the transverse plane used to evaluate the contact area of the grains that exposed. The transverse plane should be smooth such that the perimeter of the resulting cross-sectional is well defined. If necessary, the resulting cross-sectional plane can be polished to a uniform height.

After completing the foregoing preparation of the samples, each abrasive particle can be mounted and viewed by an optical microscope (e.g., Olympus DSX500) at 10× magnification with a field of view of 2 mm. Using the optical microscope, an image of the cross-section of each abrasive particle is obtained, such as provided in FIG. 11. Using a suitable imaging program, such as ImageJ (available from the National Institute of Health), the contact angle created by abutting surfaces of the abrasive particles and the surface of the body are measured.

Figure 11:
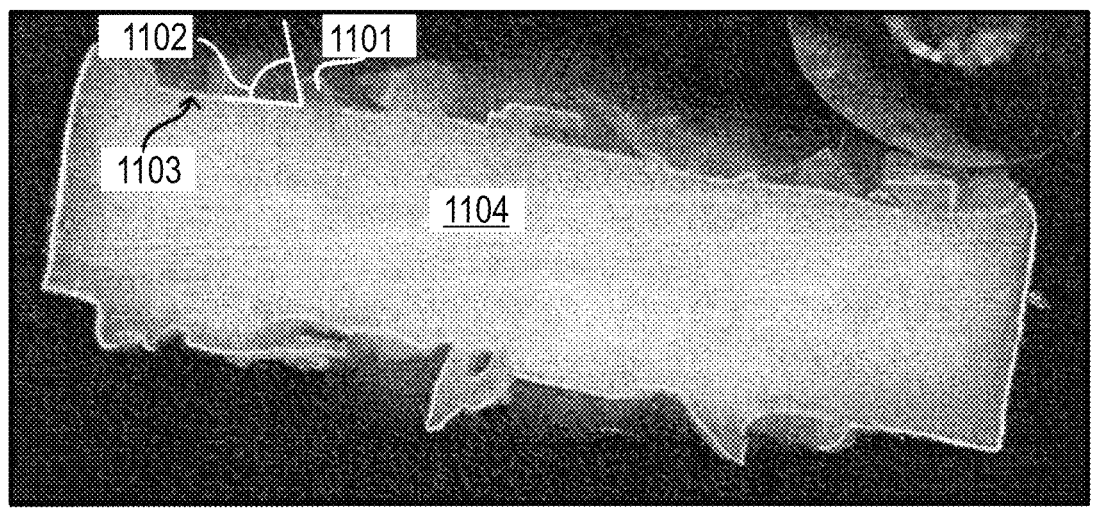
FIG. 11 includes cross-sectional image of a shaped abrasive particle according to an embodiment.

Referring to FIG. 11, the abrasive particle 1101 can form a contact angle 1102 with the major surface 1103 of the body 1104. Notably, at least a portion of the abrasive particles create a contact angle with the body that is less than 90 degrees. For example, the abrasive particle contact angle can be less than 88 degrees, such as less than 85 degrees or less than 80 degrees or less than 75 degrees or less than 70 degrees or less than 65 degrees or less than 60 degrees or less than 55 degrees or less than 50 degrees or less than 45 degrees or less than 40 degrees or less than 35 degrees or less than 30 degrees or less than 25 degrees or less than 20 degrees or less than 15 degrees or less than 10 degrees or less than 5 degrees. In yet another embodiment, the abrasive particle contact angle can be at least 1 degree or at least 5 degrees or at least 10 degrees or at least 15 degrees or at least 20 degrees or at least 25 degrees or at least 30 degrees or at least 35 degrees or at least 40 degrees. It will be appreciated that the abrasive particle contact angle can be within a range including any of the minimum and maximum values noted above.

In another embodiment, at least a portion of the plurality of abrasive particles 302 can be bonded directly to at least one surface of the body 301 of the shaped abrasive particle. More particularly, at least a portion of the plurality of abrasive particles 302 can be sinter-bonded to at least one surface of the body 301 of the shaped abrasive particle. In at least one embodiment, all of the abrasive particles of the plurality of abrasive particles 302 can be sinter-bonded to at least one surface of the body 301 of the shaped abrasive particle.

Figure 4:
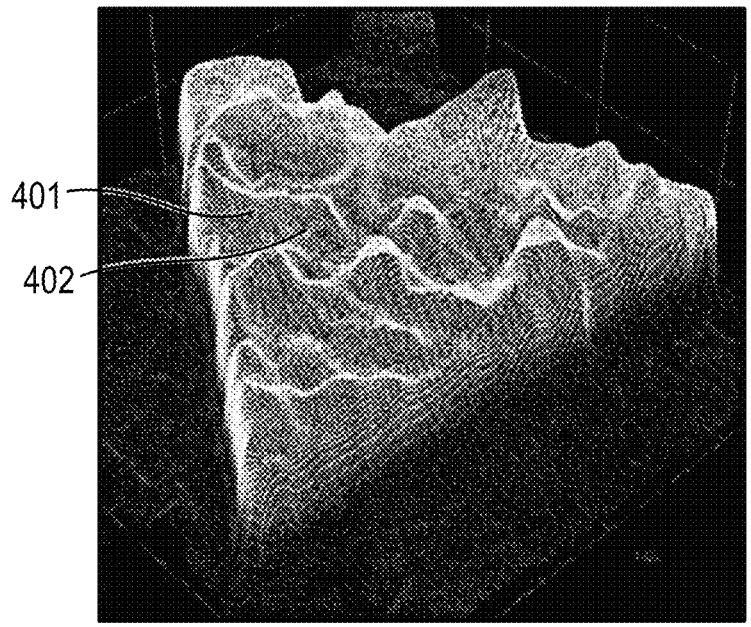
FIG. 4 includes a three-dimensional image of an abrasive particle according to an embodiment.

FIG. 4 includes a three-dimensional image of an upper surface of an abrasive particle according to an embodiment. As illustrated, the abrasive particle 400 includes a body 401 having an upper surface 402 with a plurality of abrasive particles attached thereto. As illustrated in the three-dimensional mapping image, the plurality of abrasive particles creates an upper surface having a rough contour with a plurality of randomly arranged peaks and valleys. Such a rough contour may facilitate improved bonding of the abrasive particle in various fixed abrasive articles relative to shaped abrasive particles with smooth surfaces. Moreover, the rough and varied contour of the upper surface 402 may facilitate improved abrasive performance in various fixed abrasives, as a greater number of sharp abrasive surfaces are present as compared to a conventional, smooth surfaced shaped abrasive particle. In certain instances, the existence of the rough contour may limit the need to deploy the abrasive particle in a particular orientation, which is generally the desired approach for conventional shaped abrasive particles, particularly in coated abrasive articles. Still, in other embodiments, it may be advantageous to deploy the abrasive particles in a particular orientation in a fixed abrasive, wherein the one or more surfaces including the plurality of abrasive particles have a controlled orientation relative to one or more references axes within the fixed abrasive article.

According to one embodiment, the plurality of abrasive particles can be attached to the first major surface and the first major surface can have a surface roughness greater than a surface roughness of another surface (e.g., a side surface) of the body that has fewer abrasive particles attached thereto. In one particular embodiment, the first major surface can include a plurality of abrasive particles bonded thereto and the body can be essentially free of any abrasive particles bonded to the side surface, and in such instances, the surface roughness of the first major surface can be significantly greater than the side surface. Surface roughness can be measured using any suitable techniques, including for example optical metrology techniques. In yet another embodiment, the first major surface can include a plurality of abrasive particles bonded thereto and the body can be essentially free of any abrasive particles bonded to the second major surface, and in such instances, the surface roughness of the first major surface can be significantly greater than the second major surface.

Figure 5:
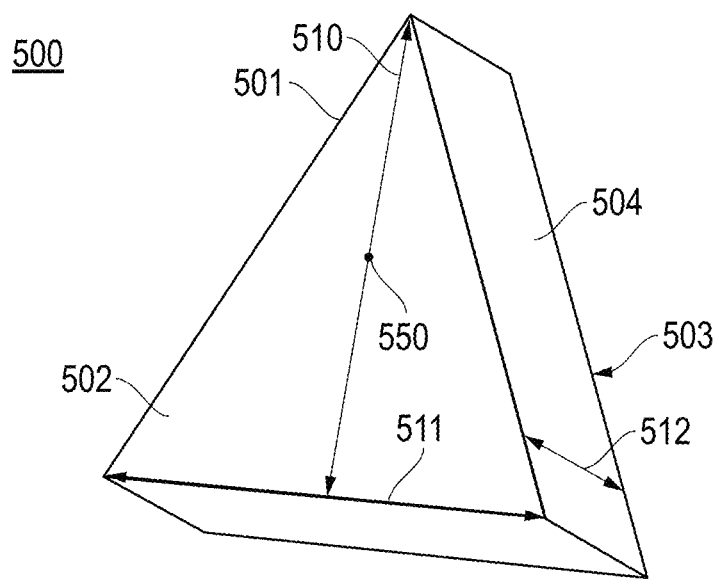
FIG. 5 includes a perspective view illustration of a shaped abrasive particle that may be form the base of an abrasive particle in accordance with an embodiment.

FIG. 5 includes a perspective view illustration of a shaped abrasive particle in accordance with an embodiment. The shaped abrasive particle 500 can include a body 501 including a major surface 502, a major surface 503, and a side surface 504 extending between the major surfaces 502 and 503. As illustrated in FIG. 5, the body 501 of the shaped abrasive particle 500 is a thin-shaped body, wherein the major surfaces 502 and 503 are larger than the side surface 504. Moreover, the body 501 can include an axis 510 extending from a point to a base and through the midpoint 550 on the major surface 502. The axis 510 can define the longest dimension of the major surface extending through the midpoint 550 of the major surface 502, which may be the length or width of the body depending on the geometry, but in the illustrated embodiment of FIG. 5 defines the width. The body 501 can further include an axis 511 defining a dimension of the body 501 extending generally perpendicular to the axis 510 on the same major surface 502, which in the illustrated embodiment of an equilateral triangle defines the length of the body 501. Finally, as illustrated, the body 501 can include a vertical axis 512, which in the context of thin shaped bodies can define a height (or thickness) of the body 501. For thin-shaped bodies, the length of the axis 510 is equal to or greater than the vertical axis 512. As illustrated, the height 512 can extend along the side surface 504 between the major surfaces 502 and 503 and perpendicular to the plane defined by the axes 510 and 511. It will be appreciated that reference herein to length, width, and height of the abrasive particles may be referenced to average values taken from a suitable sampling size of abrasive particles of a batch of abrasive particles.

The shaped abrasive particles can include any of the features of the abrasive particles of the embodiments herein. For example, the shaped abrasive particles can include a crystalline material, and more particularly, a polycrystalline material. Notably, the polycrystalline material can include abrasive grains. In one embodiment, the body of the abrasive particle, including for example, the body of a shaped abrasive particle can be essentially free of an organic material, including for example, a binder. In at least one embodiment, the abrasive particles can consist essentially of a polycrystalline material.

Some suitable materials for use as abrasive particles can include nitrides, oxides, carbides, borides, oxynitrides, oxyborides, diamond, carbon-containing materials, and a combination thereof. In particular instances, the abrasive particles can include an oxide compound or complex, such as aluminum oxide, zirconium oxide, titanium oxide, yttrium oxide, chromium oxide, strontium oxide, silicon oxide, magnesium oxide, rare-earth oxides, and a combination thereof. In one particular embodiment, the abrasive particles can include at least 95 wt % alumina for the total weight of the body. In at least one embodiment, the abrasive particles can consist essentially of alumina. Still, in certain instances, the abrasive particles can include not greater than 99.5 wt % alumina for the total weight of the body. Moreover, in particular instances, the shaped abrasive particles can be formed from a seeded sol-gel. In at least one embodiment, the abrasive particles of the embodiments herein may be essentially free of iron, rare-earth oxides, and a combination thereof.

In accordance with certain embodiments, certain abrasive particles can be compositional composite articles including at least two different types of grains within the body of the shaped abrasive particle or within the body of the abrasive particles of the plurality of abrasive particles. It will be appreciated that different types of grains are grains having different compositions with regard to each other. For example, the body of the shaped abrasive particle can be formed such that is includes at least two different types of grains, wherein the two different types of grains can be nitrides, oxides, carbides, borides, oxynitrides, oxyborides, carbon-based materials, diamond, naturally occurring minerals, rare-earth-containing materials, and a combination thereof.

FIG. 5 includes an illustration of a shaped abrasive particle having a two-dimensional shape as defined by the plane of the upper major surface 502 or major surface 503, which has a generally triangular two-dimensional shape, such as an equilateral triangle. It will be appreciated that the shaped abrasive particles of the embodiments herein are not so limited and can include other two-dimensional shapes. For example, the shaped abrasive particles of the embodiment herein can include particles having a body with a two-dimensional shape as defined by a major surface of the body from the group of shapes including polygons, irregular polygons, irregular polygons including arcuate or curved sides or portions of sides, ellipsoids, numerals, Greek alphabet characters, Latin alphabet characters, Russian alphabet characters, Kanji characters, complex shapes having a combination of polygons shapes, star shapes, shapes with arms extending from a central region (e.g., cross-shaped bodies) and a combination thereof.

It will also be appreciated that the shaped abrasive particles need not be limited to thin shapes defined by only a two-dimensional shape of a major surface, but can include three-dimensional shapes. For example, the body can have a three-dimensional shape selected from the group consisting of a polyhedron, a pyramid, an ellipsoid, a sphere, a prism, a cylinder, a cone, a tetrahedron, a cube, a cuboid, a rhombohedron, a truncated pyramid, a truncated ellipsoid, a truncated sphere, a truncated cone, a pentahedron, a hexahedron, a heptahedron, an octahedron, a nonahedron, a decahedron, a Greek alphabet letter, a Latin alphabet character, a Russian alphabet character, a Kanji character, complex polygonal shapes, irregular shaped contours, a volcano shape, a monostatic shape, and a combination thereof. A monostatic shape is a shape with a single stable resting position. Accordingly, shaped abrasive particles having a monostatic shape can be applied to a substrate and consistently be oriented in the same position, as they have only one stable resting position. For example, shaped abrasive particles having a monostaic shape may be suitable when applying the particles to a backing via gravity coating, which may be used in the formation of a coated abrasive product. More particularly, the shaped abrasive particles may be mono-monostatic shapes, which describe three dimensional objects having a shape with only one unstable point of balance. According to one particular embodiment, the shaped abrasive particle may have the shape of a gomboc. In another embodiment, the shaped abrasive particle is a monostatic polyhedron with at least four surfaces.

Figure 6A:
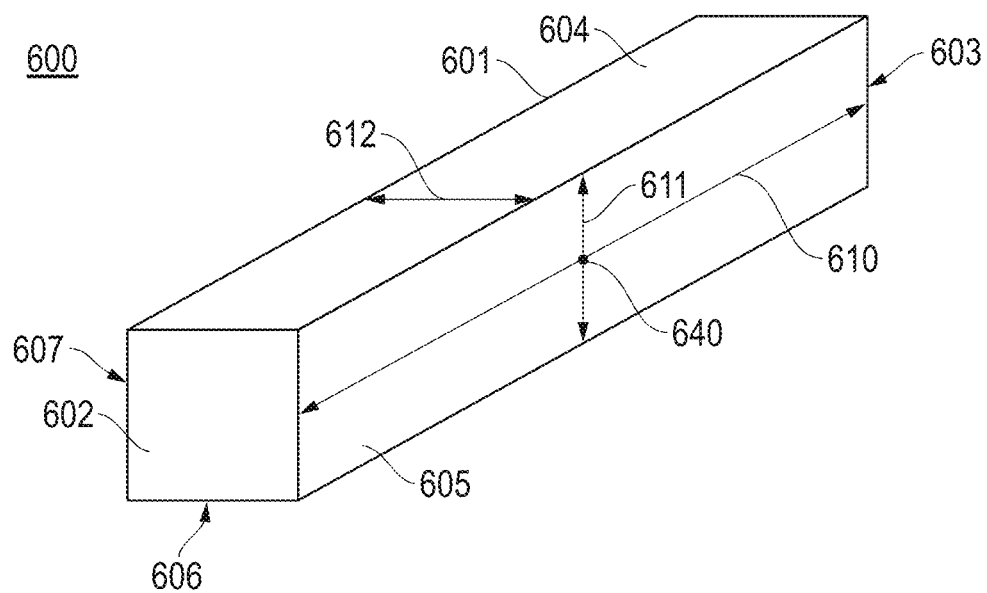
FIG. 6A includes a perspective view illustration of a shaped abrasive particle that may be used in accordance with an abrasive particle of an embodiment.

FIG. 6A includes a perspective view illustration of a shaped abrasive particle according to an embodiment. Notably, the shaped abrasive particle 600 can include a body 601 including a surface 602 and a surface 603, which may be referred to as end surfaces 602 and 603. The body can further include surfaces 604, 605, 606, 607 extending between and coupled to the end surfaces 602 and 603. The shaped abrasive particle of FIG. 6A is an elongated shaped abrasive particle having a longitudinal axis 610 that extends along the surface 605 and through the midpoint 640 between the end surfaces 602 and 603. It will be appreciated that the surface 605 is selected for illustrating the longitudinal axis 610, because the body 601 has a generally square cross-sectional contour as defined by the end surfaces 602 and 603. As such, the surfaces 604, 605, 606, and 607 have approximately the same size relative to each other. However in the context of other elongated abrasive particles, wherein the surfaces 602 and 603 define a different shape, for example a rectangular shape, wherein one of the surfaces 604, 605, 606, and 607 may be larger relative to the others, the largest surface of those surfaces defines the major surface, and therefore the longitudinal axis would extend along the largest of those surfaces. As further illustrated, the body 601 can include a lateral axis 611 extending perpendicular to the longitudinal axis 610 within the same plane defined by the surface 605. As further illustrated, the body 601 can further include a vertical axis 612 defining a height of the abrasive particle, wherein the vertical axis 612 can extend in a direction perpendicular to the plane defined by the longitudinal axis 610 and lateral axis 611 of the surface 605.

It will be appreciated that like the thin shaped abrasive particle of FIG. 5, the elongated shaped abrasive particle of FIG. 6A can have various two-dimensional shapes such as those defined with respect to the shaped abrasive particle of FIG. 5. The two-dimensional shape of the body 601 can be defined by the shape of the perimeter of the end surfaces 602 and 603. The elongated shaped abrasive particle 600 can have any of the attributes of the shaped abrasive particles of the embodiments herein.

Figure 6B:
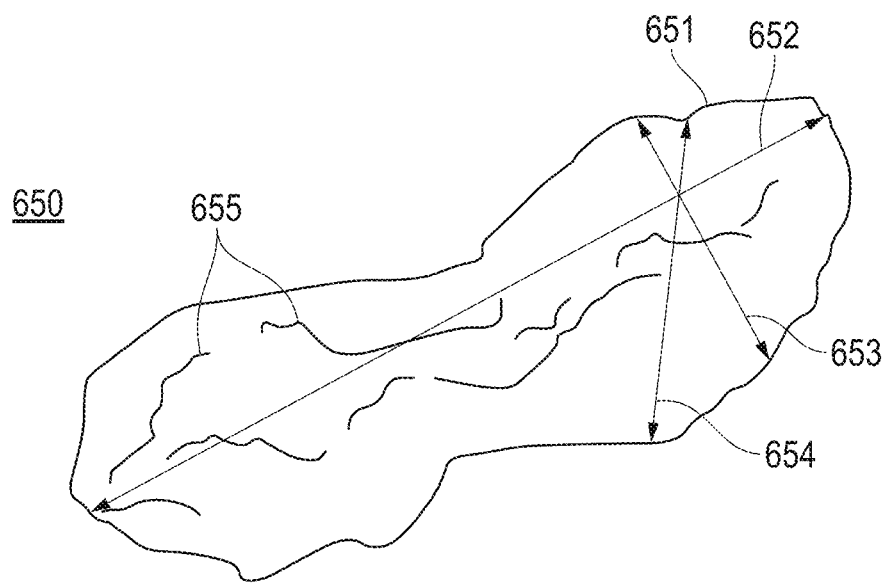
FIG. 6B includes a perspective view illustration of a non-shaped abrasive particle that may be used in accordance with an abrasive particle of an embodiment.

FIG. 6B includes an illustration of an elongated particle, which is a non-shaped abrasive particle. Shaped abrasive particles may be formed through particular processes, including molding, printing, casting, extrusion, and the like. Shaped abrasive particles are formed such that each particle has substantially the same arrangement of surfaces and edges relative to each other for shaped abrasive particles having the same two-dimensional and three-dimensional shapes. As such, shaped abrasive particles can have a high shape fidelity and consistency in the arrangement of the surfaces and edges relative to other shaped abrasive particles of the group having the same two-dimensional and three-dimensional shape. By contrast, non-shaped abrasive particles can be formed through different process and have different shape attributes. For example, non-shaped abrasive particles are typically formed by a comminution process, wherein a mass of material is formed and then crushed and sieved to obtain abrasive particles of a certain size. However, a non-shaped abrasive particle will have a generally random arrangement of the surfaces and edges, and generally will lack any recognizable two-dimensional or three dimensional shape in the arrangement of the surfaces and edges around the body. Moreover, non-shaped abrasive particles of the same group or batch generally lack a consistent shape with respect to each other, such that the surfaces and edges are randomly arranged when compared to each other. Therefore, non-shaped grains or crushed grains have a significantly lower shape fidelity compared to shaped abrasive particles.

As further illustrated in FIG. 6B, the elongated abrasive article can be a non-shaped abrasive particle having a body 651 and a longitudinal axis 652 defining the longest dimension of the particle, a lateral axis 653 extending perpendicular to the longitudinal axis 652 and defining a width of the particle. Furthermore, the elongated abrasive particle may have a height (or thickness) as defined by the vertical axis 654, which can extend generally perpendicular to a plane defined by the combination of the longitudinal axis 652 and lateral axis 653. As further illustrated, the body 651 of the elongated, non-shaped abrasive particle can have a generally random arrangement of edges 655 extending along the exterior surface of the body 651.

As will be appreciated, the elongated abrasive particle can have a length defined by longitudinal axis 652, a width defined by the lateral axis 653, and a vertical axis 654 defining a height. As will be appreciated, the body 651 can have a primary aspect ratio of length:width such that the length is greater than the width. Furthermore, the length of the body 651 can be greater than or equal to the height. Finally, the width of the body 651 can be greater than or equal to the height 654. In accordance with an embodiment, the primary aspect ratio of length:width can be at least 1.1:1, at least 1.2:1, at least 1.5:1, at least 1.8:1, at least 2:1, at least 3:1, at least 4:1, at least 5:1, at least 6:1, or even at least 10:1. In another non-limiting embodiment, the body 651 of the elongated shaped abrasive particle can have a primary aspect ratio of length:width of not greater than 100:1, not greater than 50:1, not greater than 10:1, not greater than 6:1, not greater than 5:1, not greater than 4:1, not greater than 3:1, or even not greater than 2:1. It will be appreciated that the primary aspect ratio of the body 651 can be with a range including any of the minimum and maximum ratios noted above. It will be appreciated that not all non-shaped abrasive particles are elongated abrasive particles, and some non-shaped abrasive particles can be substantially equiaxed, such that any combination of the length, width, and height are substantially the same. The non-shaped abrasive particles can be used as the plurality of abrasive particles overlying and bonded to the surface of the shaped abrasive particle. It will be appreciated that the non-shaped abrasive particles may also be used as the body of the abrasive particle to which the plurality of abrasive particles is bonded.

Furthermore, the body 651 of the elongated abrasive particle 650 can include a secondary aspect ratio of width:height that can be at least 1.1:1, such as at least 1.2:1, at least 1.5:1, at least 1.8:1, at least 2:1, at least 3:1, at least 4:1, at least 5:1, at least 8:1, or even at least 10:1. Still, in another non-limiting embodiment, the secondary aspect ratio width:height of the body 651 can be not greater than 100:1, such as not greater than 50:1, not greater than 10:1, not greater than 8:1, not greater than 6:1, not greater than 5:1, not greater than 4:1, not greater than 3:1, or even not greater than 2:1. It will be appreciated the secondary aspect ratio of width:height can be with a range including any of the minimum and maximum ratios of above.

In another embodiment, the body 651 of the elongated abrasive particle 650 can have a tertiary aspect ratio of length:height that can be at least 1.1:1, such as at least 1.2:1, at least 1.5:1, at least 1.8:1, at least 2:1, at least 3:1, at least 4:1, at least 5:1, at least 8:1, or even at least 10:1. Still, in another non-limiting embodiment, the tertiary aspect ratio length:height of the body 651 can be not greater than 100:1, such as not greater than 50:1, not greater than 10:1, not greater than 8:1, not greater than 6:1, not greater than 5:1, not greater than 4:1, not greater than 3:1, It will be appreciated that the tertiary aspect ratio the body 651 can be with a range including any of the minimum and maximum ratios and above.

The elongated abrasive particle 650 can have certain attributes of the other abrasive particles described in the embodiments herein, including for example, but not limited to, composition, microstructural features (e.g., average grain/crystallite size), hardness, porosity, and the like.

Figure 7A:
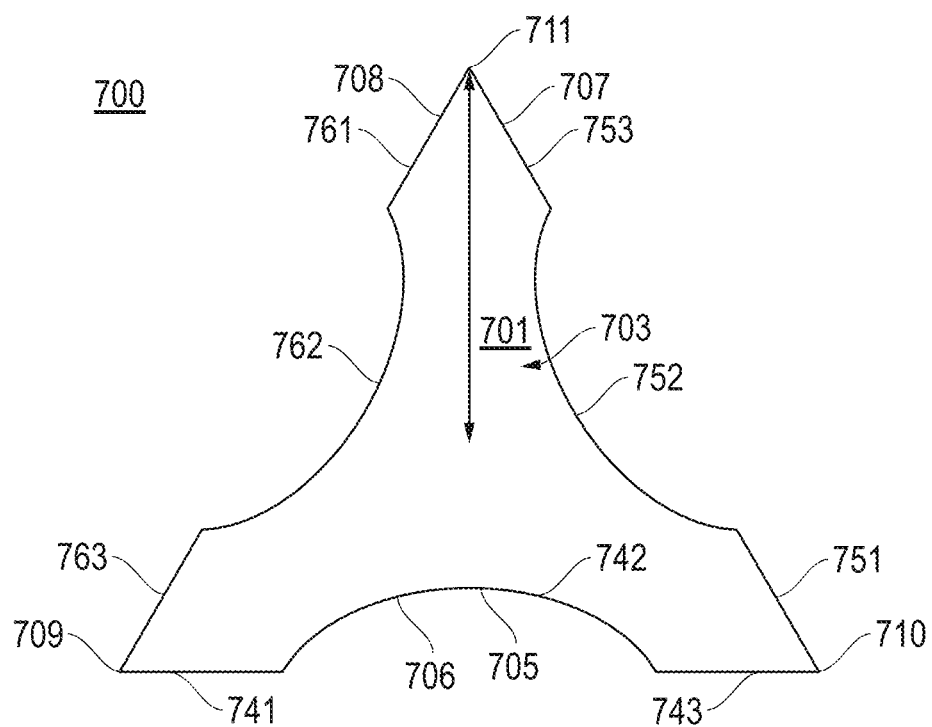
FIGS. 7A-7D include illustrations of shaped abrasive particles that may be used in accordance with an abrasive particle of an embodiment.

FIG. 7A includes a top view illustration of a shaped abrasive particle according to an embodiment. In particular, the shaped abrasive particle 700 can include a body 701 having the features of other shaped abrasive particles of embodiments herein, including an upper major surface 703 and a bottom major surface (not shown) opposite the upper major surface 703. The upper major surface 703 and the bottom major surface can be separated from each other by at least one side surface 705, which may include one or more discrete side surface portions, including for example, a first portion 706 of the side surface 705, a second portion 707 of the side surface 705, and a third portion 708 of the side surface 705. In particular, the first portion 706 of the side surface 705 can extend between a first corner 709 and a second corner 710. The second portion 707 of the side surface 705 can extend between the second corner 710 and a third corner 711. Notably, the second corner 710 can be an external corner joining two portions of the side surface 705. The second corner 710 and a third corner 711, which are also external corners, are adjacent to each other and have no other external corners disposed between them. Also, the third portion 708 of the side surface 705 can extend between the third corner 711 and the first corner 709, which are both external corners that are adjacent to each other and have no other external corners disposed between them.

As illustrated, the body 701 can include a first portion 706 including a first curved section 742 disposed between a first linear section 741 and a second linear section 743 and between the external corners 709 and 710. The second portion 707 is separated from the first portion 706 of the side surface 705 by the external corner 710. The second portion 707 of the side surface 705 can include a second curved section 752 joining a third linear section 751 and a fourth linear section 753. Furthermore, the body 701 can include a third portion 708 separated from the first portion 706 of the side surface 705 by the external corner 709 and separated from the second portion 707 by the external corner 711. The third portion 708 of the side surface 705 can include a third curved section 762 joining a fifth linear section 761 and a sixth linear section 763.

Figure 7B:
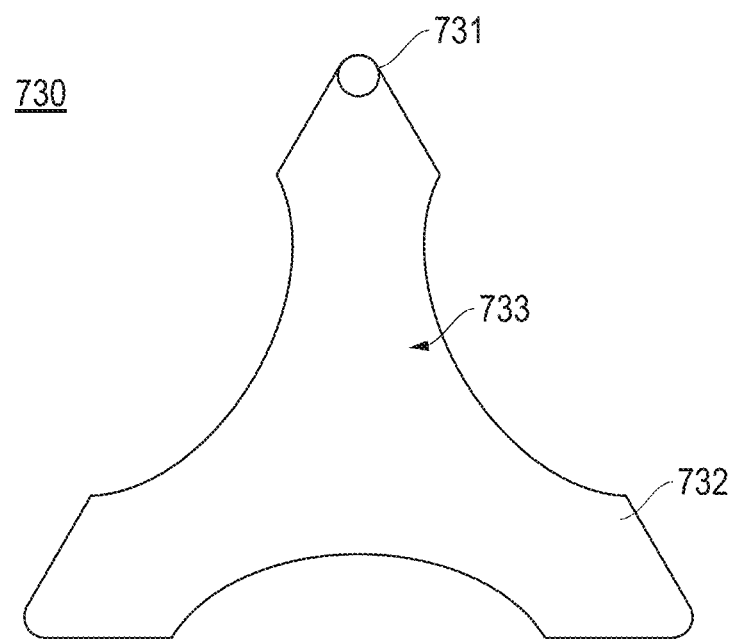

FIG. 7B includes a top view of a shaped abrasive particle 730 according to an embodiment. The tip sharpness of a shaped abrasive particle, which may be an average tip sharpness, may be measured by determining the radius of a best fit circle on an external corner 731 of the body 732. For example, turning to FIG. 7B, a top view of the upper major surface 733 of the body 732 is provided. At an external corner 731, a best fit circle is overlaid on the image of the body 732 of the shaped abrasive particle 730, and the radius of the best fit circle relative to the curvature of the external corner 731 defines the value of tip sharpness for the external corner 731. The measurement may be recreated for each external corner of the body 732 to determine the average individual tip sharpness for a single shaped abrasive particle 730. Moreover, the measurement may be recreated on a suitable sample size of shaped abrasive particles of a batch of shaped abrasive particles to derive the average batch tip sharpness. Any suitable computer program, such as ImageJ may be used in conjunction with an image (e.g., SEM image or light microscope image) of suitable magnification to accurately measure the best fit circle and the tip sharpness.

The shaped abrasive particles of the embodiments herein may have a particular tip sharpness that may facilitate suitable performance in the fixed abrasive articles of the embodiments herein. For example, the body of a shaped abrasive particle can have a tip sharpness of not greater than 80 microns, such as not greater than 70 microns, not greater than 60 microns, not greater than 50 microns, not greater than 40 microns, not greater than 30 microns, not greater than 20 microns, or even not greater than 10 microns. In yet another non-limiting embodiment, the tip sharpness can be at least 2 microns, such as at least 4 microns, at least 10 microns, at least 20 microns, at least 30 microns, at least 40 microns, at least 50 microns, at least 60 microns, or even at least 70 microns. It will be appreciated that the body can have a tip sharpness within a range between any of the minimum and maximum values noted above.

Another grain feature of shaped abrasive particles is the Shape Index. The Shape Index of a body of a shaped abrasive particle can be described as a value of an outer radius of a best-fit outer circle superimposed on the body, as viewed in two dimensions of a plane of length and width of the body (e.g., the upper major surface or the bottom major surface), compared to an inner radius of the largest best-fit inner circle that fits entirely within the body, as viewed in the same plane of length and width. For example, turning to FIG. 7C the shaped abrasive particle 770 is provided with two circles superimposed on the illustration to demonstrate the calculation of Shape Index. A first circle is superimposed on the body 770, which is a best-fit outer circle representing the smallest circle that can be used to fit the entire perimeter of the body 770 within its boundaries. The outer circle has a radius (Ro). For shapes such as that illustrated in FIG. 7C, the outer circle may intersect the perimeter of the body at each of the three external corners. However, it will be appreciated that for certain irregular or complex shapes, the body may not fit uniformly within the circle such that each of the corners intersect the circle at equal intervals, but a best-fit, outer circle still may be formed. Any suitable computer program, such as ImageJ may be used in conjunction with an image of suitable magnification (e.g., SEM image or light microscope image) to create the outer circle and measure the radius (Ro).

Figure 7C:
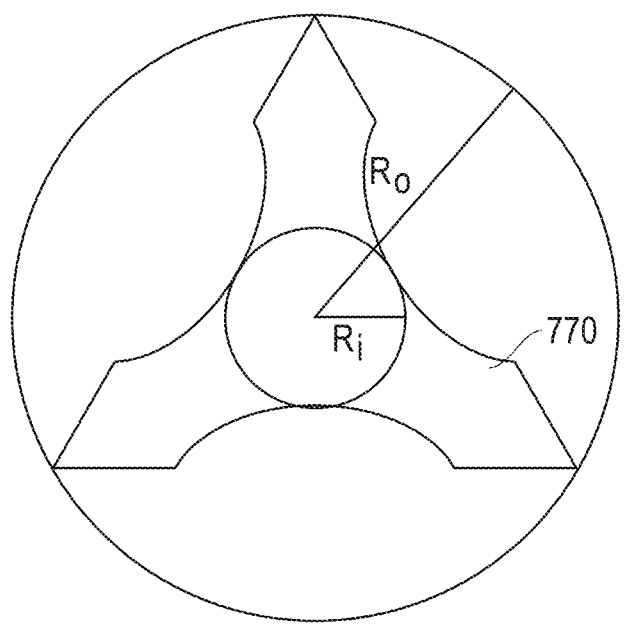

A second, inner circle can be superimposed on the body 770, as illustrated in FIG. 7C, which is a best fit circle representing the largest circle that can be placed entirely within the perimeter of the body 770 as viewed in the plane of the length and width of the body 770. The inner circle can have a radius (Ri). It will be appreciated that for certain irregular or complex shapes, the inner circle may not fit uniformly within the body such that the perimeter of the circle contacts portions of the body at equal intervals, such as shown for the shape of FIG. 7C. However, a best-fit, inner circle still may be formed. Any suitable computer program, such as ImageJ may be used in conjunction with an image of suitable magnification (e.g., SEM image or light microscope image) to create the inner circle and measure the radius (Ri).

The Shape Index can be calculated by dividing the outer radius by the inner radius (i.e., Shape Index=Ri/Ro). For example, the body 770 of the shaped abrasive particle has a Shape Index of approximately 0.35. Moreover, an eqilateral triangle generally has a Shape Index of approximately 0.5, while other polygons, such as a hexagon or pentagon have Shape Index values greater than 0.5. In accordance with an embodiment, the shaped abrasive particles herein can have a Shape Index of at least 0.15, at least 0.20, at least 0.25, at least 0.30, at least 0.35, at least 0.40, at least 0.45, at least about 0.5, at least about 0.55, at least 0.60, at least 0.65, at least 0.70, at least 0.75, at least 0.80, at least 0.85, at least 0.90, at least 0.95. Still, in another non-limiting embodiment, the shaped abrasive particle can have a Shape Index of not greater than 1, such as not greater than 0.98, not greater than 0.95, not greater than 0.90, not greater than 0.85, not greater than 0.80, not greater than 0.75, not greater than 0.70, not greater than 0.65, not greater than 0.60, not greater than 0.55, not greater than 0.50, not greater than 0.45, not greater than 0.40, not greater than 0.35, not greater than 0.30, not greater than 0.25, not greater than 0.20, or even not greater than 0.15. It will be appreciated that the shaped abrasive particles can have a Shape Index within a range between any of the minimum and maximum values noted above.

Figure 7D:
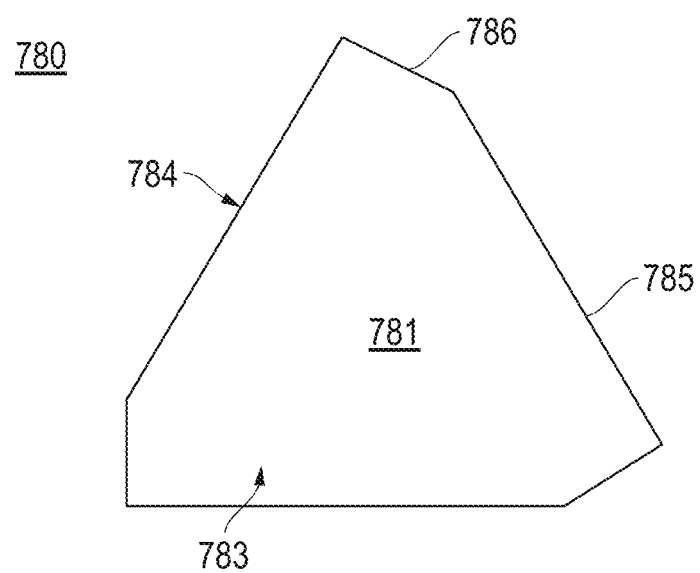

FIG. 7D includes a top view of a shaped abrasive particle according to another embodiment. The shaped abrasive particle 780 can have a body 781 having the features of other shaped abrasive particles of embodiments herein, including an upper major surface 783 and a bottom major surface (not shown) opposite the upper major surface 783. The upper major surface 783 and the bottom major surface can be separated from each other by at least one side surface 784, which may include one or more discrete side surface sections. According to one embodiment, the body 781 can be defined as an irregular hexagon, wherein the body has a hexagonal (i.e., six-sided) two dimensional shape as viewed in the plane of a length and a width of the body 781, and wherein at least two of the sides, such as sides 785 and 786, have a different length with respect to each other. Notably, the longest dimension along one of the sides is understood herein to refer to the width of the body 781 and the length of the body is the longest dimension extending through the midpoint of the body 781 from one side of the body to the other (e.g., from a corner to a flat side opposite the corner). Moreover, as illustrated, none of the sides are parallel to each other. And furthermore, while not illustrated, any of the sides may have a curvature to them, including a concave curvature wherein the sides may curve inwards toward the interior of the body 781.

Figure 8:
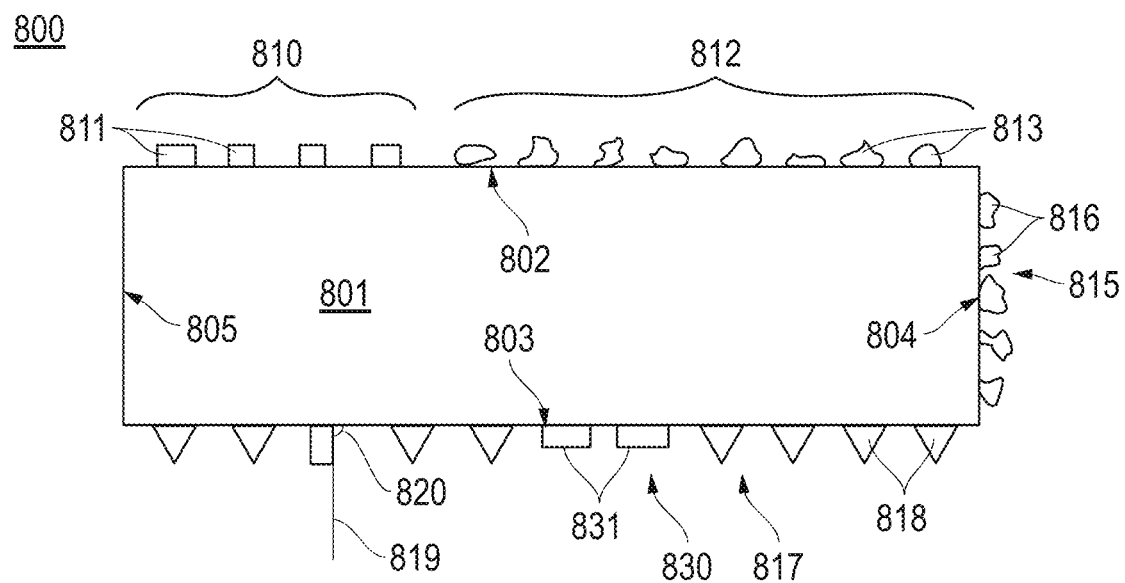
FIG. 8 includes a cross-sectional image of a shaped abrasive particle according to an embodiment.

FIG. 8 includes a cross-sectional view of a portion of an abrasive particle according to an embodiment. As illustrated, the abrasive particle can include a shaped abrasive particle including a body 801 having a first major surface 802, a second major surface 803, and side surface 804 and 805 extending between the first and second major surface 802 and 803 as viewed in cross-section. The abrasive particle 800 can further include a plurality of abrasive particles coupled to certain surfaces of the body 801 of the shaped abrasive particle. The plurality of abrasive particles can include one or more portions of particles, which may be differentiated as groups of abrasive particles, wherein the different groups may have at least one abrasive characteristic that is distinct from each other. Abrasive characteristics can include but is not limited to average particle size, average crystallite size, hardness, toughness, two-dimensional shape, three-dimensional shape, shaped abrasive particles, non-shaped abrasive particles, composition, standing angle, orientation, and a combination thereof. Utilization of different groups may facilitate tailoring of the abrasive particles for a given application. Additionally, different groups may or may not be coupled to different surfaces of the body 801 of the shaped abrasive particle. That is, in one embodiment, the same single surface of the body 801 can include a plurality of groups of abrasive particles. In still other embodiments, the body 801 of the shaped abrasive particle can have different groups of abrasive particles coupled to different surfaces of the body 801.

In particular, the abrasive particle 800 can include a plurality of abrasive particles including a first group of abrasive particles 810 attached to a portion of the first major surface 802. The first group of abrasive particles 810 can include fine shaped abrasive particles 811 having an average particle size significantly less than the average particle size of the body 801 of the shaped abrasive particle. The fine shaped abrasive particles can have any of the attributes of other shaped abrasive particles as described in the embodiments herein. In one particular embodiment, the fine shaped abrasive particles can have a two-dimensional shape that is substantially the same as the two dimensional shape of the body of the shaped abrasive particle. Still in another embodiment, the fine shaped abrasive particles can have a two-dimensional shape that is different than the two dimensional shape of the body of the shaped abrasive particle. It will also be appreciated that the fine shaped abrasive particles can have any of the three-dimensional shapes as described herein.

Notably, the fine shaped abrasive particles can have a median particle size relative to the length, width, and/or height of the body 801. The same relationship noted herein with respect to the median particle size of the plurality of abrasive particles relative to the length, width, or height of the body of the shaped abrasive particles can be true when the plurality of abrasive particles includes fine shaped abrasive particles. The fine shaped arbasive particles have a length≤width≤height, wherein the average length of the fine shaped abrasive particles is less than the length of the body of the shaped abrasive particle.

For example, the fine shaped abrasive particles 810 can have an average length of not greater than about 90% of the length of the body 801, such as or not greater than about 80% of the length or not greater than about 70% of the length or not greater than about 60% of the length or not greater than about 50% of the length or not greater than about 40% of the length or not greater than about 30% of the length or not greater than about 25% of the length or not greater than 20% of the length or not greater than about 18% of the length or not greater than about 15% of the length or not greater than about 12% of the length or not greater than about 10% of the length or not greater than about 8% of the length or not greater than 6% of the length or not greater than about 5% of the length of the body 801 of the shaped abrasive particle. In still another non-limiting embodiment, the fine shaped abrasive particles 811 have an average length of at least about 0.1% of the length of the body 801 or at least about 0.5% of the length or at least about 1% of the length or at least about 2% of the length or at least about 3% of the length or at least about 4% of the length or at least about 5% of the length or at least about 6% of the length or at least about 7% of the length or at least about 8% of the length or at least about 9% of the length or at least about 10% of the length or at least about 12% of the length or at least about 15% of the length or at least about 18% of the length or at least about 20% of the length or at least about 25% of the length or at least about 30% of the length of the body 801 of the shaped abrasive particle. It will be appreciated that the average length of the fine shaped abrasive particles can be within a range between any of the minimum and maximum percentages noted above.

Additionally, the fine shaped abrasive particles can have a particular average width that is less than the length of the body 801 of the shaped abrasive particle. According to one embodiment, the fine shaped abrasive particles 811 can have an average width that is not greater than about 90% of the length of the body 801, such as not greater than about 80% of the length or not greater than about 70% of the length or not greater than about 60% of the length or not greater than about 50% of the length or not greater than about 40% of the length or not greater than about 30% of the length or not greater than about 25% of the length or not greater than about 20% of the length or not greater than about 18% of the length or not greater than about 15% of the length or not greater than about 12% of the length or not greater than about 10% of the length or not greater than about 8% of the length or not greater than about 6% of the length or not greater than about 5% of the length of the body of the shaped abrasive particle. Still, in another embodiment, the fine shaped abrasive particles 811 can have an average width of at least about 0.1% of the length of the body 801, such as at least about 0.5% of the length or at least about 1% of the length or at least about 2% of the length or at least about 3% of the length or at least about 4% of the length or at least about 5% of the length or at least about 6% of the length or at least about 7% of the length or at least about 8% of the length or at least about 9% of the length or at least about 10% of the length or at least about 12% of the length or at least about 15% of the length or at least about 18% of the length or at least about 20% of the length or at least about 25% of the length or at least about 30% of the length of the body of the shaped abrasive particle. It will be appreciated that the average width of the fine shaped abrasive particles can be within a range between any of the minimum and maximum percentages noted above.

For yet another embodiment, the fine shaped abrasive particles 811 can have an average height that is less than the length of the body 801 of the shaped abrasive particle. For example, the fine shaped abrasive particles 811 can have an average height that is not greater than about 90% of the length of the body 801, such as not greater than about 80% of the length or not greater than about 70% of the length or not greater than about 60% of the length or not greater than about 50% of the length or not greater than about 40% of the length or not greater than about 30% of the length or not greater than about 25% of the length or not greater than about 20% of the length or not greater than about 18% of the length or not greater than about 15% of the length or not greater than about 12% of the length or not greater than about 10% of the length or not greater than about 8% of the length or not greater than about 6% of the length or not greater than about 5% of the length of the body 801 of the shaped abrasive particle. Still, in one non-limiting embodiment, the fine shaped abrasive particles 811 can have an average height of at least about 0.01% of the length of the body 801, such as at least about 0.1% of the length or at least about 0.5% of the length or at least about 1% of the length or at least about 2% of the length or at least about 3% of the length or at least about 4% of the length or at least about 5% of the length or at least about 6% of the length or at least about 7% of the length or at least about 8% of the length or at least about 9% of the length or at least about 10% of the length or at least about 12% of the length or at least about 15% of the length or at least about 18% of the length or at least about 20% of the length or at least about 25% of the length or at least about 30% of the length of the body 801 of the shaped abrasive particle. It will be appreciated that the average height of the fine shaped abrasive particles can be within a range between any of the minimum and maximum percentages noted above.

FIG. 8, it will be appreciated that a majority of the plurality of abrasive particles overlying the body 801 can be fine shaped abrasive particles. Moreover, in certain instances, essentially all of the abrasive particles of the plurality of abrasive particles overlying the body 801 can be fine shaped abrasive particles.

The composite shaped abrasive particle 800 can further include a second group of abrasive particles 812 also attached to the first major surface 802 of the body 801. The second group of abrasive particles 812 can be non-shaped abrasive particles 813. According to one embodiment, as illustrated in FIG. 8, at least one surface of the body 801, such as the first major surface 802 of the abrasive particle 800 can have a blend of two different types of abrasive particles. The first and second groups of abrasive particles 810 and 812 can be placed on the first major surface 802 using any of the techniques described herein. The first and second group of abrasive particles 810 and 812 may be deposited on the first major surface 802 simultaneously or separately.

Moreover, the first group of abrasive particles 810 can have a first average particles size, which in the case of fine shaped abrasive particles can be defined by the average length, and the second group of abrasive particles 812 can have a second average particle size, which in the case of fine shaped abrasive particles can be defined by the average length. In certain instances the first and second average particle sizes can be different from one another. In still another embodiment, the first and second average particle sizes can be substantially the same. The relative sizes of the abrasive particles 811 and 813 of the first and second groups of abrasive particles 810 and 812 can be tailored depending upon the desired application of the abrasive particles.

As further illustrated, abrasive particle 800 can include a third group of abrasive particles 817 that can be coupled to the second major surface 803 of the body 801. The third group of abrasive particles 817 can include fine shaped abrasive particles 818, which can have a significantly smaller average particle sized compared to the body 801 of the shaped abrasive particle. The fine shaped abrasive particles 818 can have a different two-dimensional shaped compared to the shaped abrasive particles 811 of the first group of abrasive particles 810.

Moreover, at least a portion of the fine shaped abrasive particles 818 may be oriented in a standing position relative the surface 803 of the body 801 of the shaped abrasive particle. While the group of abrasive particles 817 is illustrated as shaped abrasive particles, it will be appreciated that it may also include elongated abrasive particles, which may be shaped or non-shaped, and can be oriented in a standing position relative to the surface 803 of the body 801. According to an embodiment, the standing orientation can be defined by a largest surface (i.e., a major) of the body of a fine shaped abrasive particle being spaced apart from the surface of the body of the shaped abrasive particle. Moreover, the standing orientation of the fine shaped abrasive particles 818 can be defined by a standing angle 820 between the longitudinal axis 819 of the fine shaped abrasive particle 820 (or elongated abrasive particle, shaped or non-shaped) and the major surface 803 of the body 801. The standing angle 820 can be at least 5 degrees, such as at least 10 degrees, at least 20 degrees, at least 30 degrees, or at least 40 degrees or at least 50 degree or at least 60 degrees or at least 70 degrees or at least 80 degrees or at least 85 degrees. In at least one embodiment, the fine shaped abrasive particles 818 are in a standing orientation relative to the surface 803 of the body 801 and define a substantially perpendicular standing angle 820 as illustrated in FIG. 8.

Still, in another embodiment, the group of abrasive particles 817 can include a portion of abrasive particles 830 that are lying flat. In a lying flat orientation, the longitudinal axis of the abrasive particles 831 may be substantially parallel to the surface 803 of the body 801.

Figure 9:
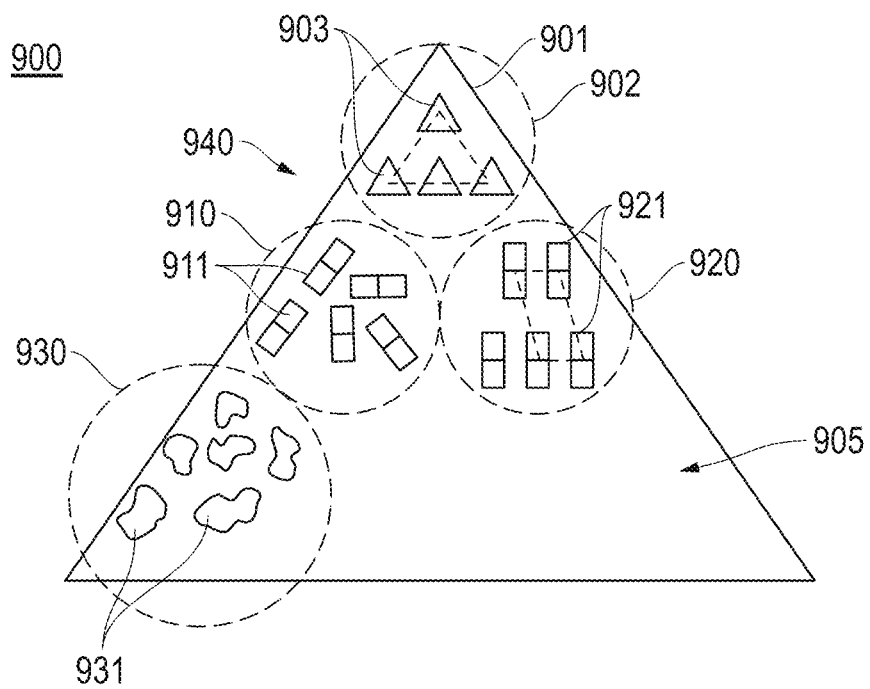
FIG. 9 includes a top-down view of a shaped abrasive particle according to an embodiment.

FIG. 9 includes a top down illustration of an abrasive particle according to an embodiment. As illustrated, the abrasive particle 900 can include a shaped abrasive particle having a body 901 and a plurality of abrasive particles 940 overlying and bonded to a major surface 905 of the body 901. As illustrated, according to one embodiment, the plurality of abrasive particles 940 can be arranged on one or more surfaces of the body 901 in one or more distributions.

As illustrated, in one embodiment, the plurality of abrasive particles 940 may include different groups. For example, the plurality of abrasive particles 940 may include a first group of abrasive particles 902, which may include fine shaped abrasive particles 903 that can be arranged in a controlled distribution on the surface 905 of the body 901. The fine shaped abrasive particles 903 can be lying flat relative to the surface 905 of the body 905. The fine shaped abrasive particles 903 can be arranged in a pattern defined by a plurality of repeating units, wherein each repeating unit of the plurality of repeating units is substantially the same with respect to each other. As illustrated in the embodiment, the fine shaped abrasive particles 903 are arranged in a pattern defined by a substantially triangular repeating unit, as shown by the dotted line. In at least one embodiment, the abrasive particle 900 can be formed such that the fine abrasive particles 903 may extend over a majority or over substantially the entire surface 905 of the body 901 in the controlled distribution as illustrated. It will be appreciated that this may be true of any of the groups of abrasive particles as illustrated herein. Still, in certain instances, one or more groups of abrasive particles may be overlying and bonded to the same surface of the body 901 and may define different distributions and/or orientations relative to each other.

According to another embodiment, the plurality of abrasive particles 940 can include a second group of abrasive particles 910, which may include fine shaped abrasive particles 911 that can be arranged in a random distribution on the surface 905 of the body 901. The fine shaped abrasive particles 911 can be in a standing orientation relative to the surface 905 of the body 905. The fine shaped abrasive particles 911 lack any identifiable repeating unit and thus are arranged in a substantially random distribution compared to each other. It will be appreciated that other types of abrasive particles can be used and other orientation of the abrasive particles may be used. In at least one embodiment, the abrasive particle 900 can be formed such that the fine abrasive particles 911 may extend over a majority or over substantially the entire surface 905 of the body 901 in the random distribution as illustrated.

In yet another embodiment, the plurality of abrasive particles 940 can include a third group of abrasive particles 920, which may include fine shaped abrasive particles 921 that can be arranged in a controlled distribution on the surface 905 of the body 901. The fine shaped abrasive particles 921 can be in a standing orientation relative to the surface 905 of the body 905. As illustrated in the embodiment, the fine shaped abrasive particles 921 can be arranged in a pattern defined by a substantially rectangular repeating unit as shown by the dotted line. In at least one embodiment, the abrasive particle 900 can be formed such that the fine abrasive particles 903 may extend over a majority or over substantially the entire surface 905 of the body 901 in the controlled distribution as illustrated. It will be appreciated that other types of abrasive particles can be used and other orientation of the abrasive particles may be used.

For still another embodiment, the plurality of abrasive particles 940 can include a fourth group of abrasive particles 930, which may include non-shaped abrasive particles 931 that can be arranged in a random distribution on the surface 905 of the body 901. The non-shaped abrasive particles 931 can be in a substantially random arrangement relative to each other. In at least one embodiment, the abrasive particle 900 can be formed such that the non-shaped abrasive particles 931 may extend over a majority or over substantially the entire surface 905 of the body 901 in the random distribution as illustrated.

In at least one embodiment, at least a portion of the plurality of abrasive particles of an abrasive particle can have a coating overlying at least a portion of the exterior surfaces of the abrasive particles. The coating may include a material selected from the group of inorganic, organic, amorphous, crystalline, polycrystalline, ceramic, metal, resin, epoxy, polymer, oxides, carbides, nitrides, borides, carbon-based materials, and a combination thereof.

According to an embodiment, the abrasive particles of the embodiments herein can have a particularly rough and jagged surface. It has been noted by some in the industry that abrasive particles having smooth surfaces and sharp edges provide the best performance. However it has been surprisingly discovered by the Applicants of the present disclosure that grains having a rough surface by virtue of the plurality of abrasive particles attached thereto can have improved performance compared to grains without a plurality of grains attached to one or more surfaces (i.e., grains having a smoother surface).

In at least one particular embodiment, the abrasive particle can include a body of a shaped abrasive particle having a first major surface and a second major surface separated from the first major surface by a side surface, wherein the plurality of abrasive particles are attached to at least the first major surface or the second major surface and the side surface is essentially free of the plurality of abrasive particles. In still other instances, the abrasive particle can include a body of a shaped abrasive particle having a first major surface and a second major surface separated from the first major surface by a side surface, and wherein the plurality of abrasive particles are attached to the first major surface and the second major surface and the side surface is essentially free of the plurality of abrasive particles. Still, it will be appreciated that the plurality of abrasive particles may be overlying and bonded to one or more of the side surface of the body of the shaped abrasive particle.

Figure 12A:
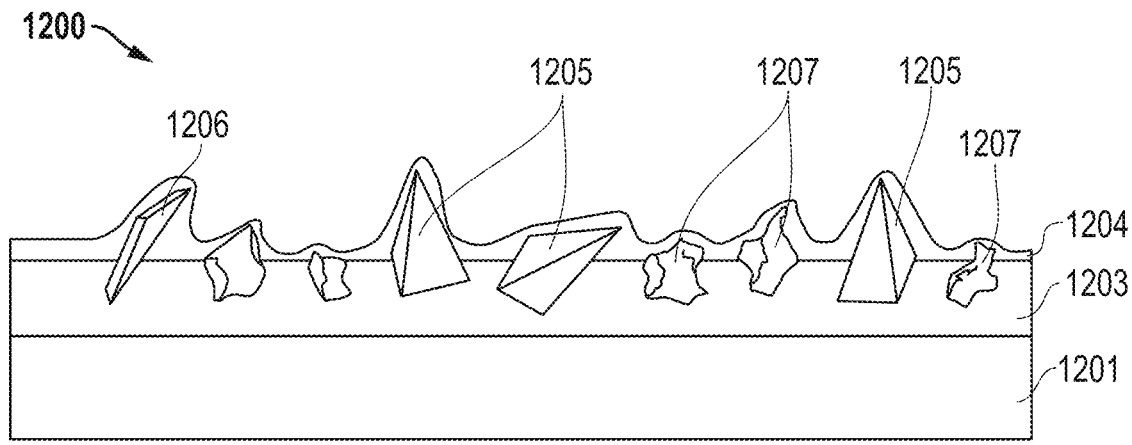
FIG. 12A includes a cross-sectional illustration of a coated abrasive article according to an embodiment.

FIG. 12A includes a cross-sectional illustration of a coated abrasive article incorporating the abrasive particulate material in accordance with an embodiment. Notably, the plurality of abrasive particles on the one or more surfaces of the abrasive particles are not illustrated, but will be appreciated as being present in accordance with embodiments herein. As illustrated, the coated abrasive 1200 can include a substrate 1201 and a make coat 1203 overlying a surface of the substrate 1201. The coated abrasive 1200 can further include a first type of abrasive particulate material 1205 in the form of a first type of shaped abrasive particle, a second type of abrasive particulate material 1206 in the form of a second type of shaped abrasive particle, and a third type of abrasive particulate material in the form of diluent abrasive particles, which may not necessarily be shaped abrasive particles, and having a random shape. The coated abrasive 1200 may further include size coat 1204 overlying and bonded to the abrasive particulate materials 1205, 1206, 1207, and the make coat 1204.

According to one embodiment, the substrate 1201 can include an organic material, inorganic material, and a combination thereof. In certain instances, the substrate 1201 can include a woven material. However, the substrate 1201 may be made of a non-woven material. Particularly suitable substrate materials can include organic materials, including polymers, and particularly, polyester, polyurethane, polypropylene, polyimides such as KAPTON from DuPont, paper. Some suitable inorganic materials can include metals, metal alloys, and particularly, foils of copper, aluminum, steel, and a combination thereof.

The make coat 1203 can be applied to the surface of the substrate 1201 in a single process, or alternatively, the abrasive particulate materials 1205, 1206, 1207 can be combined with a make coat 1203 material and applied as a mixture to the surface of the substrate 1201. Suitable materials of the make coat 1203 can include organic materials, particularly polymeric materials, including for example, polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof. In one embodiment, the make coat 1203 can include a polyester resin. The coated substrate can then be heated in order to cure the resin and the abrasive particulate material to the substrate. In general, the coated substrate 1201 can be heated to a temperature of between about 100° C. to less than about 250° C. during this curing process.

Moreover, it will be appreciated that the coated abrasive article can include one or more collections of various types of abrasive particles, including the abrasive particulate materials 1205, 1206, and 1207, which may represent the abrasive particles of the embodiments herein. The embodiments herein can include a fixed abrasive article (e.g., a coated abrasive article) having a first collection of abrasive particles (e.g., abrasive particulate materials 1205) representative of the abrasive particles of the embodiments herein. Any fixed abrasive may further employ a second collection of abrasive particles therein, which may be representative of another type of abrasive particle according to the embodiments herein, which may be distinct in one or more manners from the abrasive particles of the first collection, including but not limited to, one or more abrasive characteristics as described herein. The same features may be utilized in a bonded abrasive article.

The abrasive particulate materials 1205, 1206, and 1207 can include different types of shaped abrasive particles according to embodiments herein. The different types of shaped abrasive particles can differ from each other in composition, two-dimensional shape, three-dimensional shape, size, and a combination thereof as described in the embodiments herein. As illustrated, the coated abrasive 1200 can include a first type of shaped abrasive particle 1205 having a generally triangular two-dimensional shape and a second type of shaped abrasive particle 1206 having a quadrilateral two-dimensional shape. The coated abrasive 1200 can include different amounts of the first type and second type of shaped abrasive particles 1205 and 1206. It will be appreciated that the coated abrasive may not necessarily include different types of shaped abrasive particles, and can consist essentially of a single type of shaped abrasive particle. As will be appreciated, the shaped abrasive particles of the embodiments herein can be incorporated into various fixed abrasives (e.g., bonded abrasives, coated abrasive, non-woven abrasives, thin wheels, cut-off wheels, reinforced abrasive articles, and the like), including in the form of blends, which may include different types of shaped abrasive particles, shaped abrasive particles with diluent particles, and the like. Moreover, according to certain embodiments, a batch of particulate material may be incorporated into the fixed abrasive article in a predetermined orientation, wherein each of the shaped abrasive particles can have a predetermined orientation relative to each other and relative to a portion of the abrasive article (e.g., the backing of a coated abrasive).

The abrasive particles 1207 can be diluent particles different than the first and second types of shaped abrasive particles 1205 and 1206. For example, the diluent particles can differ from the first and second types of shaped abrasive particles 1205 and 1206 in composition, two-dimensional shape, three-dimensional shape, size, and a combination thereof. For example, the abrasive particles 1207 can represent conventional, crushed abrasive grit having random shapes. The abrasive particles 1207 may have a median particle size less than the median particle size of the first and second types of shaped abrasive particles 1205 and 1206.

After sufficiently forming the make coat 503 with the abrasive particulate materials 1205, 1206, 1207 contained therein, the size coat 1204 can be formed to overlie and bond the abrasive particulate material 1205 in place. The size coat 1204 can include an organic material, may be made essentially of a polymeric material, and notably, can use polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof.

Figure 12B:
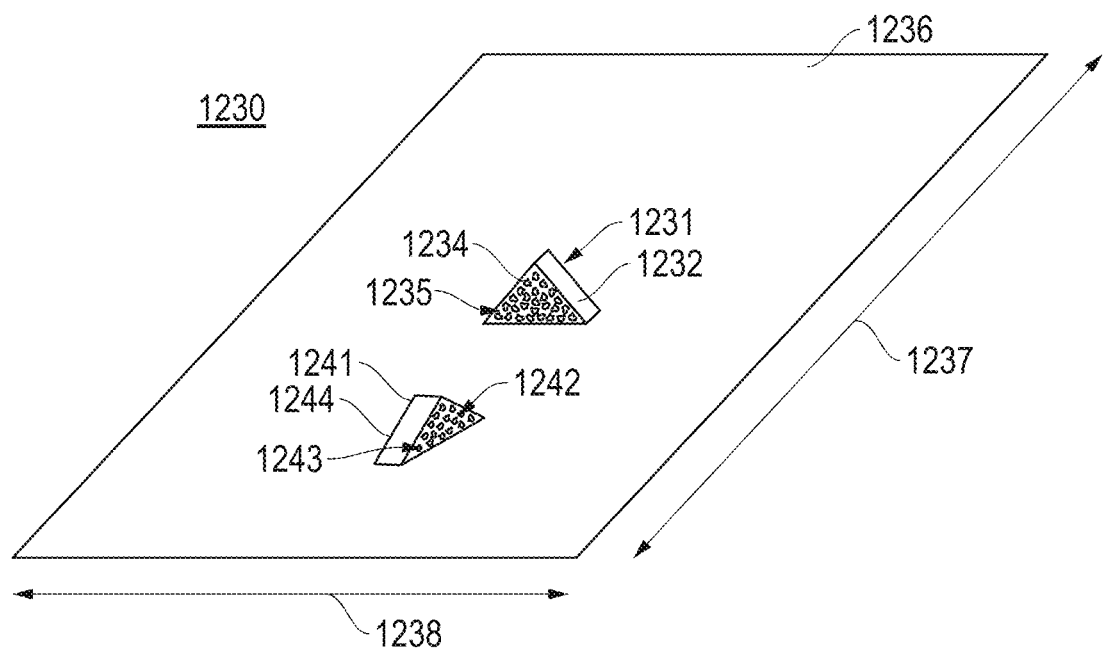
FIG. 12B includes a perspective view illustration of a coated abrasive article including an abrasive particle according to an embodiment.

FIG. 12B includes a perspective view illustration of a portion of a coated abrasive article including an abrasive particle according to an embodiment. Notably, the illustrated embodiment of FIG. 12B includes an abrasive article 1230 including an abrasive particle 1231 including a shaped abrasive particle 1232 having a body including a plurality of abrasive particles 1234 bonded to a first major surface 1235 of the body of the shaped abrasive particle. Notably the coated abrasive article includes a backing 1236 having a longitudinal axis 1237 and a lateral axis 1238. In one embodiment, the abrasive particle 1231 is placed on the backing 1236 and can be bonded on the backing 1236 in a particular orientation using one or more adhesive layers (e.g., a make coat, size coat, etc.) as noted herein. In certain instances, the abrasive particle 1231 can be placed in a controlled orientation on the backing 1236, such that the orientation of the first major surface 1235 including the plurality of shaped abrasive particles 1234 has a particular orientation relative to the longitudinal axis 1237 and/or lateral axis 1238 of the backing 1236. For example, in certain instances, such as for the abrasive particle 1232, the first major surface 1235 including the plurality of abrasive particles 1234 can be oriented substantially perpendicular to the longitudinal axis 1237 and substantially parallel to the lateral axis 1238. In certain other instances, an alternative orientation may be desired, including for example, an abrasive particle 1241 having a plurality of abrasive particles 1242 attached to a first major surface 1243 of the body of the shaped abrasive particle 1244, wherein the particle has a controlled orientation including the first major surface 1243 being substantially perpendicular to the lateral axis 1238 and substantially parallel to the longitudinal axis 1237. It will be appreciated that the abrasive particles can also have other controlled orientations, such that the orientation of one or more abrasive particles on the backing can define a controlled angle relative to the lateral axis 1238 and/or longitudinal axis 1237. Moreover, the orientation of the abrasive particles may be controlled depending upon the number and/or type of surfaces of the shaped abrasive particle (i.e., first major surface and/or second major surface and/or side surface) that are covered. Moreover, the coated abrasive article can include one or more group of abrasive particles on the backing 1236, wherein each group of abrasive particles can have at least one abrasive characteristic that is similar relative to each other. Suitable examples of certain types of abrasive characteristics include type of coating of the plurality of abrasive particles, size of the plurality of abrasive particles, shape of the body of the shaped abrasive particle, composition of the shaped abrasive particle and/or plurality of abrasive particle, orientation, tilt angle, and any of the other features of embodiments detailed herein. Moreover, abrasive particles from different groups on the backing can differ in at least one of the abrasive characteristics noted herein.

Figure 13A:
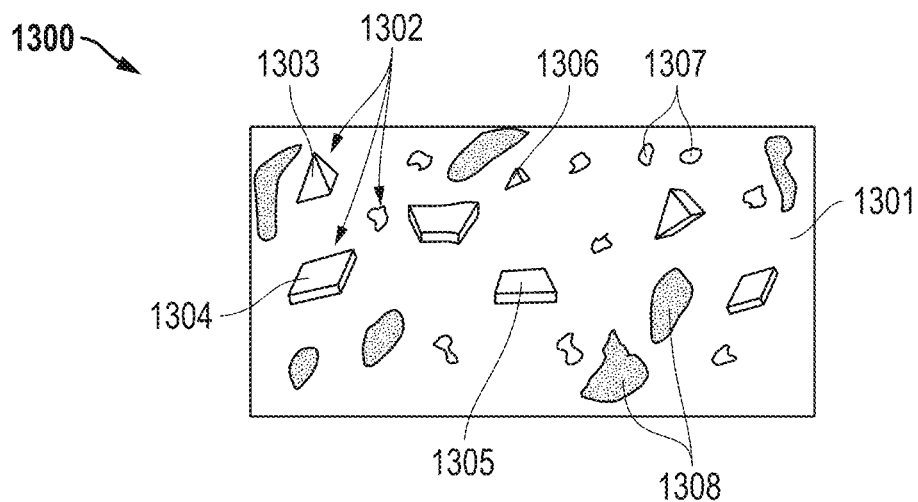
FIG. 13A includes an illustration of a bonded abrasive article according to an embodiment.

FIG. 13A includes an illustration of a bonded abrasive article incorporating the abrasive particulate material in accordance with an embodiment. As illustrated, the bonded abrasive 1300 can include a bond material 1301, abrasive particulate material 1302 contained in the bond material, and porosity 1308 within the bond material 1301. In particular instances, the bond material 1301 can include an organic material, inorganic material, and a combination thereof. Suitable organic materials can include polymers, such as epoxies, resins, thermosets, thermoplastics, polyimides, polyamides, and a combination thereof. Certain suitable inorganic materials can include metals, metal alloys, vitreous phase materials, crystalline phase materials, ceramics, and a combination thereof.

The abrasive particulate material 1302 of the bonded abrasive 1300 can include different types of shaped abrasive particles 1303, 1304, 1305, and 1306, which can have any of the features of different types of shaped abrasive particles as described in the embodiments herein. Notably, the different types of shaped abrasive particles 1303, 1304, 1305, and 1306 can differ from each other in composition, two-dimensional shape, three-dimensional shape, size, and a combination thereof as described in the embodiments herein.

The bonded abrasive 1300 can include a type of abrasive particulate material 1307 representing diluent abrasive particles, which can differ from the different types of shaped abrasive particles 1303, 1304, 1305, and 1306 in composition, two-dimensional shape, three-dimensional shape, size, and a combination thereof.

The porosity 1308 of the bonded abrasive 1300 can be open porosity, closed porosity, and a combination thereof. The porosity 1308 may be present in a majority amount (vol %) based on the total volume of the body of the bonded abrasive 1300. Alternatively, the porosity 1308 can be present in a minor amount (vol %) based on the total volume of the body of the bonded abrasive 1300. The bond material 1301 may be present in a majority amount (vol %) based on the total volume of the body of the bonded abrasive 1300. Alternatively, the bond material 1301 can be present in a minor amount (vol %) based on the total volume of the body of the bonded abrasive 1300. Additionally, abrasive particulate material 1302 can be present in a majority amount (vol %) based on the total volume of the body of the bonded abrasive 1300. Alternatively, the abrasive particulate material 1302 can be present in a minor amount (vol %) based on the total volume of the body of the bonded abrasive 1300.

Figure 13B:
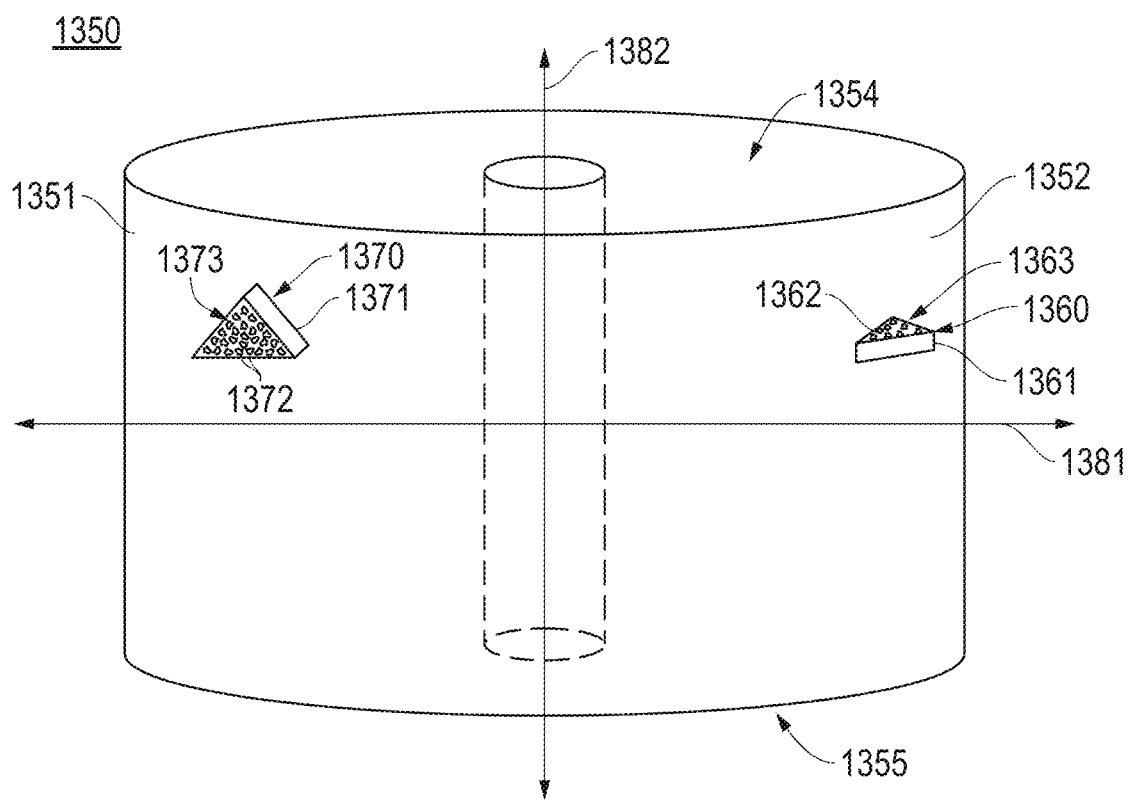
FIG. 13B includes an illustration of a bonded abrasive article including an abrasive particle according to an embodiment.

FIG. 13B includes an illustration of a bonded abrasive article including abrasive particles of the embodiments herein. As illustrated, the bonded abrasive 1350 can include a body 1351 including an abrasive particle 1360 and abrasive particle 1370 contained within the bond matrix material 1352 of the body 1351. The abrasive particle 1360 can include a shaped abrasive particle 1361 and a plurality of abrasive particles 1362 bonded to at least a first major surface 1363 of the body of the shaped abrasive particle 1361. Notably, the abrasive particle 1360 can have a particular position within the three dimensional volume of the body 1351 of the bonded abrasive 1350. Moreover, the abrasive particle 1360 can have a controlled and predetermined orientation relative to a radial axis 1381 and/or lateral axis 1382 of the body 1351. According to one embodiment, the abrasive particle 1360 can have an orientation that is considered to be lying flat within the body 1351 as the first major surface 1363 of the body of the shaped abrasive particle 1361 is substantially parallel to the radial axis 1381 or substantially parallel to the major surfaces 1354 and 1355 of the body 1351 of the bonded abrasive 1350. Moreover, the first major surface 1363 of the shaped abrasive particle 1361 can be substantially perpendicular to the lateral axis 1382. In certain instances, a bonded abrasive may include a portion of abrasive particles within the body in the orientation like the abrasive particle 1360, which may facilitate improved formation of the bonded abrasive and/or improve performance of the bonded abrasive.

As further illustrated, the abrasive particle 1370 can include a shaped abrasive particle 1371 and a plurality of abrasive particles 1372 bonded to at least a first major surface 1373 of the body of the shaped abrasive particle 1371. Notably, the abrasive particle 1370 can have a particular position within the three dimensional volume of the body 1351 of the bonded abrasive 1350. Moreover, the abrasive particle 1370 can have a controlled and predetermined orientation relative to a radial axis 1381 and/or lateral axis 1382 of the body 1351. According to one embodiment, the abrasive particle 1360 can have an orientation that is considered to be standing upright within the body 1351 as the first major surface 1373 of the body of the shaped abrasive particle 1371 is substantially parallel to the lateral axis 1382 and substantially perpendicular to the major surfaces 1354 and 1355 of the body 1351 of the bonded abrasive 1350. Moreover, the first major surface 1373 of the shaped abrasive particle 1371 can be substantially perpendicular to the radial axis 1381. In other instances, the abrasive particle 1370 can be oriented within the body 1351 such that it is tilted with respect to the lateral axis to define a controlled tilt angle. In such situations, the abrasive particle 1371 may have a first major surface that is neither substantially perpendicular to the radial axis 1381 nor substantially parallel to the lateral axis. Such a controlled tilt angle can include any angle between 5 degrees and 85 degrees. As used herein, reference to a substantially parallel or substantially perpendicular orientation is reference to a difference between an axis or plane and a reference axis of not greater than 5 degrees. Moreover, as will be appreciated, the abrasive particles can have various rotational orientations about the lateral axis 1382 and the radial axis 1381. When referring to a tilt angle, it will be understood that there may be a radial tilt angle defined as the smallest angle formed between the radial axis 1381 and a radial vector defining the direction of the major surface having the largest component in the radial direction. There may also be a lateral tilt angle defined as the smallest angle formed between the lateral axis 1382 and a vector defining the direction of the major surface with the largest component in the lateral direction.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below.

Items:

Item 1. An abrasive particle comprising a shaped abrasive particle comprising a body, and a plurality of abrasive particles bonded to at least one surface of the body of the shaped abrasive particle.

Item 2. The abrasive particle of item 1, wherein the body of the shaped abrasive particle comprises a two-dimensional shape as viewed in a plane defined by a length and a width of the body selected from the group consisting of polygons, ellipsoids, numerals, Greek alphabet characters, Latin alphabet characters, Russian alphabet characters, complex shapes having a combination of polygonal shapes, and a combination thereof.

Item 3. The abrasive particle of item 1, wherein the plurality of abrasive particles is bonded to a major surface of the body or wherein the plurality of abrasive particles is bonded to at least two surfaces of the body or wherein the plurality of abrasive particles is bonded to at least two major surfaces of the body.

Item 4. The abrasive particle of item 1, wherein a portion of the particles of the plurality of abrasive particles is embedded into the volume of the body of the shaped abrasive particle or wherein a portion of the abrasive particles of the plurality of abrasive particles is embedded within the at least one surface of the body or wherein the plurality of abrasive particles are sinter-bonded to the at least one surface of the body of the shaped abrasive particle or wherein a portion of the abrasive particles of the plurality of abrasive particles are sinter-bonded to the at least one surface of the body of the shaped abrasive particle.

Item 5. The abrasive particle of item 4, wherein the portion includes a minority of the particles of the plurality of abrasive particles or wherein the portion includes a majority of the particles of the plurality of abrasive particles.

Item 6. The abrasive particle of item 1, wherein the plurality of abrasive particles cover at least 1% of the total surface area of the body or at least 5% or at least 10% or at least 20% or at least 30% or at least 40% or at least 50% or at least 60% or at least about 70% or at least about 80% or at least about 90% or at least about 95%, and wherein the plurality of abrasive particles cover not greater than 95% or not greater than 90% or not greater than 80% or not greater than 60% or not greater than 50% or not greater than 40% or not greater than 30% or the total surface area of the body.

Item 7. The abrasive particle of item 1, wherein the body includes a first major surface, a second major surface, and a side surface extending between the first major surface and the second major surface, wherein the plurality of abrasive particles is bonded to the first major surface and the side surface is essentially free of abrasive particles of the plurality of abrasive particles.

Item 8. The abrasive particle of item 1, wherein the surface of the body including the plurality of abrasive particle comprises a random arrangement of the plurality of abrasive particles on a major surface of the body, and wherein a side surface of the body is essentially free of the plurality of abrasive particles.

Item 9. The abrasive particle of item 1, wherein the body comprises a first major surface and a second major surface separated from the first major surface by a side surface, wherein the plurality of abrasive particles are attached to the first major surface and the first major surface has a surface roughness greater than a surface roughness of the side surface.

Item 10. The abrasive particle of item 1, wherein the plurality of abrasive particles are selected from the group consisting of oxides, carbides, nitrides, borides, oxycarbides, oxynitrides, oxyborides, natural minerals, synthetic materials, carbon-based materials, and a combination thereof.

Item 11. The abrasive particle of item 1, wherein the plurality of abrasive particles are selected from the group consisting of crushed grains, irregularly shaped grains, elongated grains, agglomerates, aggregates, and a combination thereof.

Item 12. The abrasive particle of item 1, wherein the body of the shaped abrasive particle comprises a length≥width≥height, and the plurality of abrasive particles comprise a median particle size (D50), and wherein the median particle size (D50) is not greater than the length of the body of the shaped abrasive particle or wherein the median particle size (D50) is not greater than the width of the body of the shaped abrasive particle or wherein the median particle size (D50) is not greater than the height of the body of the shaped abrasive particle.

Item 13. The abrasive particle of item 12, wherein the plurality of abrasive particles comprise a median particle size (D50) of not greater than about 90% of the length of the body or at least about 0.1% of the length of the body.

Item 14. The abrasive particle of item 1, wherein the plurality of abrasive particles comprise at least 1 wt % of a total weight of the abrasive particle or wherein the plurality of abrasive particles comprise not greater than about 80 wt % of a total weight of the abrasive particle.

Item 15. The abrasive particle of item 12, wherein the median particle size (D50) is not greater than the width of the body of the shaped abrasive particle or wherein the plurality of abrasive particles comprise a median particle size (D50) of not greater than about 90% of the width of the body or at least about 0.1% of the width of the body.

Item 16. The abrasive particle of item 1, wherein the plurality of abrasive particles include a material having a CTE that is not greater than about 50% different than a CTE of the body of the shaped abrasive particle.

Item 17. The abrasive particle of item 15, wherein the median particle size (D50) is not greater than the height of the body of the shaped abrasive particle or wherein the plurality of abrasive particles comprise a median particle size (D50) of not greater than about 90% of the height of the body or at least about 0.1% of the height of the body.

Item 18. The abrasive particle of item 1, wherein at least a portion of the plurality of abrasive particles include fine shaped abrasive particles, or wherein essentially all of the plurality of abrasive particles include the fine shaped abrasive particles.

Item 19. The abrasive particle of item 18, wherein the fine shaped abrasive particles have a length≤width≤height, wherein the average length of the fine shaped abrasive particles is less than the length of the body of the shaped abrasive particle.

Item 20. The abrasive particle of item 19, wherein fine shaped abrasive particles comprise an average length of not greater than about 90% of the length of the body or at least about 0.1% of the length of the body of the shaped abrasive particle.

Item 21. The abrasive particle of item 19, wherein the fine shaped abrasive particles comprise an average width that is less than the length of the body of the shaped abrasive particle or wherein the fine shaped abrasive particles comprise an average height that is less than the length of the body of the shaped abrasive particle.

Item 22. The abrasive particle of item 19, wherein a portion of the fine shaped abrasive particles are positioned in a standing orientation relative to the surface of the body of the shaped abrasive particle.

Item 23: The abrasive particle of item 1, wherein the plurality of abrasive particles is arranged on the surface of the body in a random distribution.

Item 24. The abrasive particle of item 1, wherein the plurality of abrasive particles are arranged on the surface of the body in a controlled distribution.

Item 25. The abrasive particle of item 24, wherein the controlled distribution includes a pattern defined by a plurality of repeating units, wherein each repeating unit of the plurality of repeating units is substantially the same with respect to each other.

Item 26. The abrasive particle of item 1, wherein a portion of the abrasive particles of the plurality of abrasive particles include a coating comprising a material selected from the group of inorganic, organic, amorphous, crystalline, polycrystalline, ceramic, metal, resin, epoxy, polymer, oxides, carbide, nitride, borides, or a combination thereof.

Item 27. The abrasive particle of item 1, wherein the surface of the body including the plurality of abrasive particle comprises a random arrangement of the plurality of abrasive particles on a major surface of the body, and wherein a side surface of the body is essentially free of the plurality of abrasive particles.

Item 28. The abrasive particle of item 1, wherein the body comprises a first major surface and a second major surface separated from the first major surface by a side surface, wherein the plurality of abrasive particles are attached to at least the first major surface or the second major surface and the side surface is essentially free of the plurality of abrasive particles.

Item 29. The abrasive particle of item 1, wherein the body comprises a first major surface and a second major surface separated from the first major surface by a side surface, wherein the plurality of abrasive particles are attached to the first major surface and the second major surface and the side surface is essentially free of the plurality of abrasive particles.

Item 30. The abrasive particle of item 1, wherein the abrasive particle is incorporated into a fixed abrasive article.

Item 31. The abrasive particle of item 1, further comprising a coated abrasive article including a substrate and the abrasive particle overlying the substrate, wherein the abrasive particle has a predetermined orientation on the coated abrasive defined by an orientation of the at least one surface including the plurality of abrasive particles relative to a longitudinal or lateral axis of the substrate.

Item 32. The abrasive particle of item 1, further comprising a bonded abrasive article including a body including a bond matrix material, wherein the abrasive particle has a predetermined position and orientation within the body defined by a predetermined position and orientation of the at least one surface including the plurality of abrasive particles relative to a longitudinal or lateral axis of the body.

Item 33. An abrasive article comprising: a bond material; and a first collection of abrasive particles coupled to the bond material, wherein each particle in the first collection comprises: a shaped abrasive particle comprising a body; and a plurality of abrasive particles bonded to at least one surface of the body of the shape abrasive particle.

Item 34. A method of forming an abrasive particle comprising forming a mixture and attaching a plurality of abrasive particles to at least one surface of the mixture and forming a shaped abrasive particle having a body and the plurality of abrasive particles bonded to at least one surface of the body.

Item 35. The method of item 34, wherein forming a mixture includes at least one process selected from the group consisting of printing, molding, casting, cutting, ablating, punching, drying, cracking, sintering, humidifying, and a combination thereof.

Item 36. The method of item 34, wherein forming the mixture includes forming a precursor shaped abrasive particle and attaching a plurality of abrasive particles to at least one surface of the precursor shaped abrasive particle.

Item 37. The method of item 34, wherein forming the mixture includes depositing the mixture into an opening of a production tool and attaching a plurality of abrasive particles to at least one surface of the mixture in the opening of the production tool.

Item 38. The method of item 34, wherein the plurality of abrasive particles is attached the body of the mixture prior to substantial drying of the body.

Item 39. The method of item 34, wherein attaching the plurality of abrasive particles includes depositing the plurality of abrasive particles on a surface of the body, wherein depositing includes a process selected from the group consisting of blasting, projecting, pressing, gravity coating, molding, stamping, and a combination thereof.

Item 40. The method of item 34, wherein the mixture is formed on a production tool including a layer of abrasive particles including the plurality of abrasive particles.

Item 41. The method of item 34, wherein the process further comprising applying moisture to at least one surface of the mixture prior to attaching the plurality of abrasive particles.

Item 42. The method of item 34, wherein attaching the plurality of abrasive particles includes directing a deposition material at the at least one surface, wherein the deposition material includes the plurality of abrasive particles and a carrier gas.

Item 43. The method of item 42, wherein the carrier gas can include water vapor, steam, an inert gas element, and a combination thereof.

Item 44. The method of item 34, wherein the mixture is formed on a production tool including a layer of abrasive particles including the plurality of abrasive particles.

Item 45. The method of item 34, wherein the process further comprising applying moisture to at least one surface of the mixture prior to attaching the plurality of abrasive particles.

Item 46. The method of item 45, wherein applying moisture includes directing a gas towards the at least one surface of the mixture prior to attaching the plurality of abrasive particles.

Item 47. The method of item 45, wherein applying moisture includes directing steam at the at least one surface of the mixture in the production tool.

Item 48. The method of item 45, wherein applying moisture includes wetting the at least one surface of the mixture for a sufficient time to change a viscosity of an exterior region of the at least one surface relative to a viscosity of the mixture at an interior region spaced apart from the exterior region.

Item 49. The method of item 34, wherein the process further comprises changing a viscosity of an exterior region of the body including the at least one surface relative to a viscosity of an interior region of the mixture that is spaced apart from the exterior region, and applying the plurality of abrasive particles to the exterior region of the mixture.

EXAMPLES

Example 1

Figure 14:
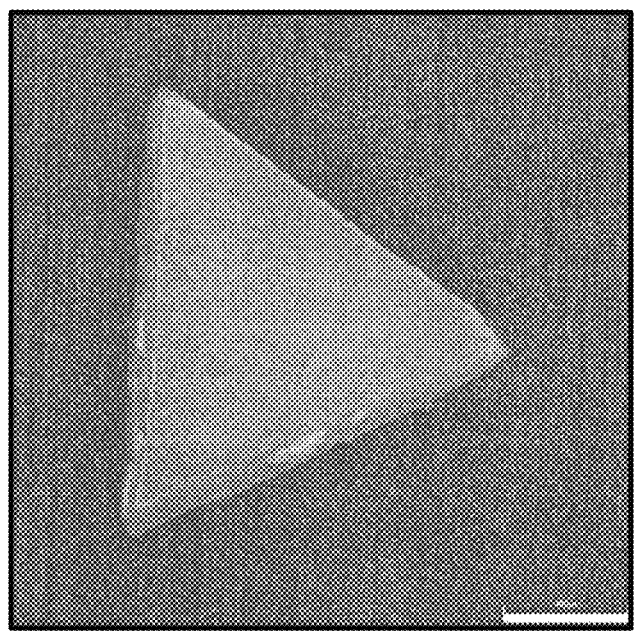
FIG. 14 includes an image of a conventional shaped abrasive particle.

Three samples of shaped abrasive particles were made and tested for comparison of performance. A first comparative sample (CS1) was a conventional shaped abrasive particle commercially available as 3M984F from 3M Corporation. The body had an average width of 1400 microns and a height of approximately 300 microns. The shaped abrasive particles of Sample CS1 had a rare-earth element doped alpha-alumina composition, an average tip sharpness of approximately 20 microns, an average strength of approximately 606 MPa and an average cross-sectional shape factor of approximately 0.15. FIG. 14 includes an image of a shaped abrasive particle from Sample CS1.

Two samples (Sample S1 and Sample S2) representative of the embodiments herein were formed from a gel mixture including approximately 45-50 wt % boehmite. The boehmite was obtained from Sasol Corp. as Catapal B and modified by autoclaving a 30% by weight mixture of the Catapal B with deionized water and nitric acid. The nitric acid-to-boehmite ratio was approximately 0.025. The mixture was then placed in an autoclave and treated at 100° C. to 250° C. for a time ranging from 5 minutes to 24 hours. The autoclaved Catapal B sol was dried by conventional means. One may also use an alternative boehmite, commercially available as DISPERAL from Sasol Corp. The boehmite was mixed and seeded with 1% alpha alumina seeds relative to the total alumina content of the mixture. The alpha alumina seeds were made by milling of corundum using conventional techniques, described for example in U.S. Pat. No. 4,623,364. The mixture also included 45-50 wt % water and 2.5-4 wt % additional nitric acid, which were used to form the gel mixture. The ingredients were mixed in a planetary mixer of conventional design and mixed under reduced pressure to remove gaseous elements from the mixture (e.g., bubbles).

Sample S1 was formed by hand by depositing the gel into the openings of a stainless steel production tool. The cavities were open to both sides of the production tool, such that they were apertures extending through the entire thickness of the production tool. The cavities or openings of the production tool had an equilateral triangle two-dimensional shape as viewed top down, wherein the length was approximately 2.77 mm, the width was approximately 2.4 mm and the depth was approximately 0.59 mm. The surfaces of the openings in the production tool were coated with a lubricant of olive oil to facilitate removal of the precursor shaped abrasive particles from the production tool.

After depositing the gel, a first side of the mixture was humidified with a sponge while residing in the cavities of the production tool. A plurality of dried, unsintered particles of the same gel mixture used to form the mixture in the production tool were deposited on the humidified surface of the mixture residing in the cavities of the production tool. The plurality of unsintered particles were sieved using a 100 US mesh (ASTM E-11 with openings of 150 microns), such that the maximum particle size of the plurality of unsintered particles was less than 100 US mesh. The plurality of abrasive particles had an absorbed moisture content of approximately 10-15% for the total weight of the particles.

The production tool was then inverted and the opposite side of the gel mixture was humidified with a sponge while residing in the cavities of the production tool. The plurality of abrasive particles were then applied to the humidified surface, such that both major surfaces of the exposed gel mixture in the cavities of the production tool were coated with a plurality of abrasive particles. The excess abrasive particles were removed and the mixture and plurality of abrasive particles were dried in the cavities at approximately 50° C. for 10 minutes using IR lamps and a fan to form precursor abrasive particles. The precursor abrasive particles were removed from the production tool and sintered at approximately 1325° C. for approximately 10 minutes to achieve at least 98% theoretical density. The resulting abrasive particles had a body including a triangular two-dimensional shape including a length of approximately 1550 microns, a width of approximately 1350 microns, and a height of approximately 300 microns. FIGS. 11A and 11B include cross-sectional images of a representative abrasive particle of Sample S1. The abrasive particle of Sample S1 had an average strength of approximately 847 MPa, an average tip sharpness of 20 microns, a Shape Index of approximately 0.5, and an average cross-sectional shape factor of approximately 29%.

Figure 15:
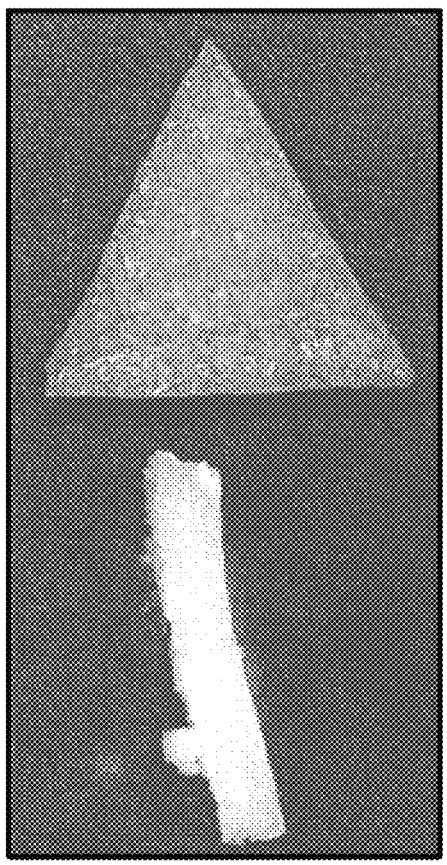
FIG. 15 includes images of an abrasive particle according to an embodiment.

Sample S2 was formed using the same gel mixture as noted above for Sample S1. The gel mixture was placed in a die and extruded into openings of a production tool made of PEEK that was translated under the die as described in embodiments herein. The openings in the production tool were the same as described above for the production tool used in Sample S1, except that the production tool had a thickness of approximately 0.54 mm. In a first batch of Sample S2 (Sample Batch S2B1), a plurality of abrasive particles were deposited via gravity on a single side of the gel mixture while it resided in the cavities of the production tool. The plurality of abrasive particles was the same as used in Sample S1. FIG. 15 includes a top-down view and a side view of a representative abrasive particle of Sample Batch S2B1.

Figure 16:
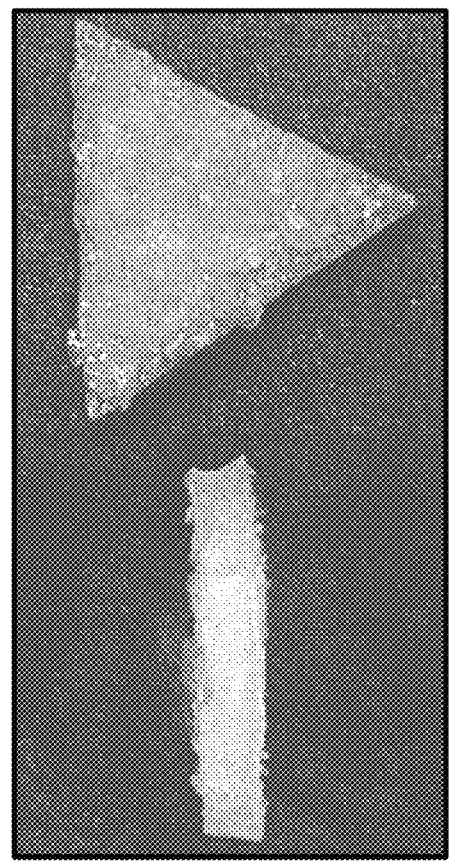
FIG. 16 includes images of an abrasive particle according to an embodiment.

In a second batch of Sample S2 (Sample Batch S2B2), a plurality of abrasive particles was deposited on both major surfaces of the mixture while it resided in the cavities of the production tool. For a first major surface, the plurality of abrasive particles was deposited via gravity (e.g., by sprinkling the particles on the production tool and gel mixture in the cavities). For the opposite major surface, the plurality of abrasive particles was contained on a surface that is repeatedly pressed against the bottom surface of the production tool to apply the abrasive particles to the bottom surface of the gel mixture while it resided in the cavities. Thus, a plurality of abrasive particles was applied to both major surfaces of the gel mixture while it resided in the cavities. The plurality of abrasive particles was the same as described in Sample S1. FIG. 16 includes a top-down image and a side view image of an abrasive particle of Sample Batch S2B2.

In both batches of Sample S2, the production tool was translated through a set of rollers that applied pressure to the top and bottom surfaces of the production tool and assisted with imbedding the abrasive particles into the gel mixture while it resided in the cavities.

For both batches of Sample S2, the mixture was dried for approximately 5 minutes at approximately 50-55° C. using an IR lamp and a fan. For both batches of Sample S2, the samples were removed from the production tool and sintered according to the conditions as provided in Sample S1. The abrasive particles of Sample Batch S1B1 had an average tip sharpness of 20 microns, a Shape Index of approximately 0.5, and an average cross-sectional shape factor of approximately 21%. The abrasive particles of Sample Batch S1B2 had an average tip sharpness of 20 microns, a Shape Index of approximately 0.5, and an average cross-sectional shape factor of approximately 30%.

Samples CS1 and S1 were tested according to a single grit grinding test (SGGT) in a major surface orientation and side orientation. In conducting the SGGT, one single shaped abrasive particle is held in a grit holder by a bonding material of epoxy. The shaped abrasive particle is secured in the desired orientation (i.e., major surface orientation or side surface orientation) and moved across a workpiece of 304 stainless steel for a scratch length of 8 inches using a wheel speed of 22 m/s and an initial scratch depth of 30 microns. The shaped abrasive particle produces a groove in the workpiece having a cross-sectional area (AR). For each sample set, each shaped abrasive particle completes 15 passes across the 8 inch length, 10 individual particles are tested for each of the orientation and the results are analyzed. The test measures the tangential force exerted by the grit on the workpiece, in the direction that is parallel to the surface of the workpiece and the direction of the groove, and the net change in the cross-sectional area of the groove from beginning to the end of the scratch length is measured to determine the shaped abrasive particle wear. The net change in the cross-sectional area of the groove for each pass can be measured. For the SGGT, the net cross-sectional area of the groove is defined as the difference between the cross-sectional area of the groove below the surface and the cross sectional area of the material displaced above the surface. Performance (Ft/A) is defined as the ratio of the tangential force to the net cross-sectional area of the groove.

The SGGT is conducted using two different orientations of the shaped abrasive particles relative to the workpiece. The SGGT is conducted with a first sample set of shaped abrasive particles in a major surface orientation wherein a major surface of each shaped abrasive particle is oriented perpendicular to the grinding direction such that the major surface initiates grinding on the workpiece. The results of the SGGT using the sample set of shaped abrasive particles in a major surface orientation allows for measurement of the grinding efficiency of the shaped abrasive particles in a major surface orientation.

The SGGT is also conducted with a second sample set of shaped abrasive particles in a side surface orientation wherein a side surface of each shaped abrasive particle is oriented perpendicular to the grinding direction such that the side surface initiates grinding of the workpiece. The results of the SGGT test using the sample set of shaped abrasive particles in a side orientation allows for measurement of the grinding efficiency of the shaped abrasive particles in a side orientation.

Figure 17:
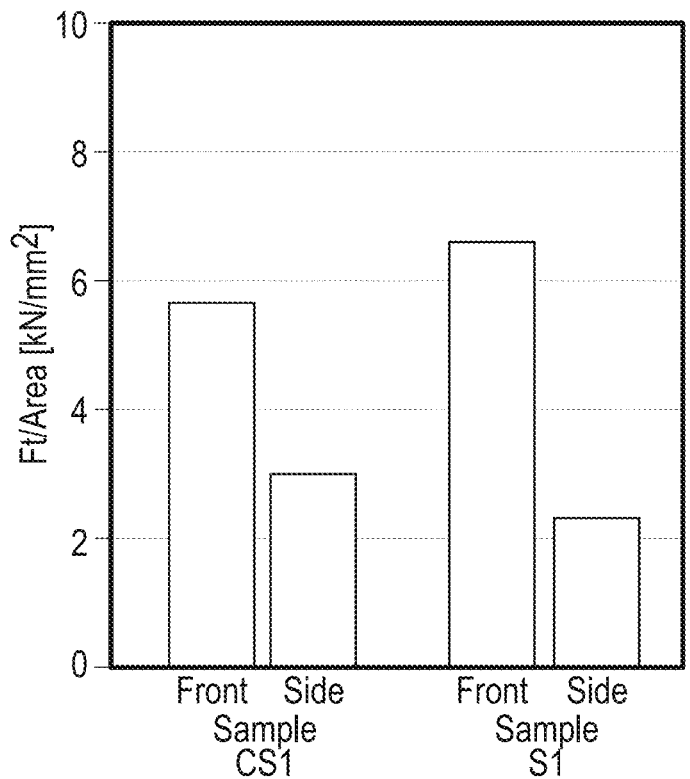
FIG. 17 includes a plot of force per total area removed for a conventional sample and a representative sample.

FIG. 17 includes a plot of force per total area removed from the workpiece for a front orientation (left hand bar) and side orientation (bar on the right) for Sample CS1 and Sample S1. The force per total area removed is a measure of the grinding efficiency of the shaped abrasive particles, with a lower force per total area removed indicating more efficient grinding performance. As illustrated, Sample S1 demonstrated an essentially equivalent performance compared to Sample CS1. This result is quite remarkable considering those of skill in the art have previously disclosed that the most efficient cutting action of abrasive particles is likely to a result from particles having a high shape fidelity marked by sharp edges and smooth surfaces (i.e., like a chisel). See, for example, U.S. Pat. Nos. 4,261,706, 5,603,738 and US Pat. Publ. 20100319269. However, the abrasive particles of the embodiments herein have demonstrated notable performance differences when compared to conventional abrasive particles in light of the noted differences between the abrasive particles and conventional abrasive particles having relatively smooth sides and sharp edges. Notably, the abrasive particles herein have surfaces that are characterized by irregular contours including randomly arranged protrusions and valleys on one or more surfaces of the shaped abrasive particles, which is in contrast to the teachings of the prior art that suggest one should make the surfaces of a shaped abrasive particle smooth and the edges sharp for the best performance.

Abrasive particles Sample Batch S2B1 were formed into coated abrasive articles having the construction, which is provided below. A backing of finished cloth of 18 pounds per ream were obtained and coated with a make formulation including of a phenol formaldehyde as provided in Table 1. The web with the make coat was then followed by an electrostatic deposition process applying 40 pounds per ream of abrasive particles from Sample Batch S2B1. This partial structure of make coated web and grain was then dried in an oven for two hours at 80° C.

TABLE 1

Make Formulation

| Make Formulation Component | Vendor | Percentage |
|---|---|---|
| Filler NYAD Wollast 325 | NYCO | 34% |
| Wet Witcona 1260 | Witco | 0.10% |
| Resin, Single Comp 94-908 | Durez | 57% |
| Nalco 2341 Defoamer | Nalco | 0.10% |
| PET-3MP (PTM) | Bruno Bloc | 5.70% |
| Water | — | 3.10% |

The coated abrasive structures were then coated with 14 pounds per ream of a phenol formaldehyde size coat. The detailed composition of the size coat is presented in Table 2. The web was transported through a drier which had a dry bulb temperature setting of 120° C. for a period of two hours.

TABLE 2

Size Formulation

| Size Formulation Component | Vendor | Percentage |
|---|---|---|
| White Dye E-8046 | Acrochem Corp | 0.70% |
| Wet Witcona 1260 | Witco | 0.20% |
| Solmod Tamol 165A | Rohm & Haas | 0.90% |
| Filler Syn Cryolite | Solvay | 42.40% |
| Resin Single Comp 94-908 | Durez | 48.30% |
| Nalco 2341 Defoamer | Nalco | 0.10% |
| PET-3MP Polythiol (PTM) | Bruno Bloc | 2.50% |
| Dye Unisperse Black | Ciba | 0.20% |
| Water | — | 4.80% |

The coated abrasive sample was then placed into a convection oven to undergo a post curing step in which the oven temperature was 125° C. for 12 hours.

A third sample of a coated abrasive, Sample S3 was also made. The abrasive particles of Sample S3 were made according to the process used to make the abrasive particles of Sample Batch S2B1, but did not include deposition of a plurality of abrasive particles on the shaped abrasive particles. The construction of the coated abrasive of Sample S3 was the same as for the coated abrasive including the particles of Sample Batch S2B1. Particles of Sample CS1 were tested as a conventional coated abrasive article commercially available at 984F from 3M Corporation.

Each of the three different coated abrasive samples was tested according to the conditions summarized in Table 3. Notably, 2 sample coated abrasives were tested in each case to derive the results.

TABLE 3

| Test conditions: Test mode: Dry, straight plunge | |
|---|---|
| | Constant MRR' = 4 inch$^3$/min/inch |
| | Belt speed (Vs) = 7500 sfpm (38 m/s) |
| | Work material: 304 ss |
| | Hardness: 96-104 HRB |
| | Size: 0.5 × 0.5 × 12 inches |
| | Contact width: 0.5 in |
| | Contact Wheel: Steel |
| Measurements: | Power, Grinding Forces, MRR' and SGE |
| | Cum MR compared at SGE = 2.4 Hp · min/inch$^3$ |

Figure 18:
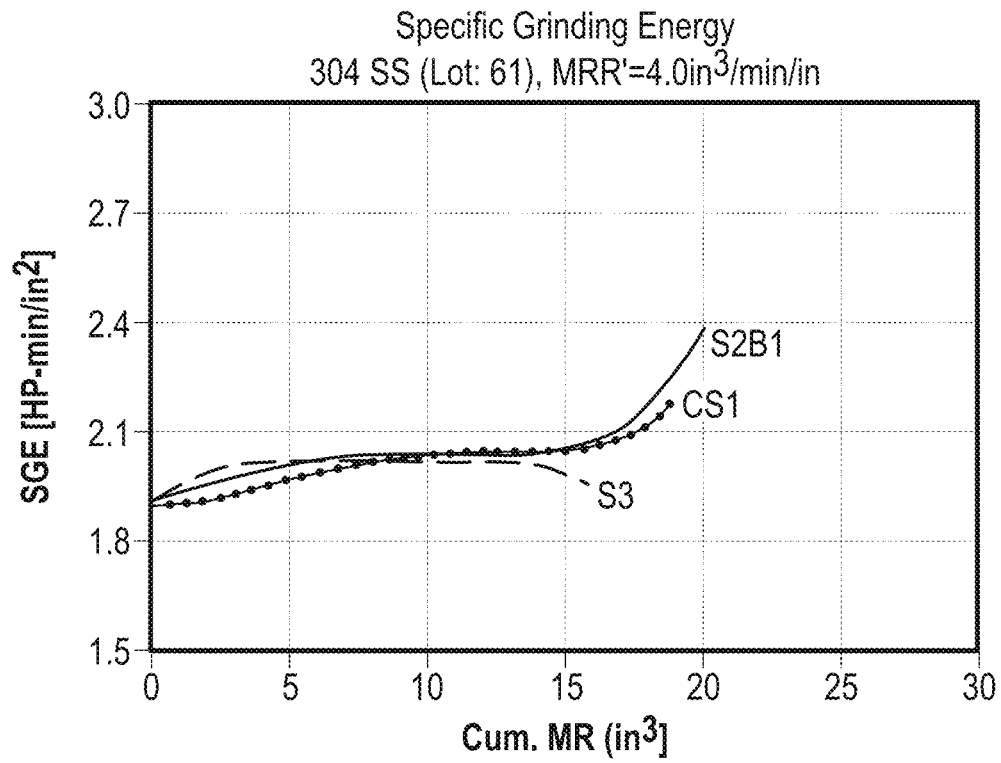
FIG. 18 includes a plot of specific grinding energy versus cumulative material removed for three samples of coated abrasive articles.

FIG. 18 includes a plot of specific grinding energy versus cumulative material removed (at a material removal rate of 4 inch$^3$/min inch) for each of the samples. It is notable that the coated abrasive utilizing the abrasive particles of the Sample Batch S2B1 performed better than the coated abrasive including the abrasive particles of Sample S3 and was essentially equivalent in performance to the coated abrasive sample including the abrasive particles of Sample CS1.

Example 2

A new sample of abrasive particles (Sample S4) was formed. The shaped abrasive particles of Sample S4 were formed from a gel mixture including approximately 45-50 wt % boehmite. The boehmite was obtained from Sasol Corp. as Catapal B and modified by autoclaving a 30% by weight mixture of the Catapal B with deionized water and nitric acid. The nitric acid-to-boehmite ratio was approximately 0.025 in the autoclave and treated at 100° C. to 250° C. for a time ranging from 5 minutes to 24 hours. The autoclaved Catapal B sol was dried by conventional means. The boehmite was mixed and seeded with 1% alpha alumina seeds relative to the total alumina content of the mixture.

The alpha alumina seeds were made by milling of corundum using conventional techniques, described for example in U.S. Pat. No. 4,623,364. The mixture also included 45-50 wt % water and 2.5-4 wt % additional nitric acid, which were used to form the gel mixture. The ingredients were mixed in a planetary mixer of conventional design and mixed under reduced pressure to remove gaseous elements from the mixture (e.g., bubbles).

The gel was then placed in a die and extruded into openings of a production tool translated under the die at a suitable speed relative to the deposition rate such that the openings were sufficiently filled. The cavities were open to both sides of the production tool, such that they were apertures extending through the entire thickness of the production tool. The cavities or openings of the production tool had an equilateral triangle two-dimensional shape as viewed top down, wherein the length was approximately 2.77 mm, the width was approximately 2.4 mm and the depth was approximately 0.60 mm. The production tool had a thickness of approximately 0.60 mm. The surfaces of the openings in the production tool were coated with a lubricant of canola oil to facilitate removal of the precursor shaped abrasive particles from the production tool.

After depositing of the gel into the openings of the production tool, a plurality of dried, unsintered, particles of the same gel material deposited in the openings were projected at the surface of the gel in the production tool. The plurality of abrasive particles were forcibly ejected toward the gel in the production tool using air as the carrier material at an approximate pressure of 40 psi. The process of applying the plurality of abrasive particles was completed in a container, wherein a vast majority of the excess or unbonded abrasive particles could be captured and recycled for future application processes. The gel was not humidified prior to deposition of the plurality of abrasive particles. Prior to deposition, the plurality of dried, unsintered particles were sieved using a 100 US mesh (ASTM E-11 with openings of 150 microns), such that the maximum particle size of the plurality of unsintered particles was less than 100 US mesh. The plurality of abrasive particles had an absorbed moisture content of approximately 10-15% for the total weight of the particles. Approximately 70% of the precursory shaped abrasive particle had a suitably high coverage of the plurality of dried, unsintered particles on the first major surface.

The excess dried, unsintered particles were removed and the mixture and plurality of abrasive particles were dried in the cavities at approximately 50° C. for 30 seconds using IR lamps and a fan to form precursor abrasive particles. The precursor abrasive particles were removed from the production tool, pre-sintered at 800° C. and sintered at approximately 1320° C. for approximately 15 minutes to achieve 98% theoretical density. The resulting abrasive particles had a body including a triangular two-dimensional shape including a length of approximately 1550 microns, a width of approximately 1350 microns, and a height of approximately 300 microns. The abrasive particle of Sample S4 had an average strength of approximately 20.3 MPa, an average tip sharpness of 30 microns, a Shape Index of approximately 0.5.

Another sample of abrasive particles (Sample CS4) were formed in the same manner as noted above for Sample S4, except that the abrasive particles did not include a plurality of abrasive particles on the surface of the shaped abrasive particles (i.e., unmodified shaped abrasive particles).

Two samples of coated abrasive articles were formed from the abrasive particles of Samples S4 and CS4 to create coated abrasive samples CAS4 and CACS4, respectively. The coated abrasive samples CAS4 and CACS4 were formed in the same manner used to form the coated abrasive samples of Example 1 for Samples CS1 and Sample Batch S2B1.

Each coated abrasive sample was tested according to the test outlined in Table 4 below. Two samples of the coated abrasives were tested in each case to derive the results.

TABLE 4

Test Conditions Test mode Dry, constant depth of cut (rise/fall)

| | |
|---|---|
| | Constant MRR' = 2.3 inch$^3$/min/inch |
| | Belt Speed (Vs) = 7500 sfpm (38 m/s) |
| | Work Material: 1045 Carbon Steel |
| | Hardness: 85-95 HRB |
| | Size: 1 × 0.25 inches |
| | Contact width: o.25 inches |
| | Contact wheel for belt: Steel wheel |
| Measurements: | Power, MRR' and SGE |
| | Cum. MR compared at SGE = 3.2 Hp min/inch$^3$ |

Figure 19:
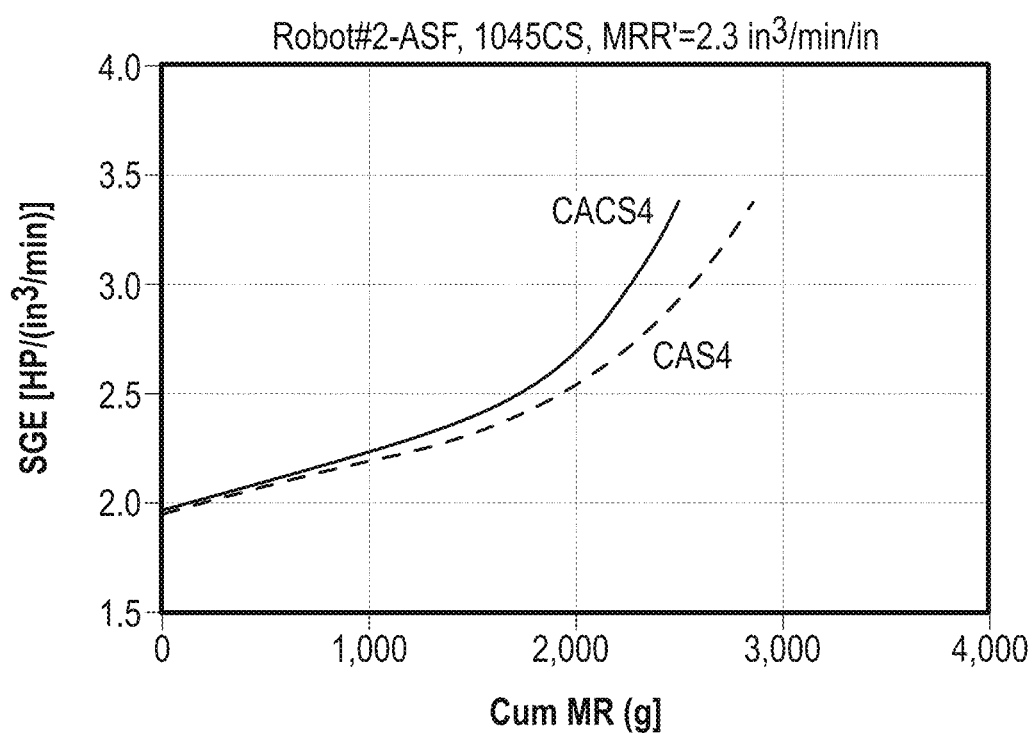
FIG. 19 includes a plot of specific grinding energy versus cumulative material removed from the workpiece.
Figure 20A:
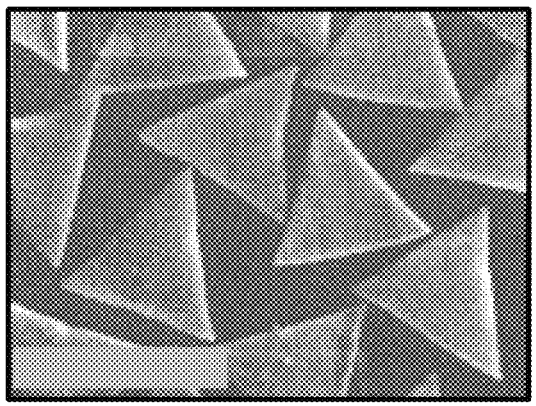
FIGS. 20A-20E include images of representative abrasive particles according to embodiments herein.
Figure 20B:
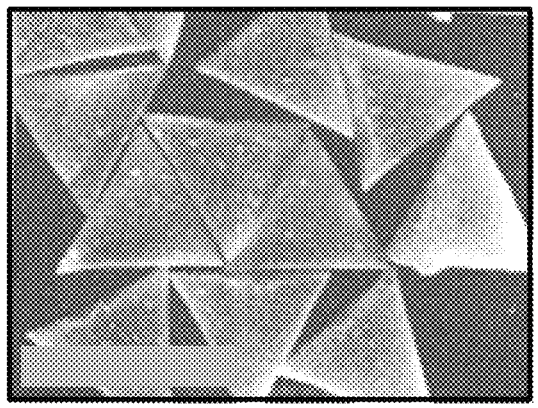
Figure 20C:
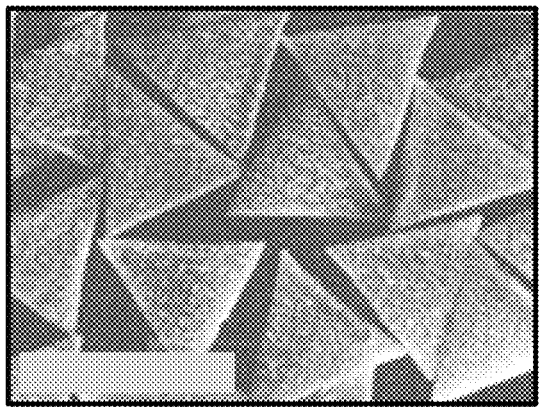
Figure 20D:
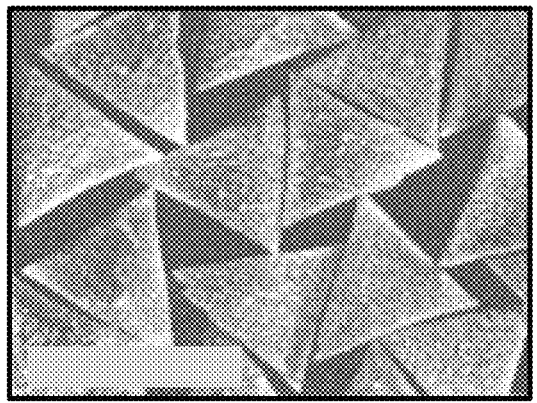
Figure 20E:
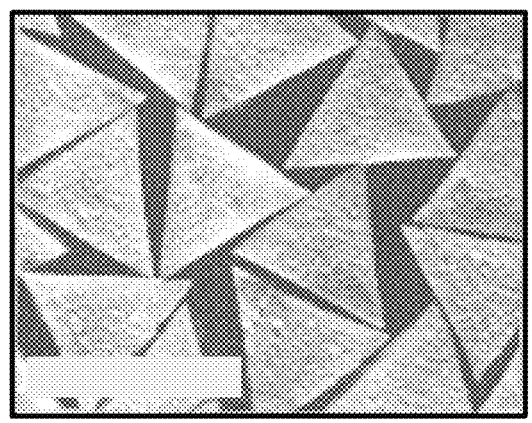

FIG. 19 includes a plot of specific grinding energy versus cumulative material removed from the workpiece. As illustrated, Sample CAS4 demonstrates improved cumulative material removed and lower specific grinding energy, especially near the end of the test, compared to Sample CACS4.

Example 3

Five samples of abrasive particles (S5-1, S5-2, S5-3, S5-4, and S5-5) were formed to investigate the impact of the median particle size of the plurality of abrasive particles on the percent coverage of the abrasive particles on at least one surface of the shaped abrasive particles. Table 5 below summarizes the impact of the median particle size of the plurality of abrasive particles on the percent coverage of the plurality of abrasive particles on a first major surface of a shaped abrasive particle having a generally triangular two-dimensional shape having a length of approximate 1550 μm, a width of approximately 1350 μm, and a height of approximately 320 μm. The abrasive particles were formed in the same manner used to form Sample S4 of Example 2, except that the surfaces of the gel in the production tool were humidified prior to deposition of the plurality of dried, unsintered abrasive particles. The humidification process utilized steam (i.e. a mix of water in the gaseous state and suspended liquid particles) directed at the surfaces of the gel in the production tool.

TABLE 5

| Sample ID | D50 of dried unsintered grains | Percentage of particles in the batch having covered |
|---|---|---|
| S5-1 | 125-89 μm | 24% |
| S5-2 | 89-64 μm | 38% |
| S5-3 | 64-45 μm | 95% |
| S5-4 | 45-38 μm | 96% |
| S5-5 | 76-45 μm | 96% |

FIGS. 20A-20E include images of the abrasive particles of Samples S5-1, S5-2, S5-3, S5-4, and S5-5, respectively. Notably, the median particle size of the plurality of abrasive particles relative to the size of the shaped abrasive particle had an impact on the percent coverage of the plurality of abrasive particles on the surface of the shaped abrasive particles.

Example 6

Four samples of abrasive particles (Sample S6-1, Sample S6-2, CS1, and Sample S6-3) were tested according to the single grit grinding test, as described in Example 1. Sample S6-1, Sample S6-2, and Sample S6-3 were formed in the same manner as Sample S4 of Example 2, except that Sample S6-1 had an average of 32 abrasive particles bonded to the major surfaces of the bodies of the shaped abrasive particles and Sample S6-2 had an average of 7 abrasive particles bonded to the major surfaces of the bodies of the shaped abrasive particles. Sample S6-3 had no plurality of abrasive particles bonded to the surface of the shaped abrasive particle.

Figure 21:
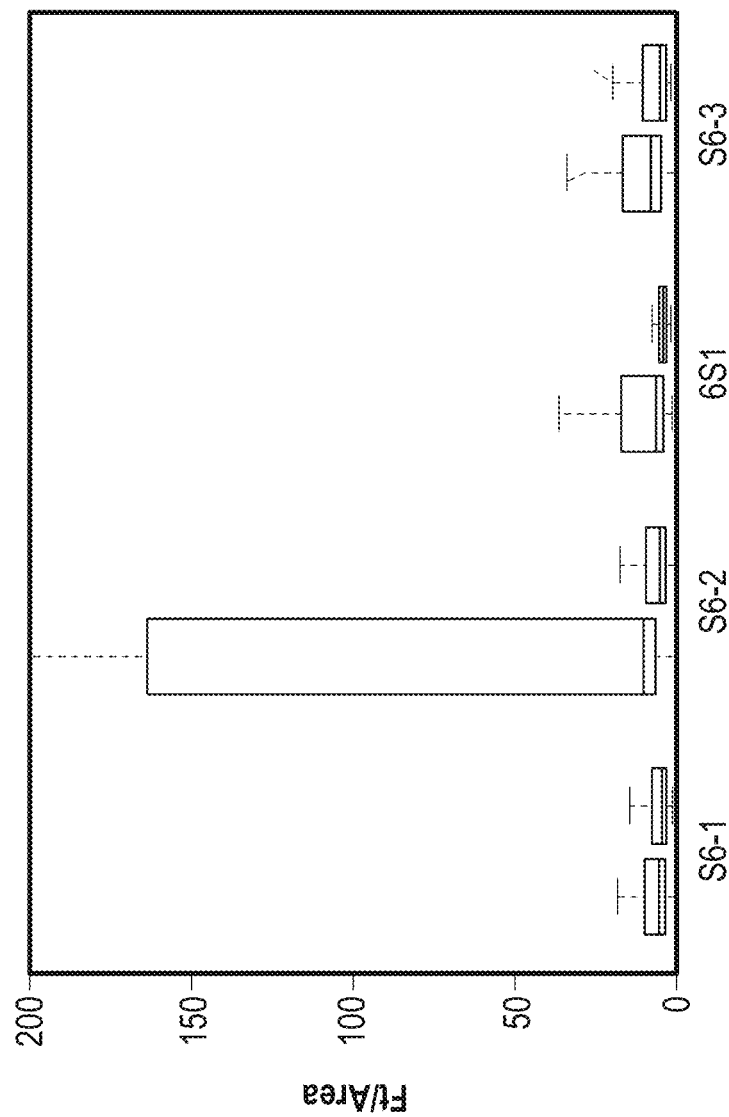
FIG. 21 includes a plot of force per total area removed from the workpiece according to the single grit grinding test for a conventional samples and representative samples according to embodiments.

FIG. 21 includes a plot of force per total area removed from the workpiece for a front orientation (left hand bar) and side orientation (bar on the right) for Sample S6-1, S6-2, S6-3, and CS1 (same as provided in Example 1). Surprisingly, Sample S6-2 demonstrated a greater variation in the cutting efficiency in the front orientation compared to Sample S6-1. Sample S6-1 also demonstrated a lower variation in the cutting efficiency compared to Sample S6-3 and CS1 in the front orientation.

Example 7

Two samples of abrasive particles were made. A first sample, Sample S7-1 was formed in the same manner used to form Sample S4 of Example 2 except that the surfaces of the gel in the production tool were humidified prior to deposition of the plurality of dried, unsintered abrasive particles. The humidification process utilized steam directed at the surfaces of the gel in the production tool. The plurality of abrasive particles attached to the first major surface of the shaped abrasive particle of Sample S7-1 had not been calcined or sintered. A second sample, Sample S7-2 was formed in the same manner used to form Sample S7-1, except that sintered alpha alumina grains were used for the plurality of abrasive particles attached to a first major surface of the shaped abrasive particles. Sample S7-1 demonstrated significantly better coverage, wherein 90-95% of the particles were suitably covered with the plurality of abrasive particles compared to Sample S7-2, which had only 60-70% of total particles formed with a suitable covering of the plurality of abrasive particles for the first major surface of the shaped abrasive particles. It is theorized that the sintered abrasive particles applied to the surface of the precursor shaped abrasive particles for Sample S7-2 did not bond well to the surface, but the green, unsintered grains applied to the surface of Sample S7-1 had improved bonding as the dried grains could re-gel with the humidified surface of the gel prior to further processing.

Example 8

Two samples of abrasive particles were made. A first sample, Sample S8-1 was formed in the same manner used to form Sample S4 of Example 2. The plurality of abrasive particles attached to the first major surface of the shaped abrasive particle of Sample S8-1 had not been calcined or sintered. A second sample, Sample S8-2 was formed in the same manner used to form Sample S8-1, except that no abrasive particles were deposited on the surfaces of the gel or resulting shaped abrasive particles.

Coated abrasive articles in the form of discs having a diameter of 7 inches were then created using the abrasive particles of Samples S8-1 and S8-2 to create samples CAS8-1 and CAS8-2, respectively. The samples CAS8-1 and CAS8-2 were formed according to the following process:

A make coat formulation as provided in Table 6 below was applied to a fiber backing material available from Sachsenroder having an average thickness of 0.95 mm. The wet laydown weight of the make coat was 9 lbs/ream+/−0.3 lbs and was applied using a two roll coat method using a steel roll over a 65-72 Shore A durometer hard rubber roll.

TABLE 6

| Component | % based on Weight |
| --- | --- |
| Phenolic Resin (SI HRJ15993) | 48.25 |
| Solmod Silane A1100 | 0.44 |
| Wet Witconate 1260 | 0.15 |
| Filler NYAD Wollastonite 400 | 48.25 |
| Water | 2.91 |

The viscosity of the formulation was adjusted using water to a range of 9500 to 10500 cps at 100° F. After the make coat was applied, the abrasive particles of Samples S8-1 and S8-2 were silane treated and applied to the make coat via electrostatic projection. The target grain weight for each of the samples was 55 lbs/ream+/−3 lbs. The particles of each of the samples were pre-heated before projection.

After projecting the particles onto the make coat and backing, the make coat was cured in a festoon oven using the following process: step 1) 42 minutes at 150° F.; step 2) 42 minutes at 170° F.; step 3) 38 minutes at 200° F.; step 4) 43 minutes at 215° F.; and step 5) 23 minutes at 230° F.

After the make coat was cured, a size coat having the formulation provided in Table 7 was applied to the surface of the particles and cured make coat.

TABLE 7

| Component | % based on Weight |
| --- | --- |
| Phenolic Resin (SI HRJ15993) | 53.04 |
| Solmod Tamol 165A | 0.84 |
| Air Prod DF70 Defoamer | 0.12 |
| Black Pigment | 2.41 |
| Filler Syn Cryolite K | 42.43 |
| Water | 1.16 |

The formulation of the size coat was adjusted using water to a viscosity range of 5400 to 5600 cps at 100° F. The size coat was applied using the same machine set up as used to apply the make coat. The size is controlled visually versus a known standard including a gap setting for the two roll coater was set at 0.045 inches.

After applying the size coat, the material was cured in a festoon oven using the following process: step 1) 20 minutes at 130° F. and 45% RH; step 2) 20 minutes at 170° F.; step 3) 20 minutes at 190° F.; step 4) 20 minutes at 210° F.; and step 5) 30 minutes at 235° F. The material is then rolled up and cured in a post cure oven for 12 hours at 250° F.

Upon removing the roll from the post cure oven the backing is flexed and re-moisturized by application of water.

Each of the coated abrasive samples were tested according to the conditions summarized below in Table 8.

TABLE 8

| | Test mode dry, constant force of rotating disc in a linearly traveling workpiece |
|---|---|
| | Constant Force 8 lb |
| | Disc speed 6000 rpm |
| | Medium hard backup pad (e.g., rubber) |
| | Work piece linear speed 15 fpm |
| | Angle between disc and work piece is 10 degrees |
| | Work material A36 hot rolled steel |
| | Contact width ⅛ inch |
| | Grind time 1 minute intervals |
| Measurements | Grams cut per 1 minute interval |
| | Grams lost from disc per 1 minute interval |
| | End point: less than 2 g material removed in the interval |

Figure 22:
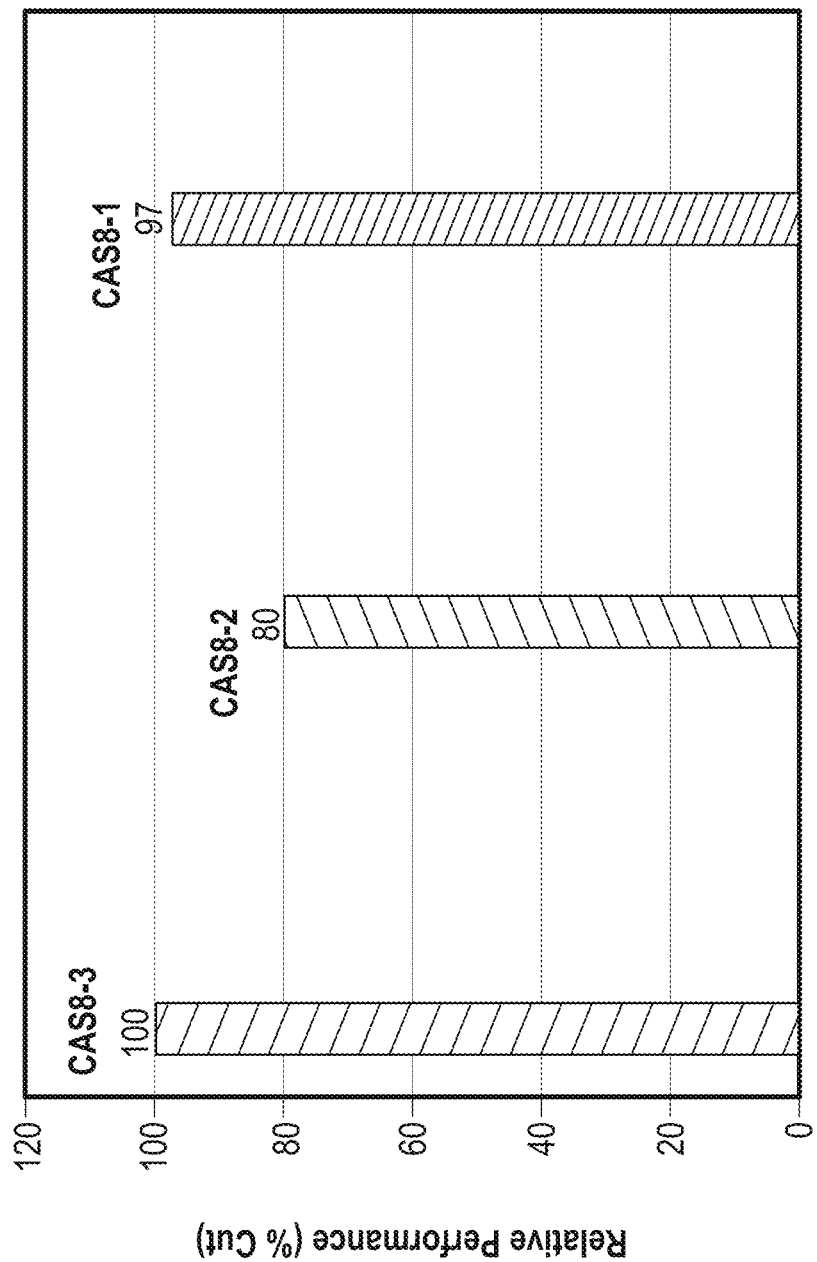
FIG. 22 includes a plot of relative performance (% cut) for a conventional sample and representative samples according to embodiments herein.

FIG. 22 includes a plot of relative performance (% cut) for Samples CAS8-1 and CAS8-2 relative to a conventional coated abrasive sample, Sample CACS8-3, available as 982C from 3M Corporation. As illustrated, Sample CAS8-1 had essentially the same performance compared to the conventional coated abrasive sample. By contrast, Sample CAS8-2 demonstrated a relative performance of approximately 20% less compared to the conventional sample the Sample CAS8-1.

All values, ratios, percentages and/or quantified data provided herein with respect to an abrasive particle of any embodiment, can also be an average derived from a random and statistically relevant sample size of representative abrasive particles. For example, with respect to the percent coverage of the plurality of abrasive particles on the body, such percentages can also be calculated from a random and statistically relevant sample size of a batch of abrasive particles. The size of the sample may differ depending upon the size of the batch.

Notably, reference herein to a composition that is "free of" another material (e.g., material Z) may be interpreted as a composition that may have traces or impurity contents of material Z, but such contents do not materially affect the properties of the composition. For example, a material may be "free of" a particular species and such species may be present in an amount of not greater than 0.1% or not greater than 0.01% or not greater than 0.001%. This paragraph is not to be interpreted to narrow any other disclosure in the foregoing embodiments and is intended only to define those instances using the term "free of." Moreover, in instances where a particular species is not expressly identified, Applicants reserve the right to further define the material as being free of said particular species. However, unless the terminology "free of" is expressly recited, such a term cannot be interpreted to narrow those embodiments or claims using inclusive terms, such as "including," "having," "comprising," and the like.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. A fixed abrasive article comprising:
  a plurality of shaped abrasive particles,
  each of the plurality of shaped abrasive particles comprising a body;
  wherein the body includes a upper major surface, a bottom major surface opposite the upper major surface, and a side surface extending between the upper major surface and the bottom major surface; and
  wherein the upper major surface has a rough contour with a plurality of randomly arranged peaks and valleys.

2. The abrasive article of claim 1, wherein the upper major surface has a surface roughness greater than the surface roughness of the bottom major surface.

3. The abrasive article of claim 1, wherein the upper major surface has a surface roughness greater than the surface roughness of the side surface.

4. The abrasive article of claim 1, wherein the abrasive particle is extruded.

5. The abrasive article of claim 1, wherein the body includes a prismatic body having a length, width, and thickness wherein the length is greater than the width and the length is greater than the thickness, wherein the body includes a first end surface and a second end surface having a polygonal shape, and a side surface extending between the first end surface and the second end surface.

6. The abrasive article of claim 1, wherein the randomly arranged peaks have different sizes with respect to each other.

7. The abrasive article of claim 1, wherein the randomly arranged valleys have different sizes with respect to each other.

8. The abrasive article of claim 1, wherein the body of the shaped abrasive particle comprises a two-dimensional shape as viewed in a plane defined by a length and a width of the body selected from the first group consisting of regular polygons, irregular polygons, ellipsoids, numerals, Greek alphabet characters, Latin alphabet characters, Russian alphabet characters, complex shapes having a combination of polygonal shapes, a shape with linear and curved portions, and a combination thereof.

9. The abrasive article of claim 1, wherein the shaped abrasive particle comprises alpha alumina.

10. The abrasive article of claim 1, wherein the abrasive particle is incorporated into a fixed abrasive article.

11. The abrasive article of claim 10, wherein the abrasive particle has a controlled orientation relative to one or more references axes within the fixed abrasive article.

12. The abrasive article of claim 1, wherein the body has a primary aspect ratio of length:width of at least 1.1:1.

13. The abrasive article of claim 1, wherein the shaped abrasive particle comprises diamond.

14. A fixed abrasive article comprising:
  a plurality of shaped abrasive particles,
  each of the plurality of a shaped abrasive particles comprising a body; and
  a plurality of abrasive particles sinter-bonded to at least one surface of the body of the shaped abrasive particle.

15. The abrasive particle of claim 14, wherein the plurality of abrasive particles include a material having a CTE that is not greater than 50% different than a CTE of the body of the shaped abrasive particle.

16. The abrasive particle of claim 14, wherein at least a portion of a side surface is free of the plurality of abrasive particles.

17. The abrasive particle of claim 14, wherein the plurality of abrasive particles is bonded to at least two major surfaces of the body.

18. The abrasive particle of claim 14, wherein the plurality of abrasive particles is bonded to at least two major surfaces of the body, wherein at least a portion of a side surface is free of the plurality of abrasive particles, wherein the plurality of abrasive particles is embedded in the at least one surface of the body of the shaped abrasive particle, wherein the body comprises a polygonal two-dimensional shape as viewed in a plane defined by a length and a width of the body, wherein the body comprises alumina, wherein the plurality of abrasive particles has an irregular shape, and wherein the plurality of abrasive particles comprises alumina.

19. The abrasive particle of claim 14, wherein the plurality of abrasive particles is bonded to at least two major surfaces of the body, and wherein at least a portion of a side surface is free of the plurality of abrasive particles.

20. The abrasive particle of claim 14, wherein the plurality of abrasive particles cover at least 50% of the total surface area of the body.

\* \* \* \* \*